US012330036B2

(12) United States Patent
Hawkins, III et al.

(10) Patent No.: US 12,330,036 B2
(45) Date of Patent: Jun. 17, 2025

(54) SYSTEM AND METHOD FOR CONTROLLING A BICYCLE TRAINER

(71) Applicant: Wahoo Fitness LLC, Atlanta, GA (US)

(72) Inventors: Harold M. Hawkins, III, Atlanta, GA (US); Michael A. Lyle, Gainsville, GA (US); Bradley J. Collins, Atlanta, GA (US)

(73) Assignee: Wahoo Fitness, LLC, Atlanta, GA (US)

(*) Notice: Subject to any disclaimer, the term of this patent is extended or adjusted under 35 U.S.C. 154(b) by 493 days.

(21) Appl. No.: 17/403,785

(22) Filed: Aug. 16, 2021

(65) Prior Publication Data

US 2022/0203196 A1 Jun. 30, 2022

Related U.S. Application Data

(63) Continuation of application No. 16/102,546, filed on Aug. 13, 2018, now Pat. No. 11,090,542, which is a (Continued)

(51) Int. Cl.
*A63B 69/16* (2006.01)
*A63B 21/00* (2006.01)

(Continued)

(52) U.S. Cl.
CPC ........ *A63B 69/16* (2013.01); *A63B 21/00069* (2013.01); *A63B 21/0052* (2013.01); *A63B 21/225* (2013.01); *A63B 22/0605* (2013.01); *A63B 24/0087* (2013.01); *A63B 71/0622* (2013.01); *A63B 2024/009* (2013.01); *A63B 2024/0093* (2013.01);

(Continued)

(58) Field of Classification Search
CPC ........................ A63B 69/16–2069/168; A63B 24/0087–2024/009; A63B 21/005–0052; A63B 21/0056; A63B 22/06–2022/0658
See application file for complete search history.

(56) References Cited

U.S. PATENT DOCUMENTS

| | | | |
|---|---|---|---|
| 4,898,379 | A | 2/1990 | Shiba |
| 5,240,417 | A | 8/1993 | Smithson et al. |

(Continued)

FOREIGN PATENT DOCUMENTS

| | | |
|---|---|---|
| WO | WO 1998/00204 A1 | 1/1998 |

OTHER PUBLICATIONS

U.S. Appl. No. 13/975,720, now U.S. Pat. No. 9,999,818.

(Continued)

*Primary Examiner* — Andrew S Lo
(74) *Attorney, Agent, or Firm* — Polsinelli PC; Gregory P. Durbin

(57) ABSTRACT

A system and method for controlling an exercise device are provided herein. The system includes a memory having computer-executable instructions and at least one processor to execute the computer-executable instructions to wirelessly connect the exercise device, receive a training mode, receive at least one variable for determining a power set point, determine the power set point responsive to the training mode and the at least one variable and control a magnetic brake assembly in the exercise device responsive to the power set point.

9 Claims, 34 Drawing Sheets

Related U.S. Application Data continuation of application No. 14/135,205, filed on Dec. 19, 2013, now Pat. No. 10,046,222, which is a continuation-in-part of application No. 13/975,720, filed on Aug. 26, 2013, now Pat. No. 9,999,818.

(60) Provisional application No. 61/728,155, filed on Nov. 19, 2012, provisional application No. 61/693,685, filed on Aug. 27, 2012.

(51) Int. Cl.

| | |
|---|---|
| *A63B 21/005* | (2006.01) |
| *A63B 21/22* | (2006.01) |
| *A63B 22/06* | (2006.01) |
| *A63B 24/00* | (2006.01) |
| *A63B 71/06* | (2006.01) |

(52) U.S. Cl.

CPC . *A63B 2069/165* (2013.01); *A63B 2071/0638* (2013.01); *A63B 2210/50* (2013.01); *A63B 2220/34* (2013.01); *A63B 2220/54* (2013.01); *A63B 2225/093* (2013.01); *A63B 2225/50* (2013.01); *A63B 2230/062* (2013.01); *G08C 2201/93* (2013.01)

(56) References Cited

U.S. PATENT DOCUMENTS

| | | | | |
|---|---|---|---|---|
| 5,256,115 | A | 10/1993 | Scholder et al. | |
| 5,512,025 | A | 4/1996 | Dalebout et al. | |
| 5,643,146 | A | 7/1997 | Stark et al. | |
| 5,645,509 | A | 7/1997 | Brewer et al. | |
| 5,785,630 | A | 7/1998 | Bobick et al. | |
| 6,050,924 | A | 4/2000 | Shea | |
| 6,312,363 | B1 | 11/2001 | Watterson et al. | |
| 6,447,424 | B1 | 9/2002 | Ashby et al. | |
| 6,450,922 | B1 * | 9/2002 | Henderson | G16H 40/63 482/901 |
| 6,458,060 | B1 | 10/2002 | Watterson et al. | |
| 6,626,799 | B2 | 9/2003 | Watterson et al. | |
| 6,702,719 | B1 | 3/2004 | Brown et al. | |
| 6,749,537 | B1 | 6/2004 | Hickman | |
| 6,808,472 | B1 | 10/2004 | Hickman | |
| 6,921,351 | B1 | 7/2005 | Hickman et al. | |
| 6,997,852 | B2 | 2/2006 | Watterson et al. | |
| 7,060,006 | B1 | 6/2006 | Watterson et al. | |
| 7,060,008 | B2 | 6/2006 | Watterson et al. | |
| 7,097,588 | B2 | 8/2006 | Watterson et al. | |
| 7,166,062 | B1 | 1/2007 | Watterson et al. | |
| 7,455,622 | B2 | 11/2008 | Watterson et al. | |
| 7,510,509 | B2 | 3/2009 | Hickman | |
| 7,537,546 | B2 | 5/2009 | Watterson et al. | |
| 7,556,590 | B2 | 7/2009 | Watterson et al. | |
| 7,575,536 | B1 | 8/2009 | Hickman | |
| 7,625,315 | B2 | 12/2009 | Hickman | |
| 7,628,730 | B1 | 12/2009 | Watterson et al. | |
| 7,628,737 | B2 | 12/2009 | Kowallis et al. | |
| 7,645,212 | B2 | 1/2010 | Ashby et al. | |
| 7,857,731 | B2 | 12/2010 | Hickman et al. | |
| 7,862,475 | B2 | 1/2011 | Watterson et al. | |
| 7,862,476 | B2 | 1/2011 | Blau et al. | |
| 7,980,996 | B2 | 7/2011 | Hickman | |
| 7,985,164 | B2 | 7/2011 | Ashby | |
| 8,029,415 | B2 | 10/2011 | Ashby et al. | |
| 8,251,874 | B2 | 8/2012 | Ashby et al. | |
| 8,690,735 | B2 | 4/2014 | Watterson et al. | |
| 8,744,804 | B2 | 6/2014 | Messenger et al. | |
| 8,758,201 | B2 | 6/2014 | Ashby et al. | |
| 8,845,493 | B2 | 9/2014 | Watterson et al. | |
| 8,862,215 | B2 | 10/2014 | Puolakanaho et al. | |
| 8,986,165 | B2 | 3/2015 | Ashby | |
| 9,028,368 | B2 | 5/2015 | Ashby et al. | |
| 9,119,983 | B2 | 9/2015 | Rhea | |
| 9,142,139 | B2 | 9/2015 | Watterson et al. | |
| 9,174,085 | B2 | 11/2015 | Foley et al. | |
| 9,233,276 | B1 | 1/2016 | Foley et al. | |
| 9,254,416 | B2 | 2/2016 | Ashby | |
| 9,278,249 | B2 | 3/2016 | Watterson | |
| 9,339,691 | B2 | 5/2016 | Brammer | |
| 9,403,051 | B2 | 8/2016 | Cutler | |
| 9,460,632 | B2 | 10/2016 | Watterson | |
| 9,463,356 | B2 | 10/2016 | Rhea | |
| 9,468,794 | B2 | 10/2016 | Barton | |
| 9,579,544 | B2 | 2/2017 | Watterson et al. | |
| 9,586,090 | B2 | 3/2017 | Watterson et al. | |
| 9,623,281 | B2 | 4/2017 | Hendrickson et al. | |
| 9,636,567 | B2 | 5/2017 | Brammer et al. | |
| 9,694,240 | B2 | 7/2017 | Baudhuin | |
| 9,861,855 | B2 | 1/2018 | Foley et al. | |
| 9,868,022 | B2 | 1/2018 | Cooper | |
| 10,022,590 | B2 | 7/2018 | Foley et al. | |
| 10,576,348 | B1 * | 3/2020 | Hawkins, III | A63B 71/0622 |
| 2006/0229163 | A1 * | 10/2006 | Waters | A63F 13/22 482/8 |
| 2006/0234840 | A1 * | 10/2006 | Watson | A63B 22/0605 482/61 |
| 2008/0096725 | A1 * | 4/2008 | Keiser | A63B 21/0051 482/8 |
| 2010/0234185 | A1 * | 9/2010 | Watt | A63B 22/0605 482/8 |
| 2011/0098928 | A1 * | 4/2011 | Hoffman | G06Q 50/01 702/5 |
| 2011/0118086 | A1 * | 5/2011 | Radow | A63B 21/00196 482/5 |
| 2012/0004074 | A1 * | 1/2012 | Schelzig | A63B 24/0087 482/4 |
| 2012/0190502 | A1 * | 7/2012 | Paulus | A63B 24/0062 482/5 |
| 2013/0210579 | A1 * | 8/2013 | Schieffer | A63B 71/0622 482/8 |
| 2014/0038781 | A1 * | 2/2014 | Foley | A63B 21/015 482/9 |
| 2014/0171266 | A1 * | 6/2014 | Hawkins, III | A63B 21/225 482/5 |
| 2014/0171272 | A1 * | 6/2014 | Hawkins, III | A63B 24/0087 482/61 |
| 2015/0051718 | A1 * | 2/2015 | Inoue | A63B 71/06 700/91 |
| 2018/0008856 | A1 * | 1/2018 | Radow | A63B 69/16 |
| 2018/0085615 | A1 * | 3/2018 | Astolfi | A63B 22/0605 |

OTHER PUBLICATIONS

U.S. Appl. No. 14/135,205, now U.S. Pat. No. 10,046,222.
U.S. Appl. No. 16/102,546, now U.S. Pat. No. 11,090,542.
U.S. Appl. No. 14/183,773, now abandoned.
U.S. Appl. No. 15/712,798, now U.S. Pat. No. 10,576,348.
U.S. Appl. No. 16/011,237, now U.S. Pat. No. 10,933,290.
U.S. Appl. No. 17/162,685, now U.S. Pat. No. 11,559,732.
U.S. Appl. No. 18/095,092, recently issued.
U.S. Appl. No. 18/676,121.

* cited by examiner

10

SYSTEM AND METHOD FOR CONTROLLING A BICYCLE TRAINER

CROSS-REFERENCE TO RELATED APPLICATIONS

The present application is a continuation of U.S. application Ser. No. 16/102,546 filed Aug. 13, 2018, titled "System and Method for Controlling a Bicycle Trainer," which is a continuation of U.S. application Ser. No. 14/135,205 filed Dec. 19, 2013, titled "System and Method for Controlling a Bicycle Trainer", which is a continuation-in-part of U.S. application Ser. No. 13/975,720 filed Aug. 26, 2013, titled "Bicycle Trainer," which claims the benefit of priority to provisional application No. 61/693,685 filed Aug. 27, 2012, titled "Bicycle Trainer" and provisional application No. 61/728,155 filed Nov. 19, 2012, titled "Bicycle Trainer," all of which are hereby incorporated by reference.

TECHNICAL FIELD

Aspects of the present disclosure involve a bicycle trainer providing various features including portability, levelability, height adjustment, power measurement, and controllability through a software interface executed by a smart device or tablet, among other features and advantages.

BACKGROUND

Focused training for an important race, busy schedules, bad weather and other factors inspire bicycle riders to train indoors. Numerous indoor training options exist including exercise bicycles and trainers. An exercise bicycle looks similar to a bicycle but without wheels, and includes a seat, handlebars, pedals, crank arms, a drive sprocket and chain. An indoor trainer, in contrast, is a mechanism that allows the rider to mount an actual bicycle to the trainer, with or without the rear wheel, and then ride the bicycle indoors. The trainer provides the resistance and supports the bicycle but otherwise is a simpler mechanism than a complete exercise bicycle. Such trainers allow the user to train using their own bicycle, and are typically smaller than full exercise bicycles.

While useful, conventional trainers nonetheless suffer from several drawbacks. For example, it is often difficult to level conventional trainers from side to side, or front to back. Riding a slightly tilted bicycle is uncomfortable and can cause unintended damage to the bicycle. Similarly, many riders prefer that their bicycle be level fore and aft so that it feels like the rider is training on a flat surface as opposed to an incline or decline. Most conventional trainers, however, cannot be vertically adjusted so the person places boards, books, or the like under the trainer to elevate the entire trainer, or under the front wheels to elevate the front of the bicycle. Conventional trainers are also typically designed for one size wheel and one size axle. For example, many trainers are designed for a bicycle with a conventional 26 inch wheel, relatively newer but increasingly popular 29 inch mountain bike wheels, and even more recent 700c wheel sizes. However, conventional trainers are meant for only one size bicycle tire and thus a rider would need to have a separate trainer or use boards or the like to elevate the entire trainer if, for example, the user wanted to use a 26 inch trainer with a 29 inch mountain bike.

Many trainers are portable based on the simple fact that they are relatively small. Such trainers are nonetheless heavy, can be awkward to load into car trunks, and can still occupy substantial space when not in use. Portability, however, is important as some users may want to store their trainer when not in use and some users may take their trainer to races and the like in order to warm-up before a race and cool-down afterward.

Finally, fitness training using a power meter, particularly for bicyclists, is increasingly popular. Power meters measure and display the rider's power output (typically displayed in Watts) used for pedaling. Power meters of many different sorts have been adapted for use on bicycles, exercise bicycles and other fitness equipment. Many of these designs, however, are overly complicated, prone to error, and/or prone to failure, and also tend to be relatively expensive.

While bicycle fitness training using a power meter continues to grow in popularity, many bicycle fitness trainers cannot provide a consistent workout, are closed platforms so that they cannot operate with peripheral devices, and cannot be controlled wirelessly. In addition, many bicycle fitness trainers use rollers that the rear wheel engages and rolls on. There is often a high degree of friction, and a relatively large amount of torque for the rider to overcome. The friction tends to impart wear and tear on the tire, hub, bearings, and other components. Additionally, since there is almost always some amount of torque for the rider to overcome, the rider cannot coast and the fitness trainer will slow down the rear wheel relatively quickly compared to normal riding. Using conventional trainers, the riding experience does not feel like a real outdoor ride because there is very little inertia and too much torque. As an example, even if a rider is moving slowly, the rider often feels as if they are riding in sand on the beach. Additionally, conventional bicycle fitness trainers suffer because the riding is affected by air pressure within bicycle tires which is highly variable and based on temperature. The tire pressure level affects the resistance between the tire and the rollers.

In the meantime, smartphone and tablet usage and popularity has soared in recent years. Users of smartphones and tablets have access to a portable device that is capable of communicating with other devices, capable of executing applications, and capable of sending and receiving information with other devices. Smartphones are owned by more than half of American adults and may be carried in a pocket or purse. In addition, smartphones may be more powerful and easier to use than many desktop computers. Thus, smartphone users have ubiquitous access to a relatively powerful, and intuitive computing device which may be held in the palm of a hand.

When purchased, smartphones may come with a number of applications installed. In addition, hundreds of thousands of applications are also available for download and installation. The applications are produced by large companies as well as individual developers. These downloadable applications are available for free or a small price and extend the abilities of the smartphone. For example, a smartphone can be used to make a traditional phone call using a telephone app, send a text or media message using a messaging app, play music by executing a music application, obtain weather information by executing a weather application, obtain news by executing a news application, play a game by executing a game application, provide turn-by-turn navigation assistance by executing a GPS application, and plot out a run on a map by executing a fitness application. New applications are released on a daily basis for download. Accordingly, smartphones may be used in entirely different and new ways by downloading and executing the ever-growing library of available applications. In addition, smartphones are even more useful because many of these downloadable applications are also capable of communicating and interfacing with other hardware devices such as portable speakers, heart rate monitors, glucose meters, wireless scales, and fitness devices.

With these thoughts in mind among others, aspects disclosed herein were conceived.

SUMMARY

Briefly described, and according to one embodiment, aspects of the present disclosure generally relate to systems and methods for controlling and operating a bicycle trainer using a computing device. According to one embodiment, the computing device communicates variables to the bicycle trainer using an application programming interface (API). The variables are used by the bicycle trainer to control an electromagnetic brake assembly and simulate a bicycle ride based on the riding mode. In addition, the bicycle trainer communicates variables to the computing device using the API to display realtime bicycle ride information on the computing device.

In one aspect, an exercise device comprises a memory having computer-executable instructions and at least one processor to execute the computer-executable instructions to wirelessly connect the exercise device, receive a training mode, receive at least one variable for determining a power set point, determine the power set point responsive to the training mode and the at least one variable and control a magnetic brake assembly in the exercise device responsive to the power set point These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Figure 1:
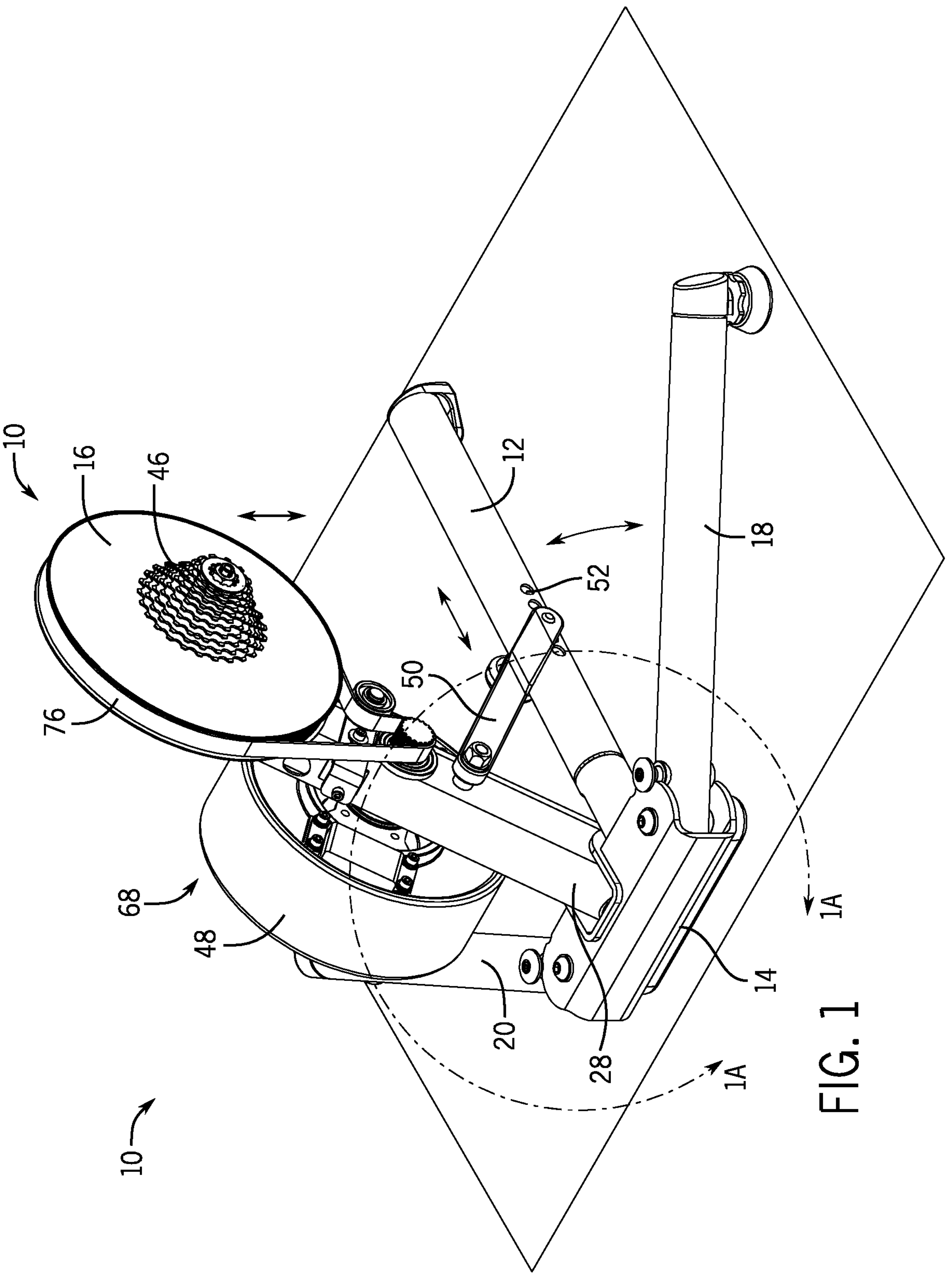
FIG. 1 is an isometric view of a trainer.

Aspects of the present disclosure involve a bicycle trainer that provides several advantages over conventional designs. The trainer includes a vertically adjustable rear axle and cassette (rear bicycle gears) where the user mounts her bicycle to the trainer. Generally speaking, the user removes her rear wheel from the drop outs at the rear of the bicycle (not shown) and then connects the rear axle and cassette of the trainer to the drop outs in the same manner that the rear wheel would be coupled to the bicycle. Additionally, the trainer is configured with a reversible spacer that allows for mounting bicycles, such as mountain bicycles and road bicycles, with different width rear wheels and attendant frame or hub spacing.

The cassette is coupled to a pulley that drives a belt connected to a flywheel or other resistance mechanism such that when the user is exercising, her pedaling motion drives the flywheel. The flywheel includes an electromagnetic brake that is controllable. Further, torque imparted on the flywheel by a rider pedaling a bicycle mounted on the trainer, is measured at a bracket interconnecting a portion of the flywheel with a stationary portion of the frame. Based on power measurements, RPM, heart rate and other factors, the magnetic brake may be controlled. Control of the trainer, and display of numerous possible features (power, RPM, terrain, video, user profile, heart-rate, etc.) may be provided through a dedicated device or through a smart phone, tablet or the like, running a software application ("app") configured to communicate with the trainer.

According to an example embodiment, a device, such as the smartphone or tablet running the app, connects with the bicycle trainer using an application programming interface (API) also known as a framework. The framework is bundled within the app and loaded into memory as needed by the smartphone or tablet. The framework may include shared resources such as a dynamic shared library, interface files, image files, header files, and reference documentation all within a single package. The API is made publically available for download to software developers to use to develop apps for use with the bicycle trainer. As an example, software developers may add the framework to a third party app which provides a user interface for interacting with the bicycle trainer, and upload the app to a repository of apps to be downloaded by smartphone users. The app may be executed by a user's smartphone and communicate with the bicycle trainer using a wireless interface. The app may be used to select and control a mode of operation for the bicycle trainer and provide visual feedback regarding bicycle rides on a display of the smartphone. The apps may also be used as an interface to select power based fitness training, interact or simulate recorded actual rides, simulate hill climbing and descending, and input desired ride variables such as grade, wind, rider weight and bike weight, etc. Accordingly, the framework will allow the bicycle trainer to interface with a variety of different first-party and third-party apps such as bicycle training apps, bicycle ride tracking apps, map apps, multiplayer synchronous game-type apps, asynchronous game apps, course leaderboard apps, course simulation apps, GPS-type apps, etc. Stated differently, the API turns the trainer into an open platform that third parties may use to develop apps to control and obtain information from the trainer.

Now referring to the trainer itself and FIGS. 1-7, the bicycle trainer 10 includes a center leg 12 coupled to and extending rearwardly from a front mounting bracket 14. The center leg 12 is arranged below the pulley 16 and offset slightly from the longitudinal centerline of the trainer 10. A pair of support legs 18, 20 is pivotally coupled to and at opposing ends of the bracket 14. The first and second support legs 18, 20 are configured to pivot inward toward the center leg 12 for storage and movement of the trainer 10, and pivot outward and away from the center leg 12 when the trainer is in use.

Figure 3:
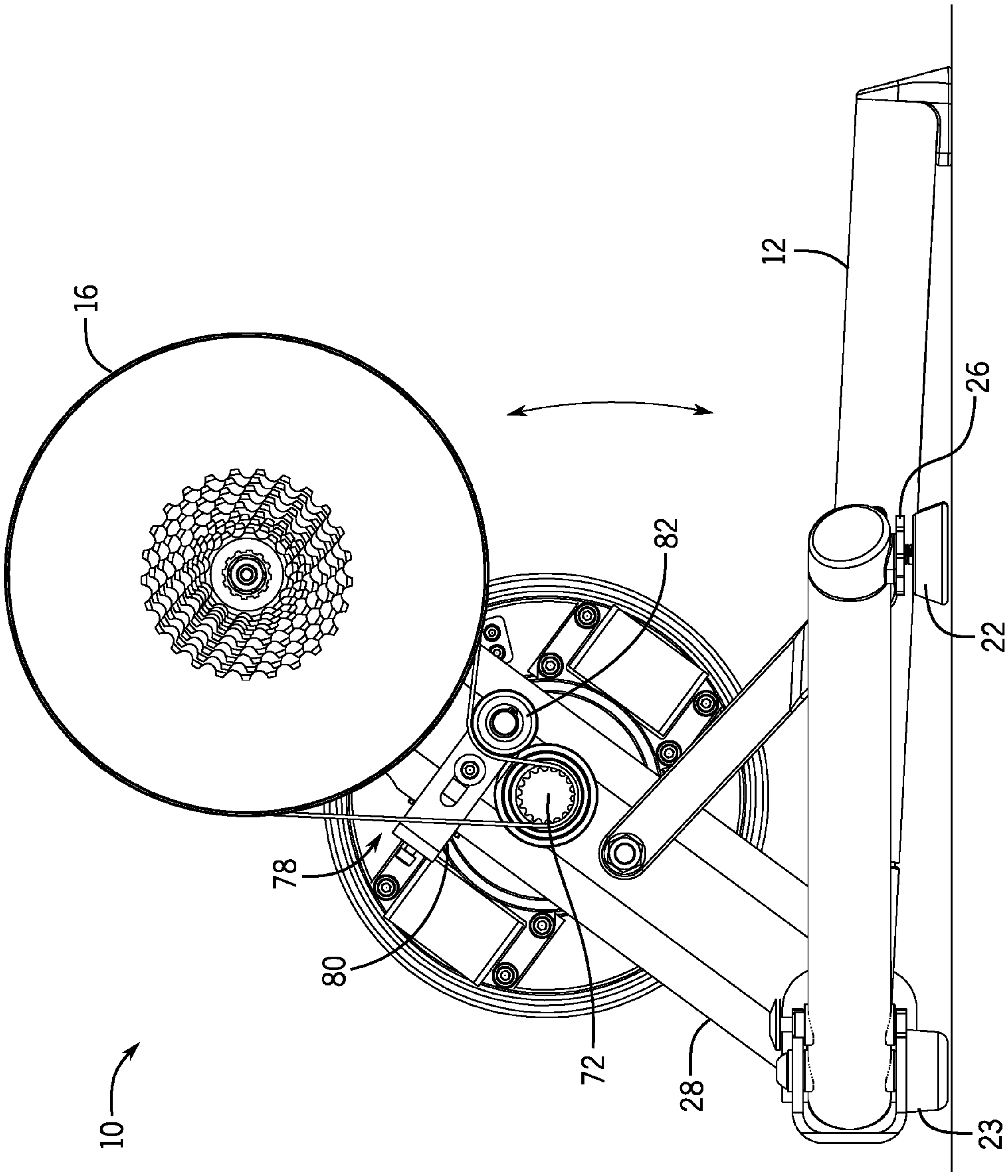
FIG. 3 is a left side view of the trainer in FIG. 1.
Figure 4:
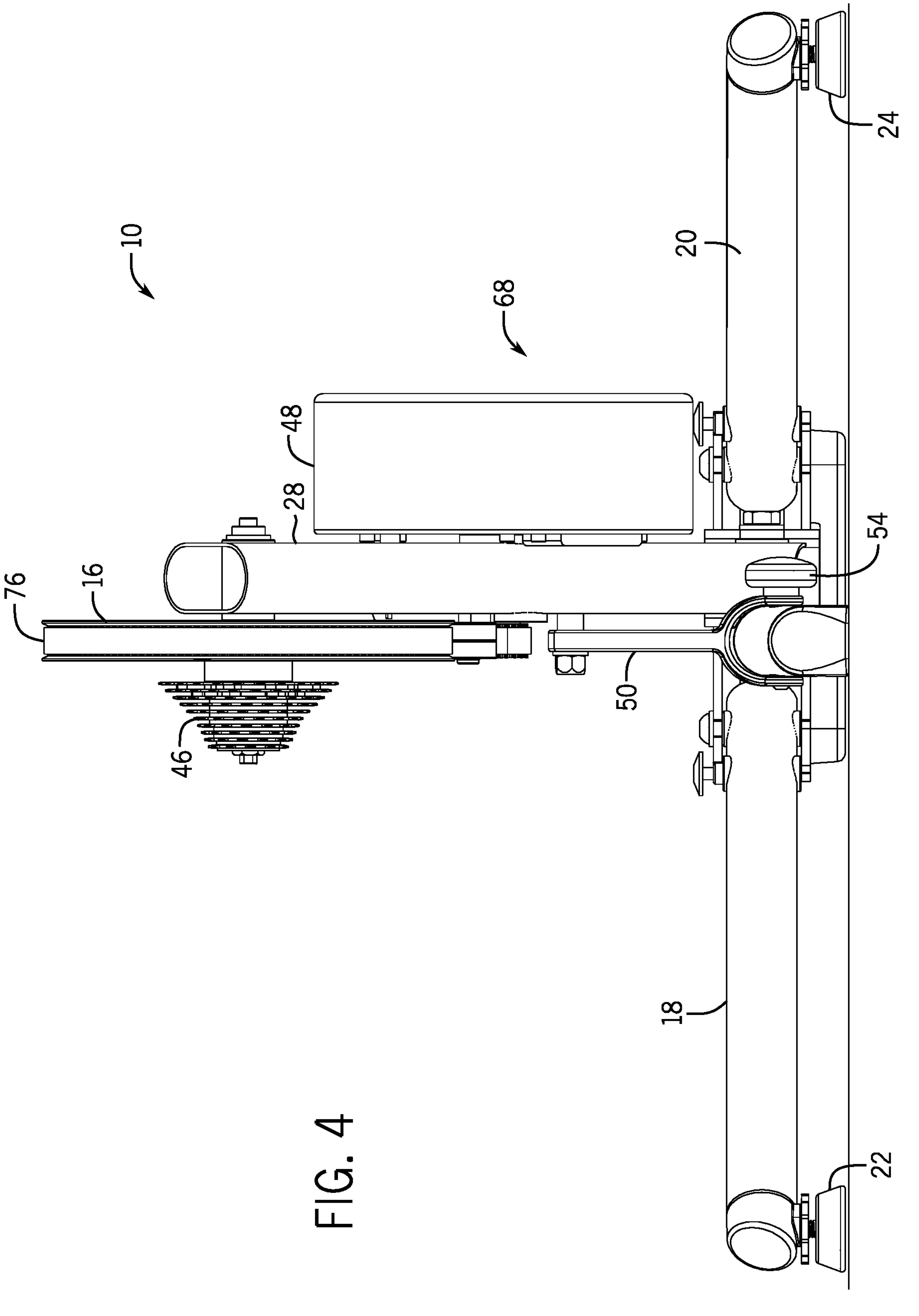
FIG. 4 is a rear view of the trainer of FIG. 1.
Figure 5:
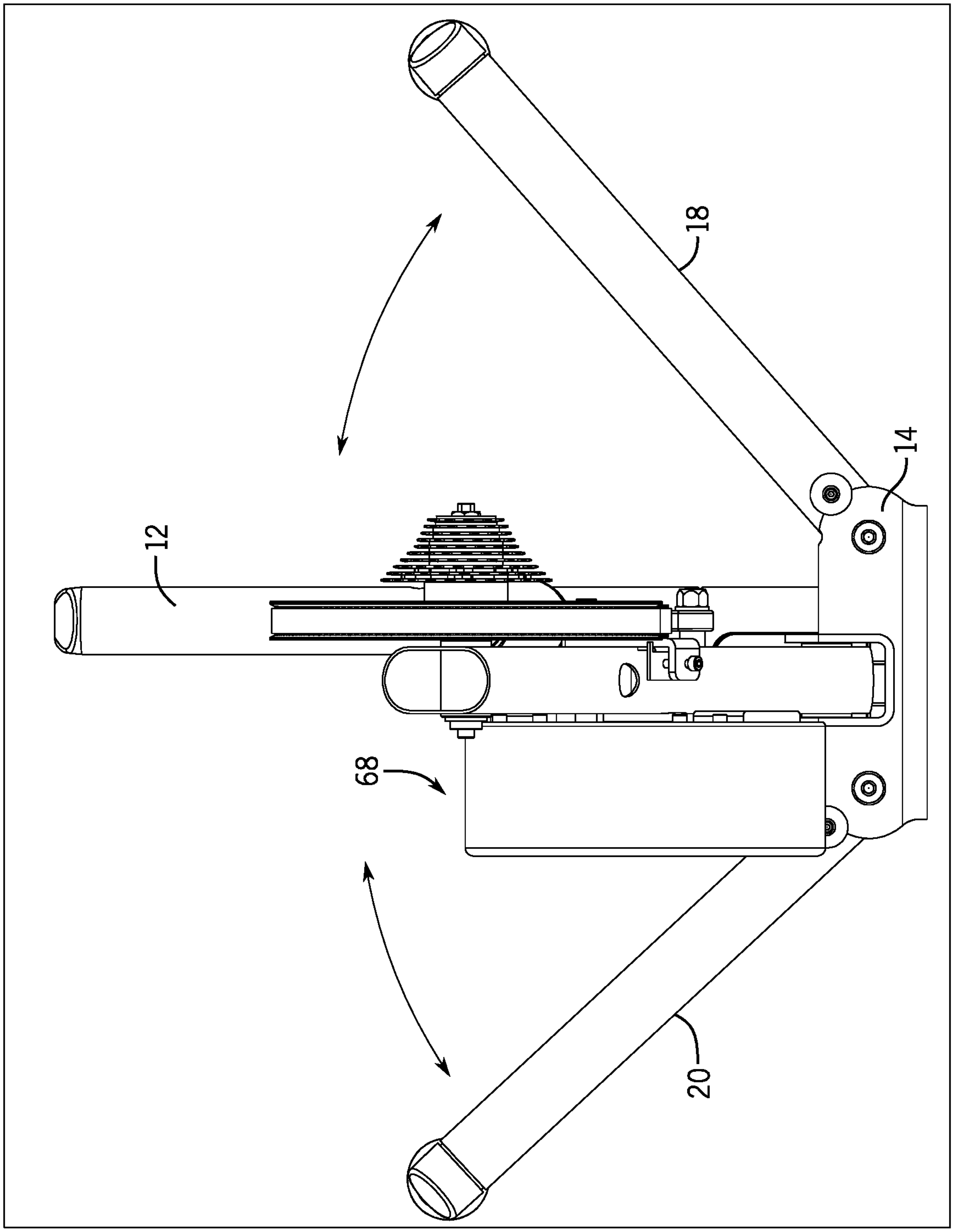
FIG. 5 is a top view of the trainer of FIG. 1.
Figure 6:
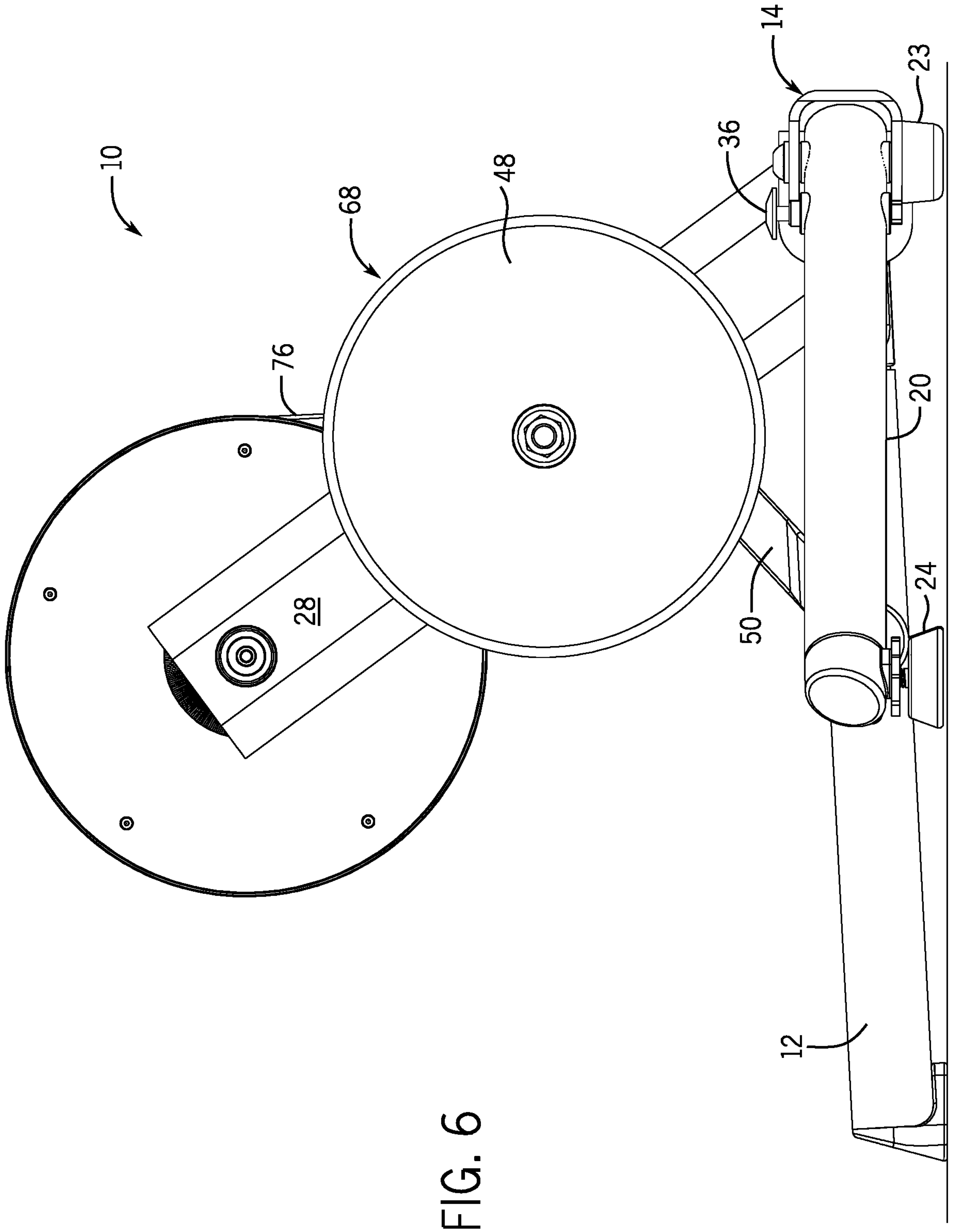
FIG. 6 is a right side view of the trainer of FIG. 1.
Figure 7:
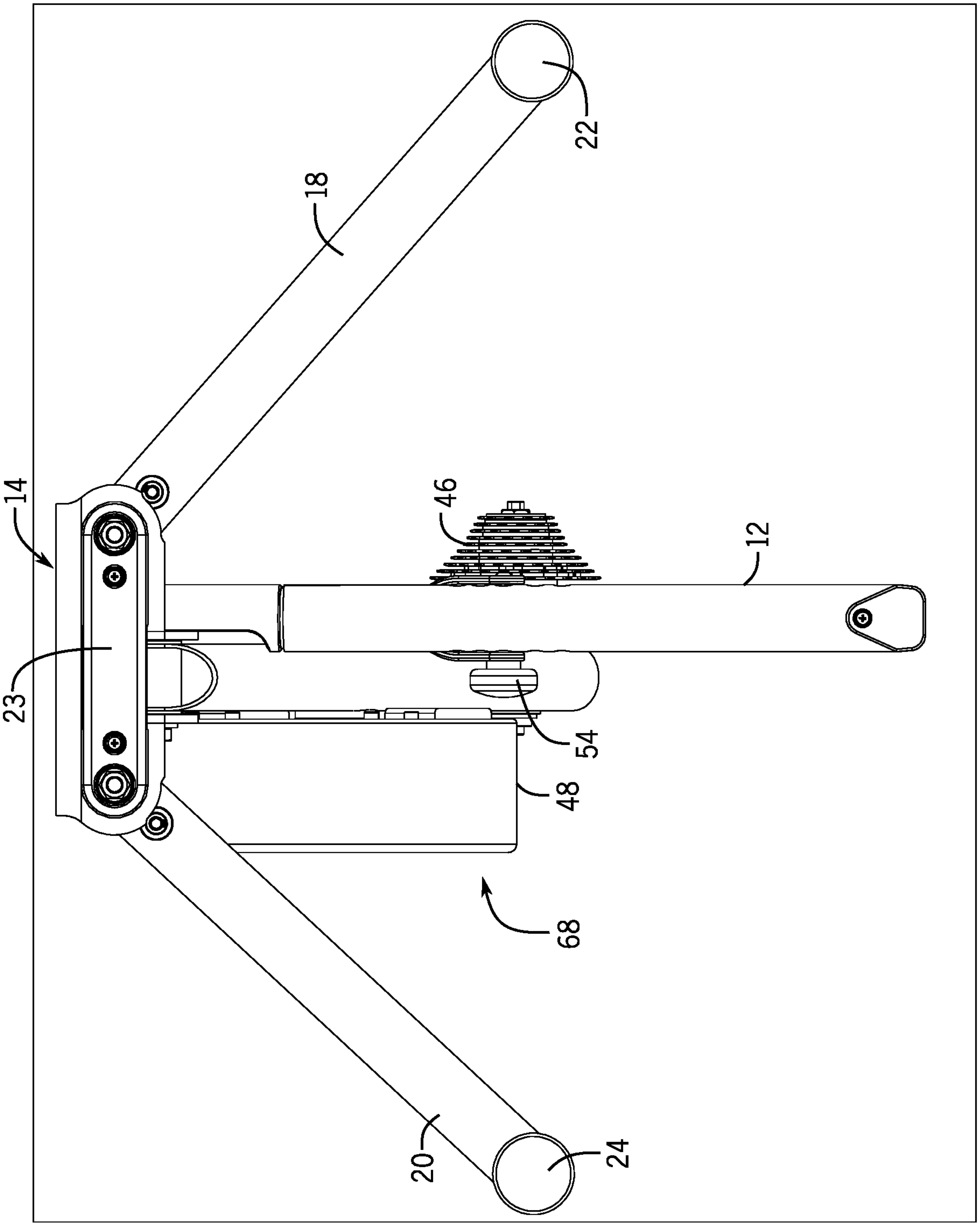
FIG. 7 is a bottom view of the trainer of FIG. 1.
Figure 8:
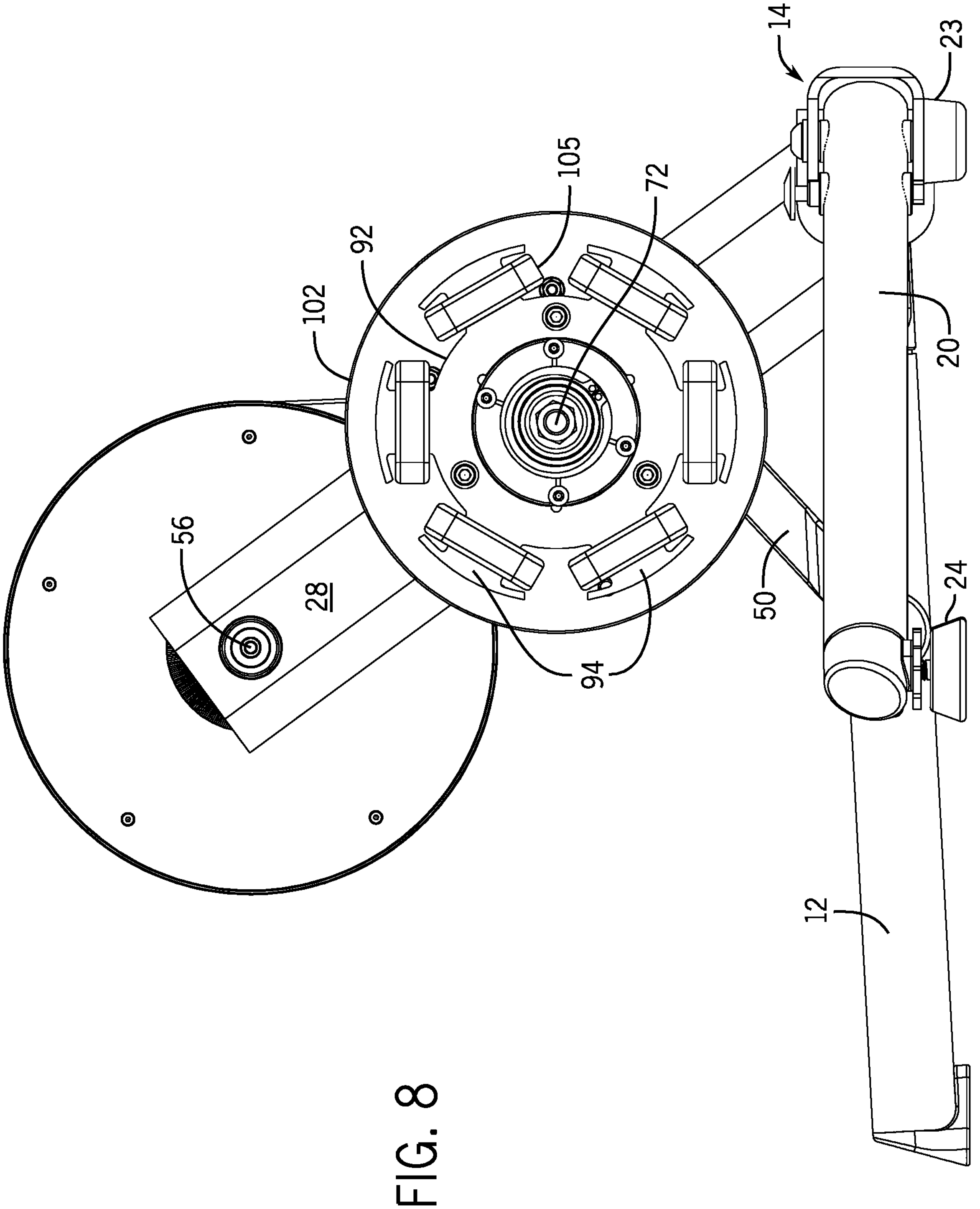
FIG. 8 is a right side view of the trainer of FIG. 1, with an outer flywheel portion of a flywheel assembly removed to illustrate internal components of the flywheel.

Distal the first and second pivotal connections with the bracket 14, first and second pads 22, 24 are coupled at the outer end of each of the respective first and second legs 18, 20. Additionally, an elongate pad 23 is coupled to a bottom side of the bracket 14. Each pad 22, 24 and leg 18, 20 functions in the same manner so the first pad 22 at the outer end of the first leg 18 is discussed in detail. Referring to FIG. 3, the pad 22 is adjustably mounted to the leg 18 to allow the trainer 10 to be leveled, transverse the longitudinal centerline, and thereby maintain the mounted bicycle in a side-to-side level orientation. While other alternatives are possible, in the example illustrated in the figures, the leg 18 defines a threaded aperture and the pad 22 is coupled with a threaded member that engages the aperture. An adjustment collar 26 is coupled with the threaded member such that rotation of the collar 26 causes the pad 22 to move vertically relative to the leg 18.

A main frame member 28 extends vertically and rearwardly from the mounting bracket 14. The plane in which the main frame member 28 pivots is oriented at about a right angle relative to the plane in which the legs pivot. Accordingly, in one possible implementation, a bubble level 30 (shown in FIG. 2) is mounted within a recess in the main frame member 28. The bubble level 30 is mounted parallel with the plane in which the legs 18, 20 pivot. Thus, when the bubble level 30 reads level, the main frame member 28 is vertical or otherwise perpendicular to the plane defined by the legs 18, 20. In such an orientation, any bicycle mounted to the axle will be straight, and not lean to the left or right. With such an integrated level, a user can quickly and easily adjust the pads 22, 24 on one or both legs and thereby level the trainer 10, even on an uneven or slanted surface.

Figure 1A:
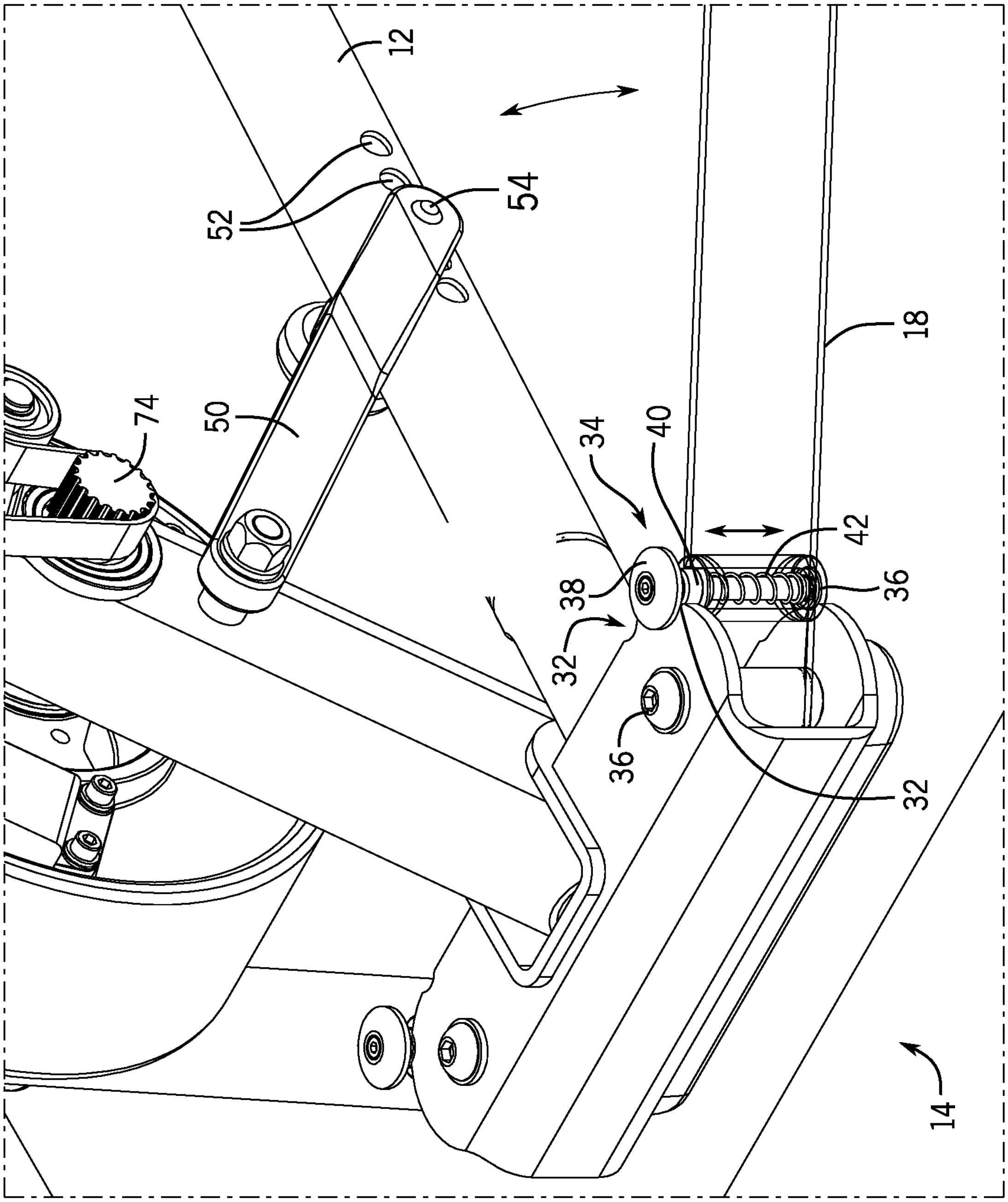
FIG. 1A is a zoom area view of a portion of the trainer illustrated in FIG. 1A with a first leg of the trainer made transparent so as to illustrate internal components of a retention assembly that is used to lock the leg in a folded or use position.

Referring to FIG. 1A, adjacent each pivot, the front mounting bracket 14 defines an upper arcuate surface with a pair of notches 32 corresponding to an inwardly pivoted configuration of the leg 18, 20, and an outwardly pivotal (as shown) configuration of the leg 18, 20. A retention assembly 34 is coupled with the leg adjacent the upper arcuate surface and notches 32. The retention assembly 34 includes a spring loaded pin 36 with a user engageable head 38. The pin 36 supports a collar 40 that fits within the notches 32. By depressing the pin 36 against the spring 42, the collar 40 moves downwardly into a recess defined in the leg 18, 20 and disengages the respective notch 32. The leg may then be pivoted inwardly or outwardly, and when the user releases the pin 36, the spring 42 nudges the pin 36 upward causing the collar 40 to engage one of the respective notches 32 securing the leg 18, 20 in the desired position.

Figure 2:
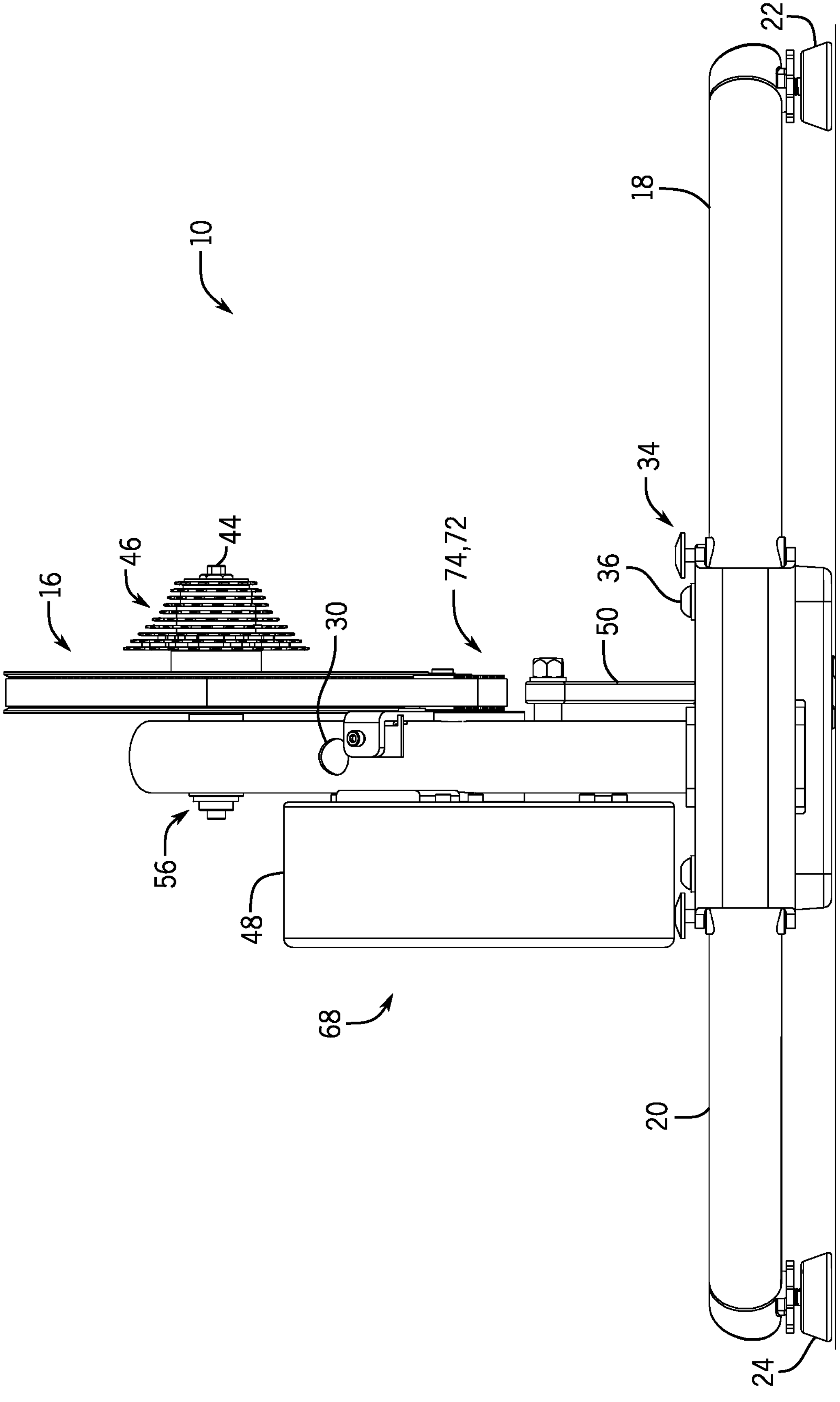
FIG. 2 is a front view of the trainer of FIG. 1.

Referring to FIGS. 1 and 2, among others, the pulley 16, an axle 44, a cassette 46, a flywheel 48 and other components are supported by the main frame member 28 extending rearwardly and upwardly from the pivot mount bracket 14. The main frame member 28 is pivotably mounted to pivot mount bracket 14 to adjust the height at which the bicycle is supported. Thus, the main frame member 28 may be pivoted upwardly or downwardly relative to the orientation illustrated in the drawings to vertically adjust the height of the bicycle.

A height adjustment bracket 50, as seen up-close in FIG. 1A, is coupled between the main frame member 28 and the center leg 12 to maintain the main member 28 in a desired height. More specifically, at a rearward end, the adjustment bracket 50 includes a u-shaped portion defining opposing members that are arranged to either side of the center leg 12. Each member defines an aperture. The center leg 12 defines a plurality of apertures 52 along its length that are configured to receive a pin 54 that extends through the member apertures and one of the pluralities of apertures 52 in the center leg 12. In the illustrated example, the aperture opposite the portion of the pin, including a handle portion, is threaded. Similarly, the end of the pin, opposite the handle, is also threaded. By fixing the bracket 50 with one of the plurality of apertures 52 along the center leg 12, a user can raise or lower the main member 28 thereby raising or lowering the axle 44 to which the bicycle is mounted.

Other mechanisms are also possible to secure the bracket 50 to the center leg 12, as well as to elevate the center leg 12. For example, a telescoping vertical member pivotally coupled with the main frame member 28 might be used to adjust the height of the main member 28 and fix the height at a certain location by fixing the amount of telescoping. The height adjustment bracket 50 might include one or a pair of pop pins 37 to secure the u-bracket relative to the apertures in the center leg.

Figure 2A:
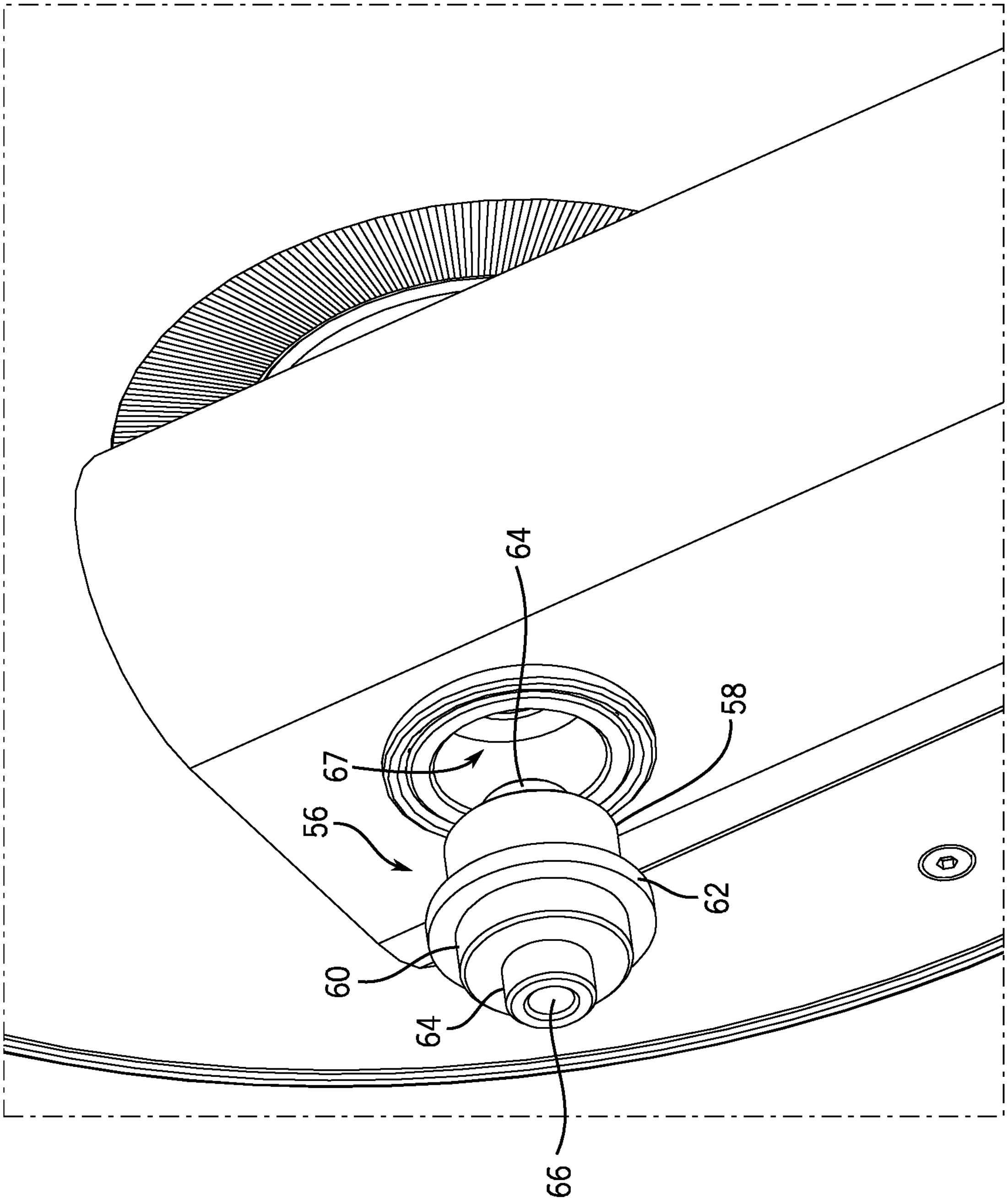
FIG. 2A is an isometric view of a two-sided spacer that may be employed to mount different size and types of bicycles to the trainer.

Turning now to mounting a bicycle to the trainer 10, and referring to FIG. 2A, the trainer 10 can be converted for use with bicycles having different sized wheels chain stay, dropout, and/or axle spacing, such as differences in width between typical mountain bikes and road bikes. Generally speaking, road bikes have narrower axle spacing (and wheels and rims) compared to the axle spacing on mountain bikes. In some implementations, such as shown in FIG. 2A, the trainer 10 may include a two-sided axle spacer 56 that allows a user to convert the trainer 10 between use with a road bike and mountain bike, or other sizes, without use of a tool and otherwise very simply. The trainer 10 includes the two-sided spacer 56 that is at the end of the axle 44 (opposite the cassette 46), and which can be reversed depending on what type of bicycle (and its hub) that is being mounted on the trainer. A quick release (not shown) extends through the reversible spacer 56 to hold it, as well as the bicycle, in place and on the trainer 10 when the trainer 10 is in use.

Referring still to FIG. 2A, the two-sided spacer 56 includes a relatively longer cylindrical spacer section 58 adjacent a relatively shorter spacer section 60. The spacer sections 58, 60 are separated by a collar 62 that ensures correct positioning of the spacer 56 by limiting a depth that the spacer 56 is received within an aperture 67 defined in the main member 28. Extending from each spacer section 58, 60 is a dropout mount 64 that is dimensioned to be received in a dropout on a bicycle. The bicycle dropout may be mounted directly on the dropout mount 64, both of which are secured to the trainer 10 by the quick release axle. As shown, an aperture 66 is defined through the spacer 56, which receives the quick release axle. The aperture 67 in the main frame 28 is sized to receive the shorter and longer spacer sections 58, 60. The depth of the aperture 67 in the frame is at least as deep as the longer of the spacer sections 58, 60. Thus, both the longer and the shorter spacer sections 58, 60 fit within the aperture 67. Additionally, by inserting the spacer sections 58, 60 into the frame aperture 67, the spacer 56 is securely held on the bicycle frame. Thus, when a user is mounting a bicycle, the spacer 56 is held securely on the frame making bicycle mounting easier for the rider. In the orientation shown, when the spacer 56 is inserted in the main frame aperture 67, the shorter spacer section 60 extends from the main frame 28 and the collar 62 abuts the main frame 28. The dropout from a road bike being mounted on the trainer 10 is placed over the dropout mount 64 extending from the shorter section 60. To mount a mountain bike, the spacer 56 is reversed so that the relatively longer spacer section 60 extends from the main frame 28. Similarly, the collar 62 abuts the main frame wall thereby ensuring that the spacer 56 is properly positioned, and the mountain bike dropout is mounted on the dropout mount 64 extending from the relatively longer spacer section 58.

As introduced above, the main frame member 28 supports the flywheel assembly 68. Unlike conventional flywheel assemblies, the present assembly 68 is particularly configured to allow for power measurement. Generally speaking, the trainer 10 determines the amount of power being expended by the rider while pedaling by measuring the torque on a member of the flywheel assembly 68. Torque may be measured through a strain gauge 70 mounted on the member, and the torque on the member may be translated into a wattage measurement reflective of the amount of power expended by the rider.

More particularly and referencing FIGS. 1, 8-10, and others, the flywheel assembly 68 along with the components used for measuring power are now discussed in more detail. The flywheel assembly 68 includes an outer relatively heavy flywheel member 48 that is configured to rotate relative to a plurality of internal components that are substantially fixed relative to the outer rotatable flywheel member 48. The flywheel member 48 is coupled with a flywheel axle 72 that communicates through and is rotatably supported by the main member 28. The flywheel axle 72 also includes a second flywheel pulley 74 that rotates in conjunction with the first flywheel pulley through a belt 76. The belt 76 interconnects the pulleys 16, 74 and may include teeth that correspond to teeth on the first and second pulleys 16, 74. In the depicted arrangement, a user's pedaling force is translated through the belt from the first larger pulley 16 to the second pulley 74 supported on the flywheel axle 72, which in turn causes the flywheel member 48 to rotate.

A belt tensioner assembly 78 is mounted on the main frame 28 and is used to mount and remove the belt 76 to and from the pulleys 16, 74, and also to adjust the tension of the belt 76 for proper function. The belt tensioner bracket 80 is generally L-shaped and supports a tensioner wheel 82 on the end of a longer side of the bracket. The belt 76 is positioned around the tensioner wheel 82, and by adjusting the tensioner wheel 82 fore and aft, the tension on the belt 76 can be increased or decreased. Adjacent the tensioner wheel 82, the bracket 80 defines an elongate aperture 84 through which is positioned a locking bolt 86 mounted to the main frame 28. When the bracket 80 and tensioner wheel 82 are positioned in the appropriate fore/aft position, the bolt 86 is tightened thereby locking the bracket 80 and wheel 82 in place. Finally, on a short portion of the bracket 80, an adjustment screw 88 is connected with a front face of the main frame 28 and through a threaded adjustment aperture in the short portion of the bracket 80. While the bolt 86 is loosened, the adjustment screw 88 may be used to move the bracket 80 fore or aft.

The flywheel member 48 is fabricated partially or wholly with a ferrous material or other magnetic material. The fixed internal components of the flywheel assembly 68 may include a plurality of electromagnetic members 105 mounted on a core 92, and provide a magnetic flywheel brake. In some arrangements, the magnetic brake may be computer controlled thereby dynamically adjusting the braking force to simulate any possible riding profile. In the illustrated example, the core 92 defines six T-shaped portions 94 extending radially from an annular main body. A conductor 98, such as copper wiring, is wound around a neck of the T-shaped portions 94 between the upper portion of the T and the annual or core 92. The wire may be continuous so that a consistent current flows around each T-shaped portion 94, core 92; and a consistent and electromagnet force is generated uniformly around the core 92. Collectively, the T-shaped portions 94 and wound wiring can generate a magnetic field that magnetically couples with the flywheel member 48. The trainer includes a processor 100 and associated electronics that allow for the control of a current through the wires thereby inducing a controllable magnetic field from the T-shaped portions 94. Since the flywheel member 48 is magnetic, by varying the strength of the magnetic fields, the amount of braking force resisting rotation of the flywheel 48 may also be varied.

Turning now more specifically to the mechanisms by which power is measured, the various rotationally fixed portions of the flywheel assembly 68 are connected directly, or indirectly, to a mounting plate 102 adjacent the main member 28. The mounting plate 102 is rotatably mounted to a tubular member supported by the main frame member 28. The flywheel axle 72 extends through the center of the tubular member; therefore, the flywheel member 48 is coaxial with the mounting plate 102. While the mounting plate 102 is rotationally mounted, it is rotationally fixed by a torque bracket 106 connected between the main frame member 28 and the mounting plate 102. Generally speaking, a strain gauge assembly 70 is mounted on the torque bracket 106. Because the torque bracket 106 couples the main frame member 28 to the mounting plate 102, when rotational forces are transferred between the flywheel member 48 and the rotationally fixed components (e.g., magnets) 105, those forces exert a torque on the torque bracket 106 which is detected by the strain gauge assembly 70. Without the torque bracket 106, the entire flywheel assembly 68 would rotate about the flywheel axle 72 rather than only the external flywheel member 48 that is fixed to the flywheel axle 72. Thus, the pedaling force exerted by the rider translates through the flywheel assembly 68 and is measured at the torque bracket 106 that resists the rotational torque exerted on the flywheel 48.

Figure 9A:
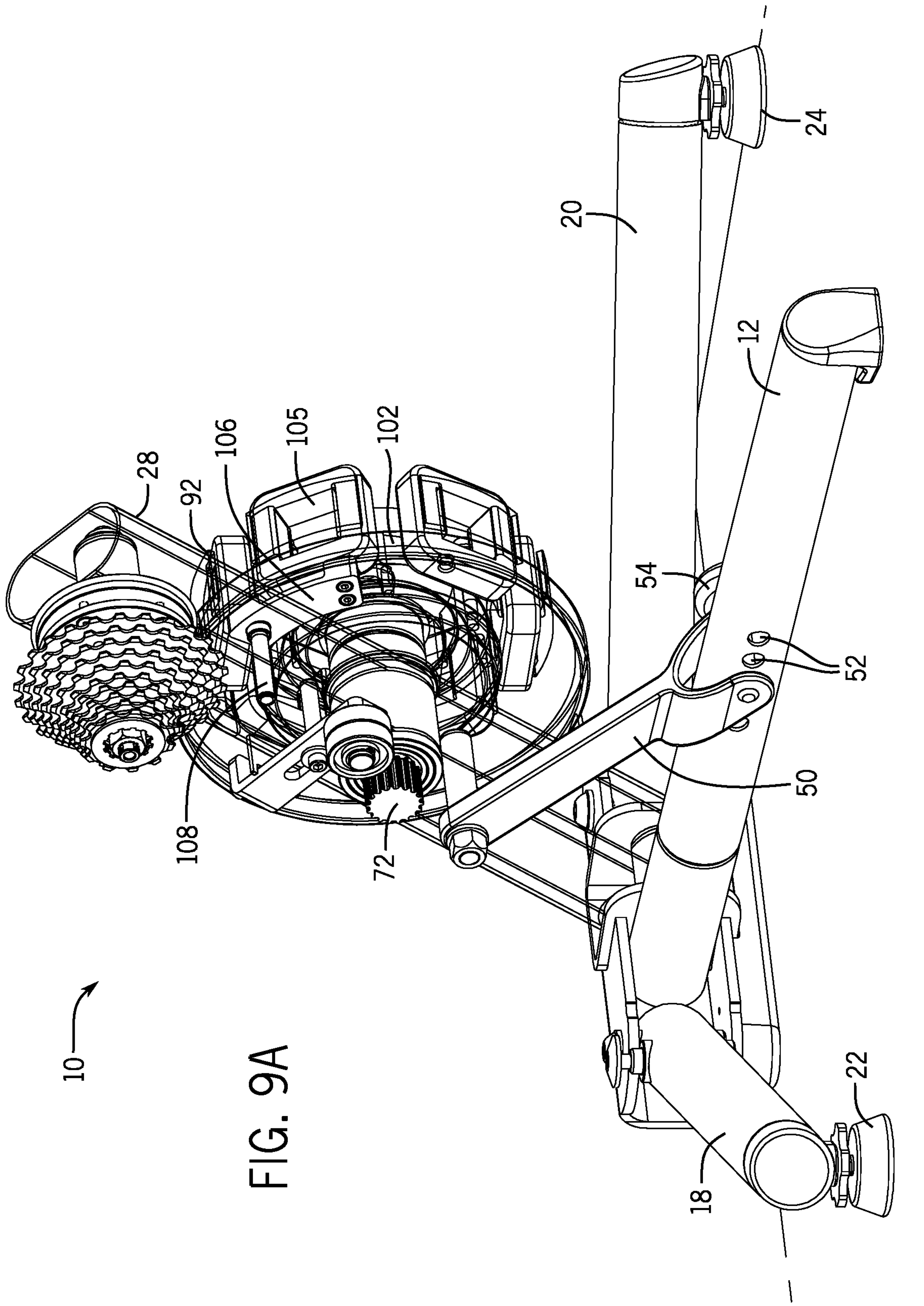
FIG. 9A is a first rear isometric view of the trainer with several components hidden or transparent to better illustrate internal components of the flywheel assembly that fix the electromagnetic components and others in place relative to the spinning flywheel portion and also provide for power measurement.
Figure 9B:
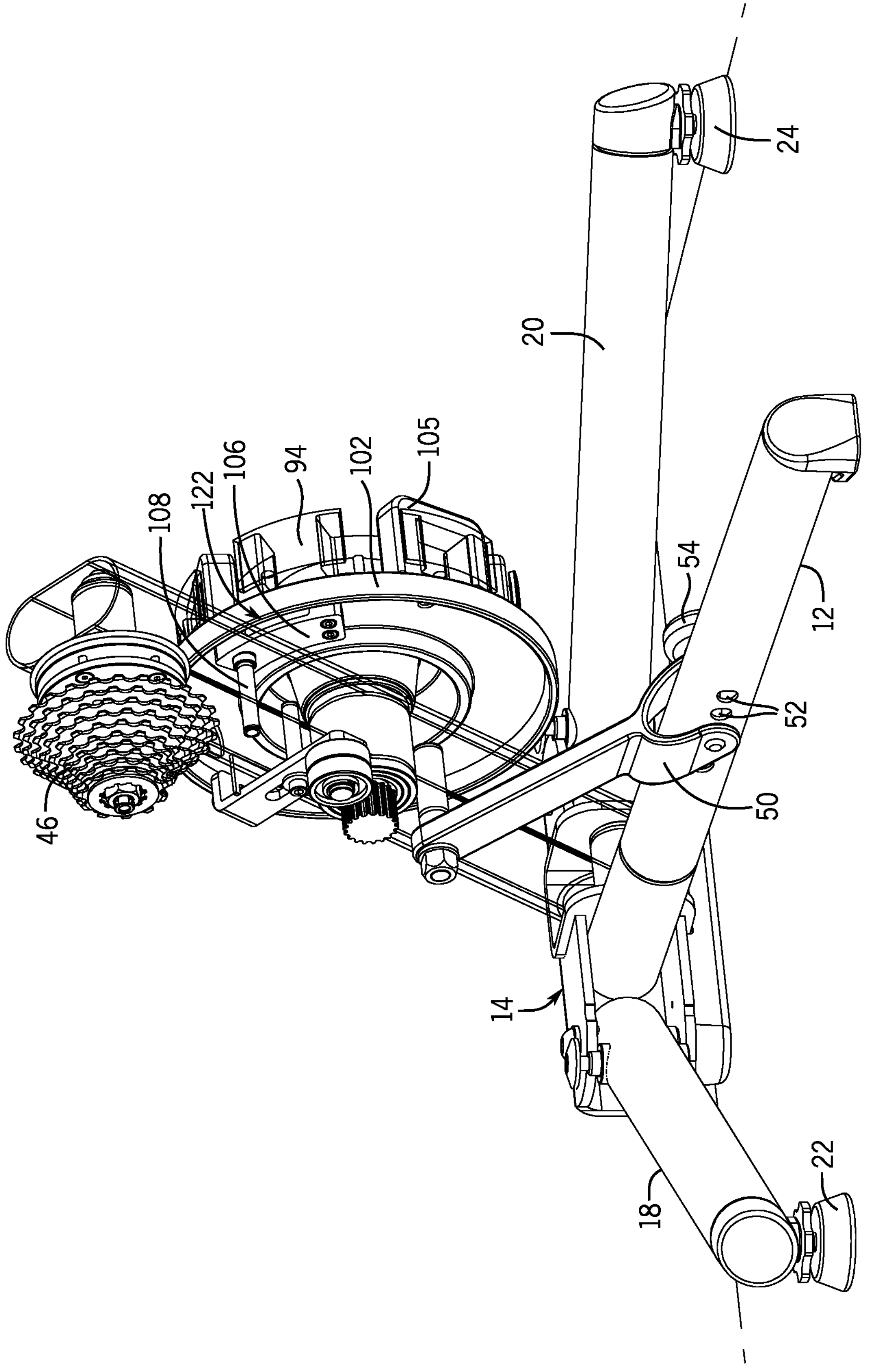
FIG. 9B is a second rear isometric view of the trainer with several components hidden or transparent to better illustrate internal components of the flywheel assembly that fix the electromagnetic components and others in place relative to the spinning flywheel portion and also provide for power measurement.
Figure 10:
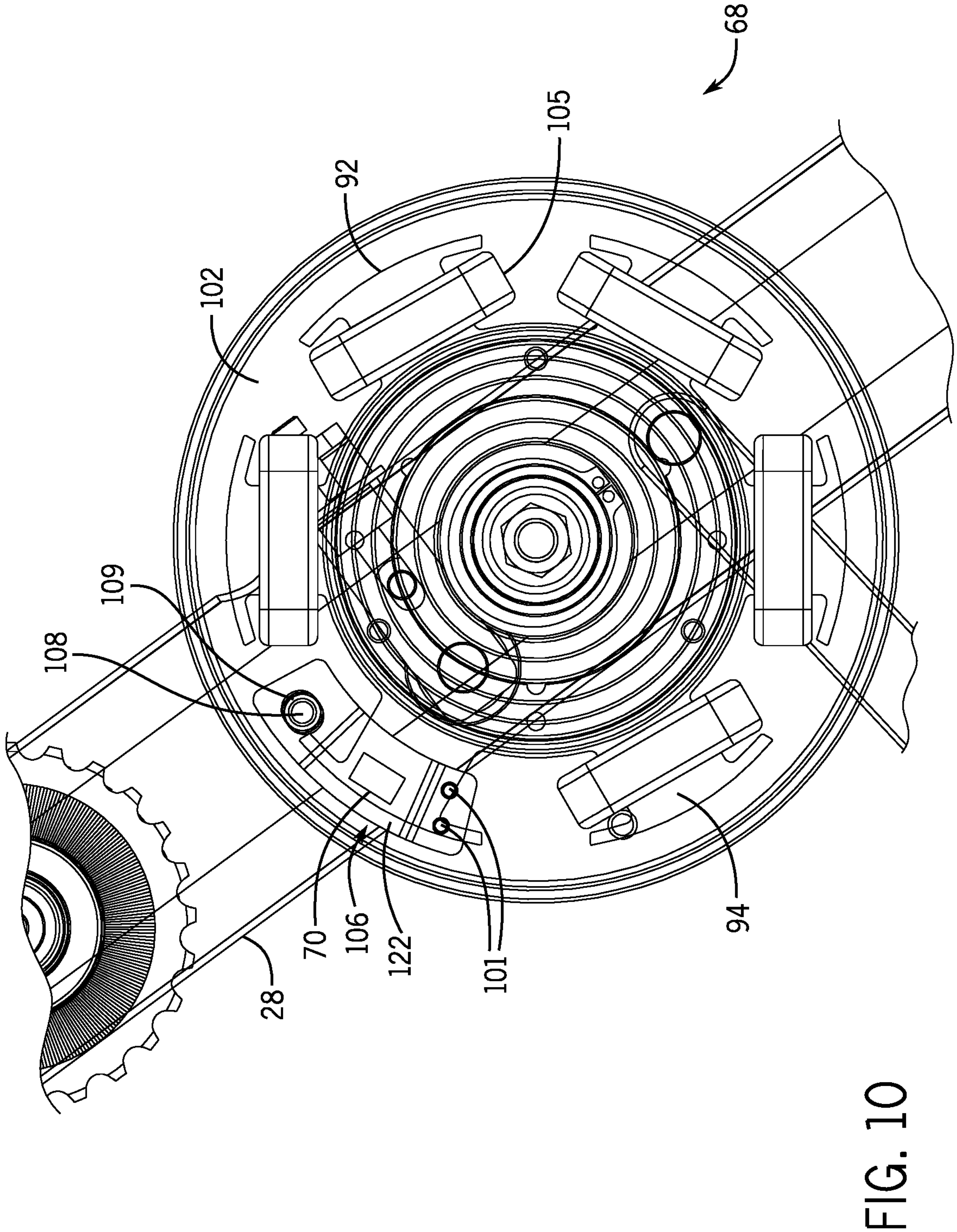
FIG. 10 is a right side view of the trainer with several components hidden or transparent to better illustrate internal components of the flywheel assembly that fix the electromagnetic components and others in place relative to the spinning flywheel portion and also provide for power measurement.
Figure 11:
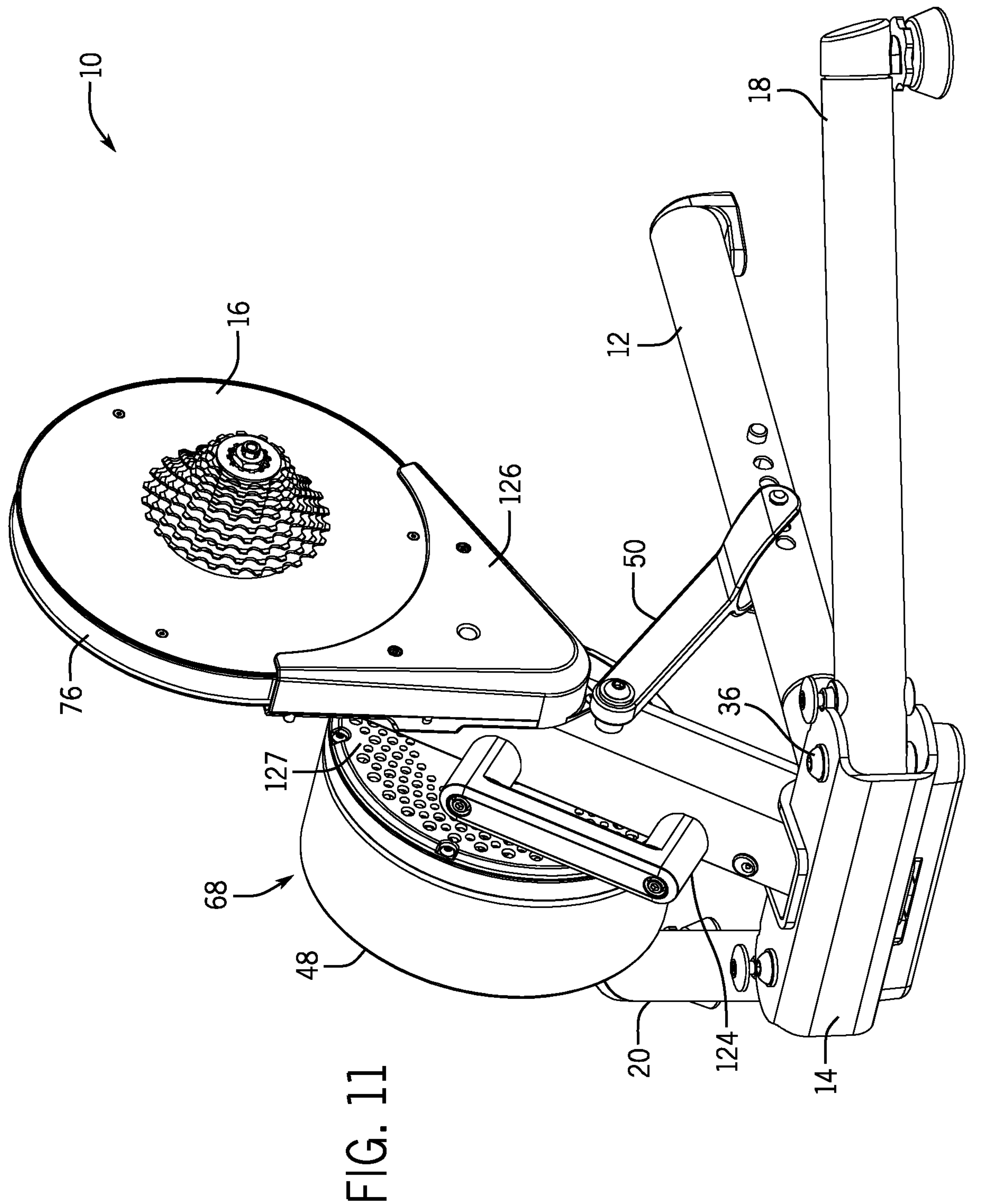
FIG. 11 is an isometric view of a second trainer conforming to aspects of the present disclosure.

More specifically and referring primarily to FIGS. 9A, 9B, and 10, the torque bracket 106 is arcuate and defines a radius generally along a matching radius of the mounting plate 102. A mid portion, between each end, of the torque bracket 106 is machined and has a strain gauge assembly 120 mounted thereon. One end of the torque bracket 106 defines an aperture through which in a pin 108 extends, the pin 108 is fixed with the main frame 28. A bushing 109 may support the pin 108 with the torque bracket aperture. A bushing 109 may also be included at the main frame 28. In either case, at least one end of the pin 108 is floating within a bushing. Thus, the pin 108 resists the rotation of the flywheel 48. However, while the pin 108 may be fixed without any bushings 109, by using one or more bushing 109 or other equivalent mechanisms, no unwanted stresses or strains are placed on the pin 108. At an opposing end of the torque bracket 106, the torque bracket 106 is secured to the mounting bracket 102 by bolts 101 or otherwise secured to the mounting plate 102. Thus, the mounting plate 102 is rotatably fixed through a combination of the pin 108 fixed to the main member 28, the torque bracket 106 connected with the pin 108, and the torque bracket 106 coupled with the mounting plate 102. Accordingly, when the flywheel 48 mounted with the flywheel axle 72 is rotated by a user, the rotational force is translated to the flywheel mounting plate 102. The torque bracket 106, which is the only member resisting the rotational movement, deflects or is otherwise, placed in tension or compression. The strain gauge assembly 120 detects the deflection and that deflection is translated into a power measurement. The torque arm 106 may be positioned in other alternative locations between the flywheel 48 and some fixed portion of the trainer 10.

Figure 19:
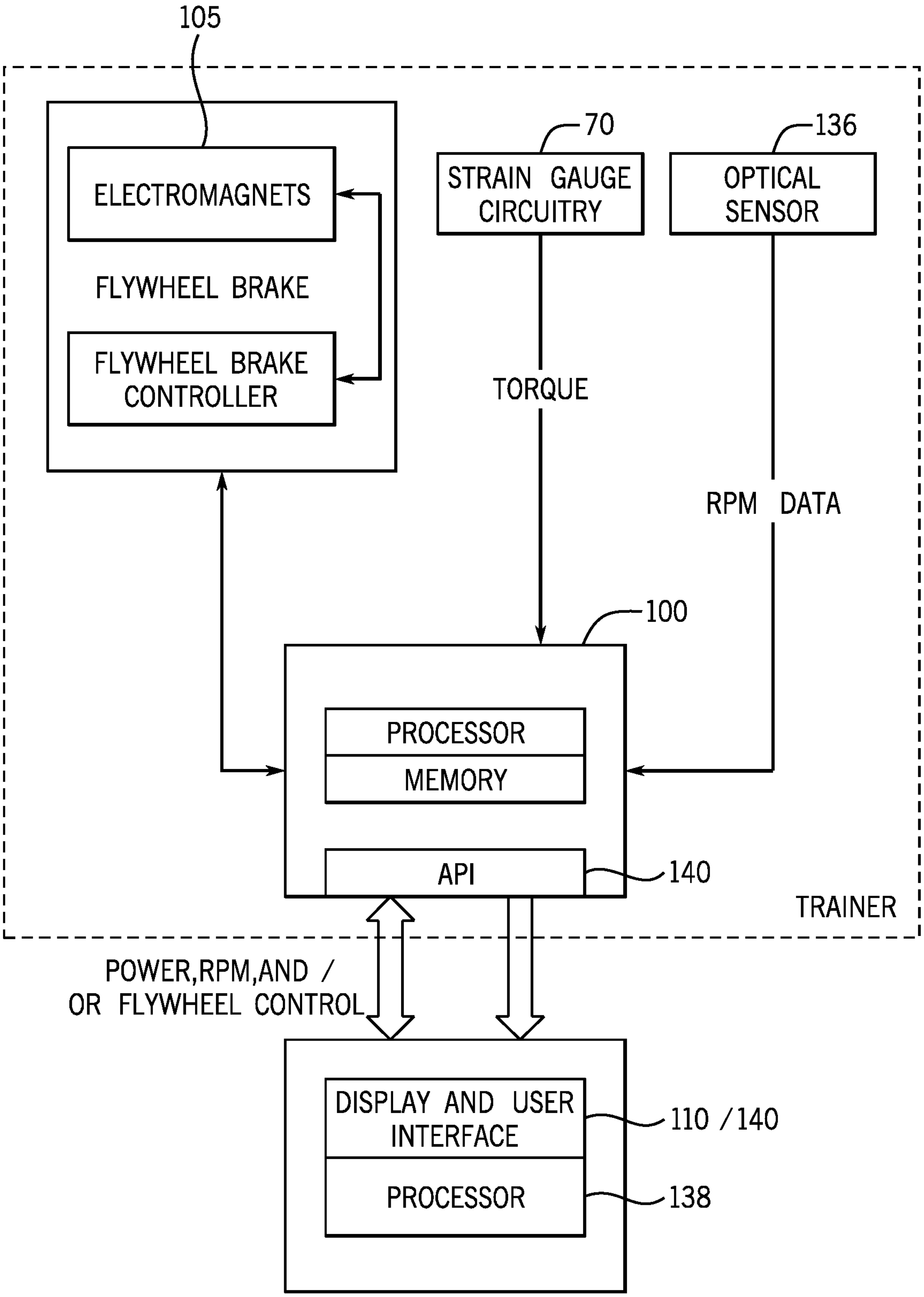
FIG. 19 is a block diagram of electrical components involved in obtaining torque data, calculating power data and controlling a magnetic brake of the flywheel, among others and shows components of a bicycle trainer system according to an example embodiment.

In one particular implementation, a display 110 is wirelessly coupled with a processor 100 that receives the strain gauge 70 measurement and calculates power. The display 110 may wirelessly receive power data and display a power value. The display 110, being wireless, may be mounted anywhere desirable, such as on a handlebar. The display 110 may also be incorporated in a wrist watch or cycling computer. The power data may also be transmitted to other devices, such as a smart phone, tablet, laptop, and other computing device for real-time display and/or storage. The display 110 and device that receives the strain gauge measurement and calculates power are discussed further in detail herein and is shown in FIG. 19.

In the example implementation shown herein, a power measurement device (e.g., processor 100) is mounted on an inner wall of the brake assembly portion of the flywheel 48. Alternatively, the power measurement device along with other electronics may be mounted within a cap 114 at the top of the mainframe member 28. The power measurement device may include a housing within which various power measurement, and other electronics are provided, including a Wheatstone bridge circuit 118 that is connected with the strain gauge assembly 120 on the torque bracket 106, and produces an output voltage proportional to the torque applied to the bracket 106. The output is sent to a processor 100, such as through wires or wirelessly, that is mounted within the end cap 114 or as part of the power measurement device, or otherwise. In various possible other implementations, the housing and/or the strain gauge assembly 120 may also be secured to other portions of the torque arm 106. The strain gauge assembly 120 may involve one or more, such as four, discrete strain gauges 70. When compression tension forces are applied to the gauges 70 the resistance changes. When connected in a Wheatstone circuit 118 or other circuit, a voltage value or other value proportional to the torque on the bracket 106 is produced.

Within the recessed portion of the torque arm 106, one or more strain gauges 70 may be provided. Generally speaking, the torque member 106 will be stretched to varying degrees under correspondingly varying forces. The strain gauges 70 elongate accordingly and the elongation is measured and converted into a power measurement. In one particular implementation, the strain gauges 70 are glued to a smooth flat portion of the torque member 106, such as the machined area 122. While a machined or otherwise provided recess 122 is shown, the power measurement apparatus may be applied to a bracket with little or no preprocessing of the bracket. The machined portion 122 helps protect the strain gauge from inadvertent contact and amplifies the strain measurement. The machined recess 122 is provided with a smooth flat bottom upon which the strain gauges 70 are secured. To assist with consistency between torque members 106 and thereby assist in manufacturing, a template may be used to apply the strain gauge 70 to the surface within the machined recess 122. Alternatively, the strain gauge 70 may be pre-mounted on a substrate in a desired configuration, and the substrate mounted to the surface. The side walls of the machined recess 122 also provide a convenient way to locate the housing.

FIGS. 11-17 illustrate an alternative trainer 10 conforming to aspects of the present disclosure. The trainer 10 functions and operates in generally the same manner as the embodiment illustrated in FIGS. 1-10, with some variations discussed below. Overall, the trainer 10 has a pivot mount bracket 14 at the front of the trainer 10. A first leg 18 and a second leg 20 are each pivotally mounted to the mount bracket 14. The legs 18, 20 may be folded out for use (as shown) or folded in for transportation and storage. A retention assembly 34 is positioned adjacent to each pivot to hold the respective leg in either position.

A main frame member 28 extends upwardly and rearwardly from the pivot mount bracket 14. Adjacent to the main frame member 28, a center leg 12 extends rearwardly from the main frame member 28. A pulley 16, rotatably mounted to the main frame 28 and to which an axle 44 and cassette 46 are coupled, is positioned above and in generally the same plane as the center leg 12. Therefore, when the bicycle is mounted on the axle 44 and its chain is placed around the cassette 46, the bicycle is positioned generally along the center of the trainer 10 which falls between the main frame 28 and center leg 12.

To adjust the height of the main member 28 and thereby adjust the height of the rear of any bicycle connected with the trainer 10, a height adjustment bracket 50 is pivotally mounted with the main member 28 and adjustably connected with the center leg 12. More particularly, the adjustment bracket 50 may be pinned at various locations along the length of the center leg 12, the further forward the bracket is pinned, the higher the main member 28 and the further rearward the bracket 50 is pinned, the lower the main member 28.

The trainer 10 may include a handle member 124 coupled with a front wall of the main member. A user may use the handle 124 to transport or otherwise lift and move the trainer 10. In the example shown, the handle 124 is bolted to the main member 28 at either end of the handle. Other handle forms are possible, such as a T-shaped member, an L-shaped member bolted at only one end to the main frame, a pair of smaller handles on either side of the main member as opposed to on the front facing wall of the main member as shown, a pair of bulbous protrusions extending from the sides of the main member and/or the front face of the main member 28, among others.

Figure 12:
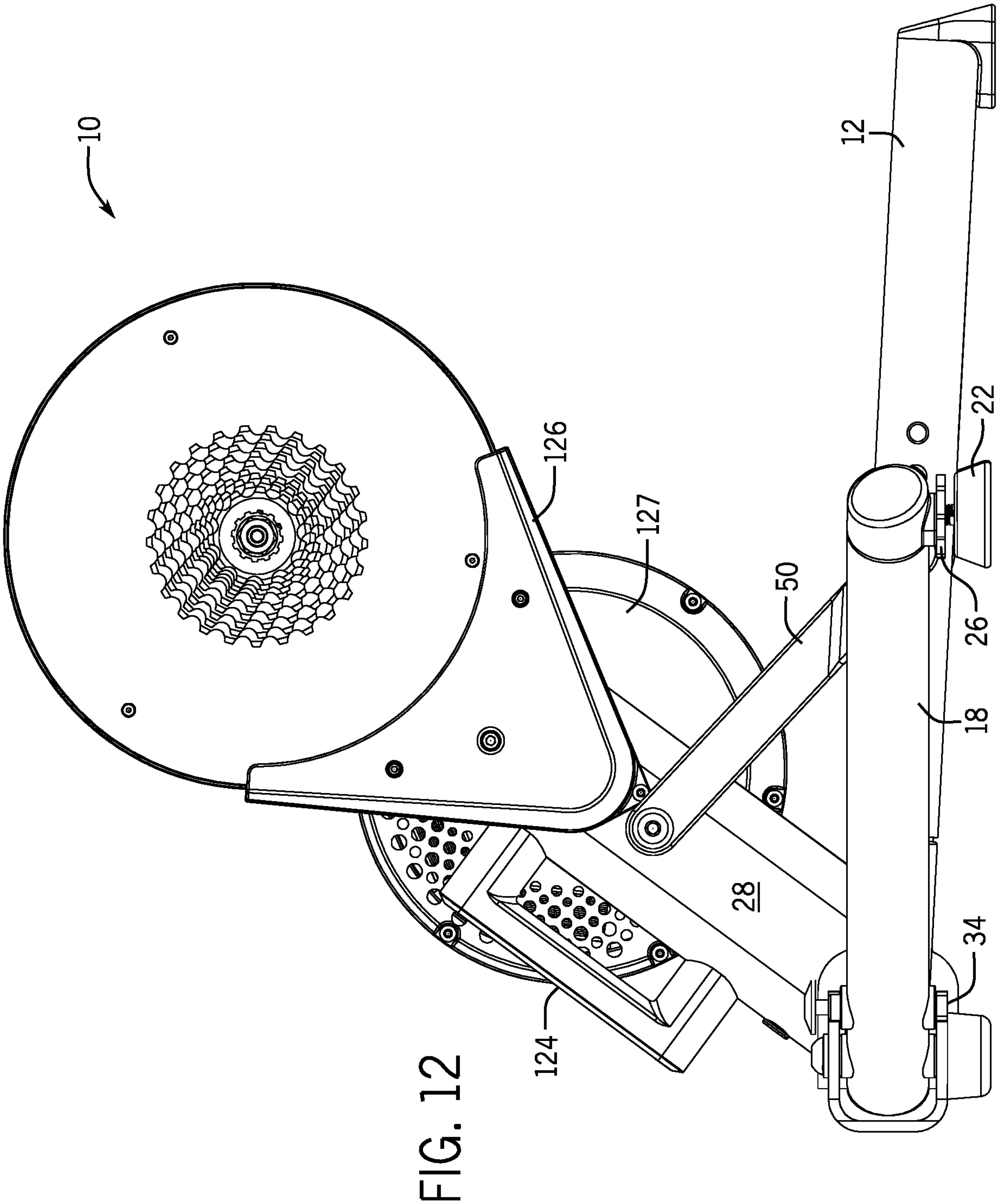
FIG. 12 is a left side view of the trainer shown in FIG. 1.
Figure 13:
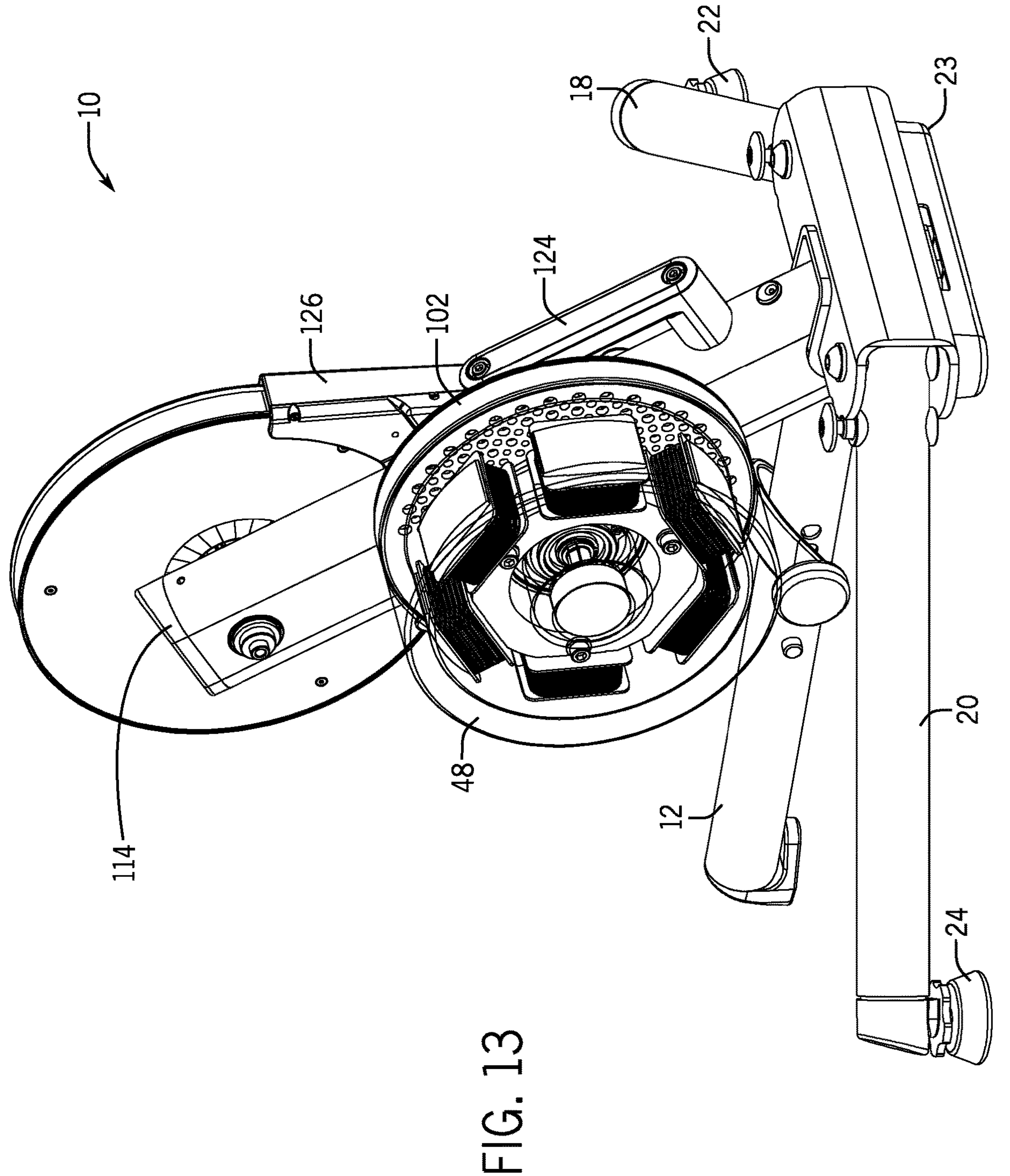
FIG. 13 is a front isometric view of the trainer shown in FIG. 1, the view of FIG. 13 providing the flywheel in transparent view to illustrate various components of an internal flywheel brake assembly.
Figure 14:
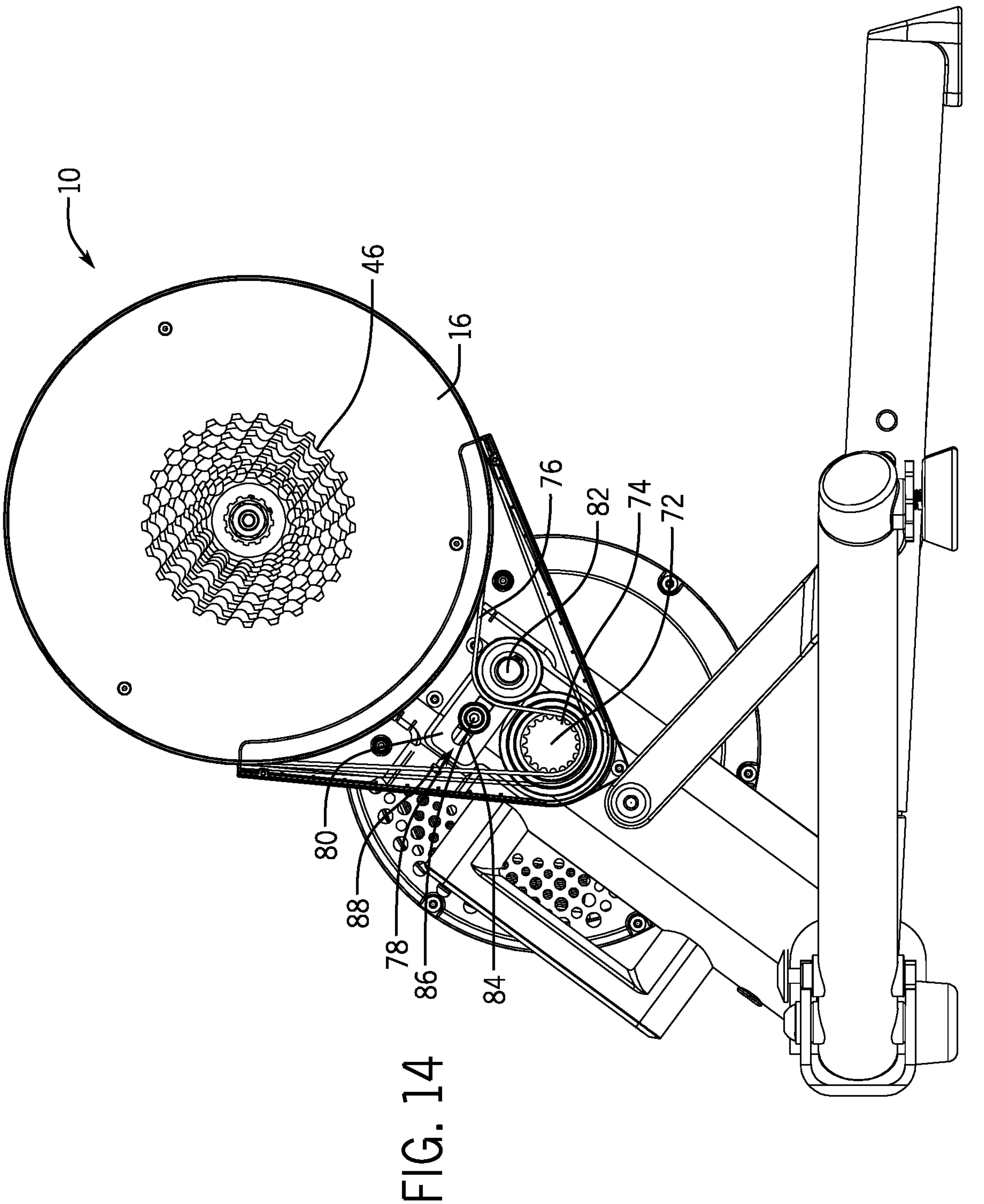
FIG. 14 is left side view of the trainer shown in FIG. 1, the view including a cover in transparent view to show various components otherwise hidden within the cover.

A generally triangular cover 126 is positioned over the belt 76, belt tensioner 78, flywheel axle 72, flywheel pulley 74, and other adjacent components, in an area between the pulley 16 and the flywheel pulley 74 at the flywheel axle 72. The cover 126 may be composed of a left side and right side that are bolted together. In one example, the left side (shown in FIG. 11) may be removed to provide access to the covered components. As seen in FIG. 12, the flywheel assembly 68 can additionally include a cover 127 that covers the internal components of the assembly 68. FIG. 14 illustrates the cover 126 in transparent view thereby illustrating what components are covered.

Figure 15:
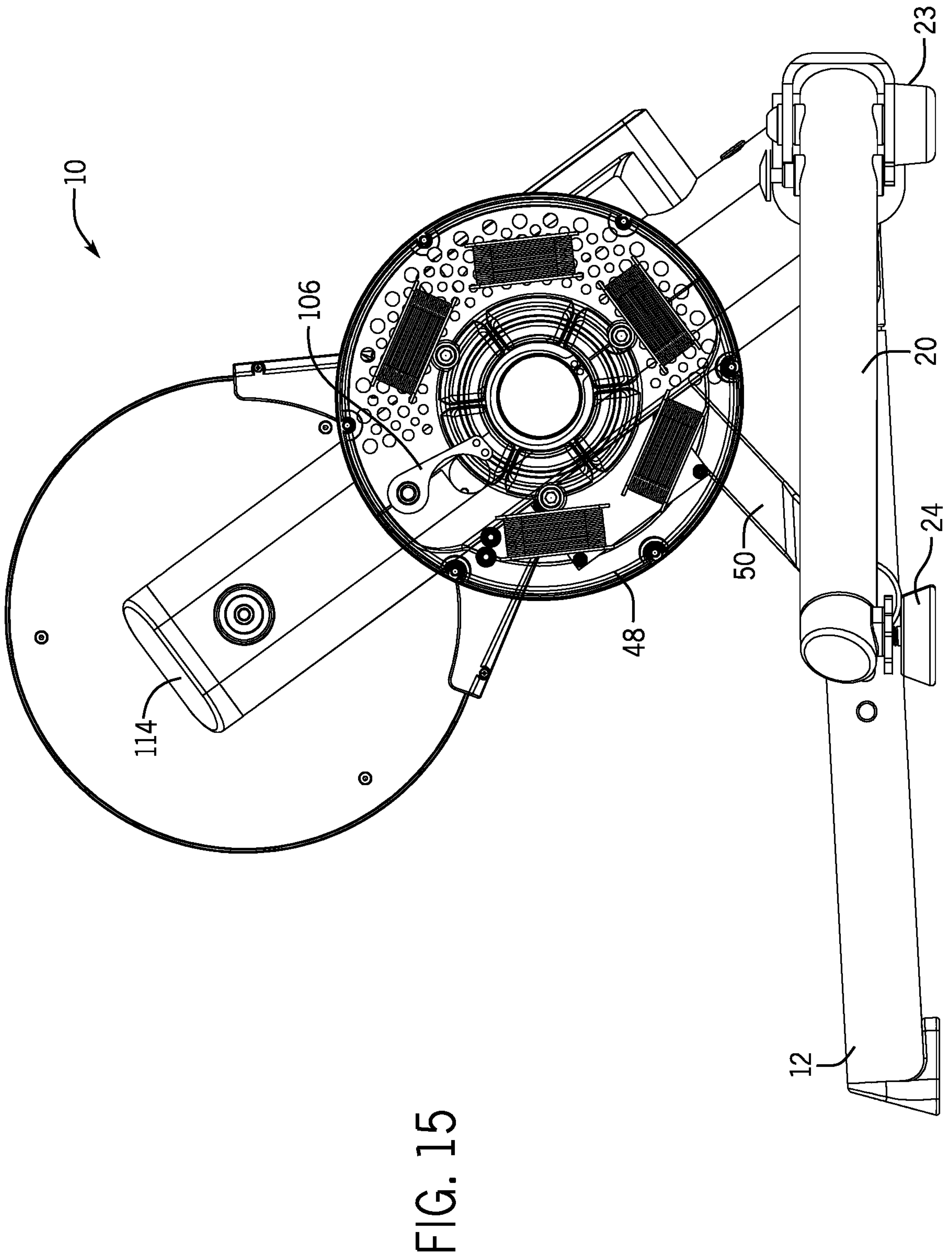
FIG. 15 is a right side view of the trainer shown in FIG. 1, the view including various flywheel assembly components hidden or in transparent view to illustrate a torque bracket coupling the magnetic brake with the frame.
Figure 16:
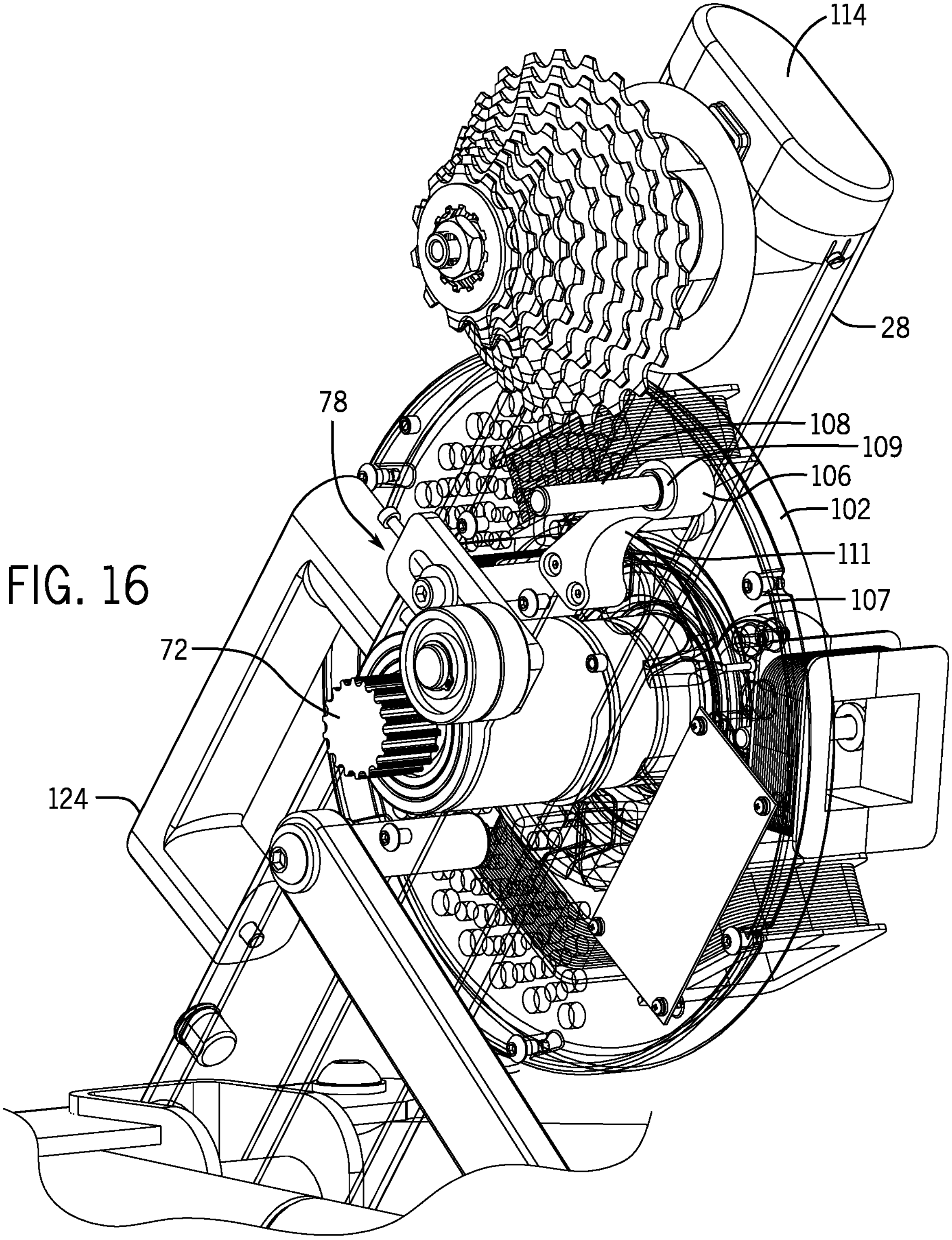
FIG. 16 is a rear isometric zoomed view of the flywheel assembly with various components hidden or transparent to illustrate the torque member and its relationship with the frame and the flywheel assembly.
Figure 17:
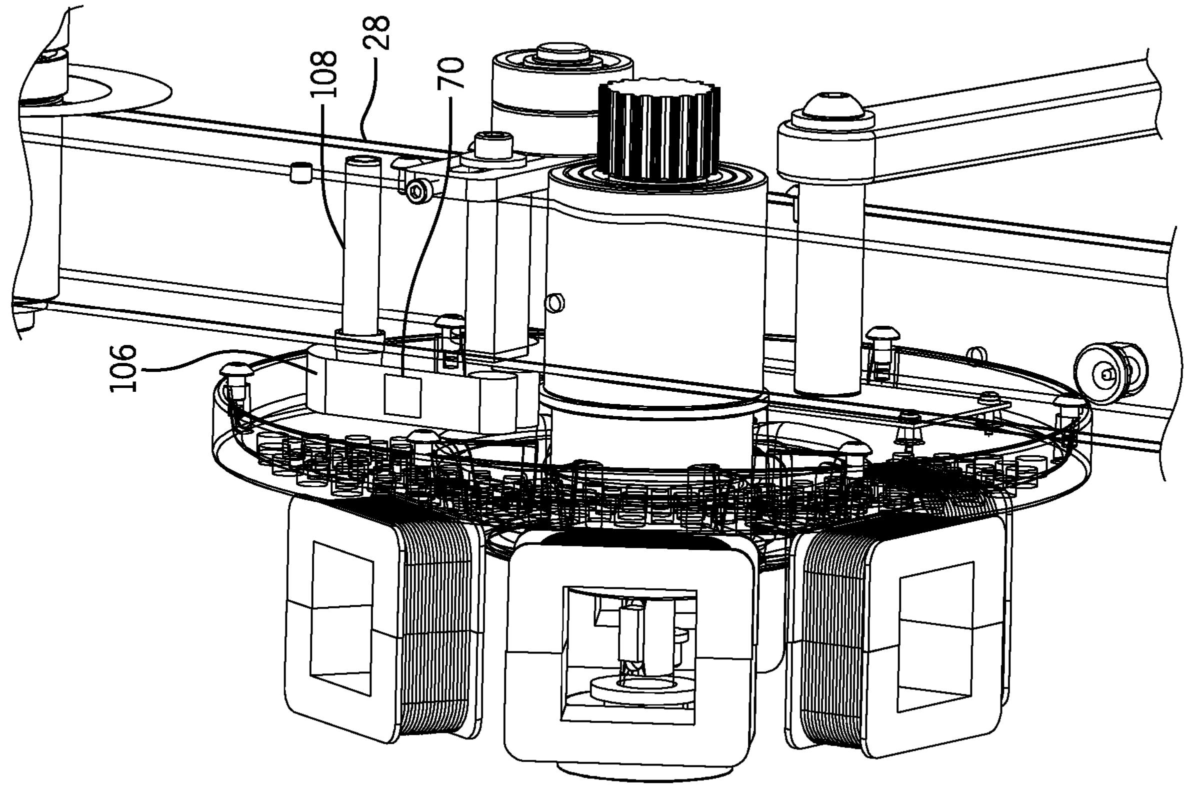
FIG. 17 is a front isometric zoomed view of the flywheel assembly with various components hidden or transparent to illustrate the torque member and its relationship with the frame and the flywheel assembly.

Referring now specifically to FIGS. 15-17, a torque bracket 106 is coupled between a flywheel mounting plate 102 and the main member 28. A strain gauge 70 is mounted on the torque bracket 106. The strain gauge assembly 120 is positioned in a full bridge circuit 118 with four grids, with the gauges 70 arranged ninety degrees to each other. The four grids make a square and turn ninety degrees to the adjacent gauge 70. Two of the gauges 70 are up and down and two of the gauges 70 are side to side, and these matching pairs are on opposite corners from each other. They take a measurement of deflection on the strain gauge member 106. The forces are measured by allowing the brake (the electromagnetic components that resist rotation of the flywheel) to rotate around the same axis as the flywheel 48. The strain gauge member (torque member) 106 stops that rotation, and the force applied to that member 106 is measured. This force due to the motion constraint represents the torque.

The torque bracket 106 defines an aperture at one end, through which a pin 108 extends into the main member 28. A bushing 109 may also be press fit into the aperture with the pin 108 extending through the bushing 109. Two bolts secure the torque bracket 106 to the mounting plate 102. The bracket 106 necks down between the ends. The deflection of the torque bracket 106 is thus focused at the neck 111. Thus, the strain gauges 70 may be positioned on a flat surface of the necked area, as best shown in FIG. 17.

Figure 18:
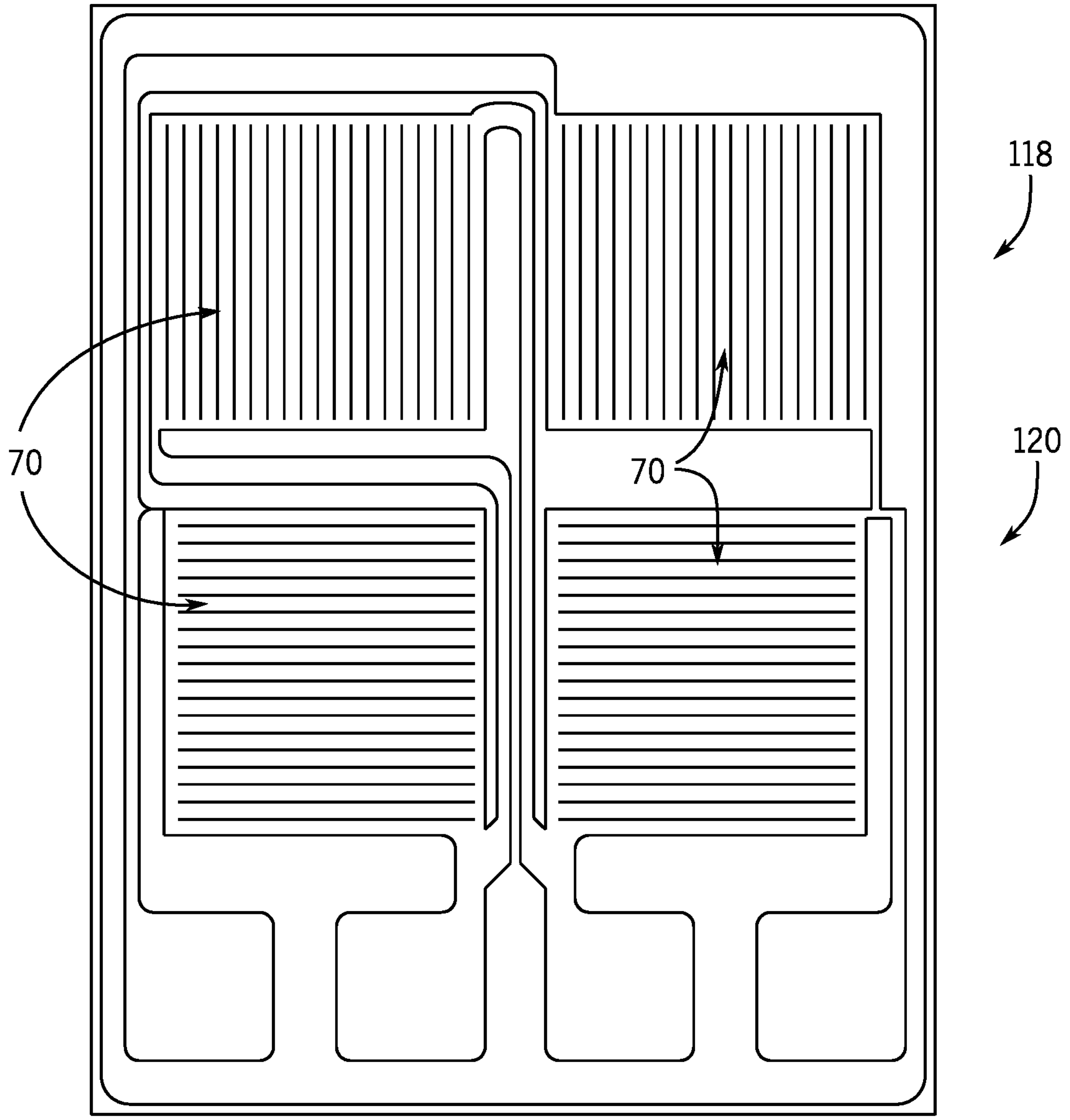
FIG. 18 is an electrical schematic of one example of a strain gauge that may be deployed on the torque member to measure the torque on the member, which may be used to measure a riders pedaling power.

FIG. 18 illustrates one example of strain gauge 70. Each discrete gauge 70, different than described above but functioning similarly (shown in each quadrant of FIG. 18) includes leads connected in a full Wheatstone bridge circuit arrangement 118. Other circuit arrangements are possible that use more or less strain gauges 70, such as a quarter bridge or a half bridge configuration. An input voltage is applied to the bridge circuit 118 and the output voltage of the circuit is proportional to the bending force (torque) applied to the torque member 106. The output voltage may be applied to some form of conditioning and amplification circuitry, such as a differential amplifier and filter that will provide an output voltage to the processor 100. It is further possible to use an analog to digital converter to convert and condition the signal. A method of measuring power among other features is disclosed in application Ser. No. 13/356,487 entitled "Apparatus, System and Method for Power Measurement," filed on Jan. 23, 2012, which is hereby incorporated by reference herein.

Referring to FIG. 18, there are two vertically positioned gauges 70 at the top of the strain gauge assembly 120, and two gauges 70 horizontally arranged at the bottom of the strain gauge assembly 120. The upper, vertical gauges 70 primarily detect deflection of the torque member 106.

Referring now also to FIG. 19, among others, revolution per minute (RPM) of the rear wheel is measured at the pulley 16, such as through an optical sensor 136 and an alternative black and white pattern on the pulley 16. The optical sensor 136 detects the pattern as it rotates by the sensor and thereby produces a signal indicative of RPM. There is an 8:1 gear ratio between the pulley 16 and the flywheel 48 so by knowing the pulley RPM, the flywheel RPM is derived. Alternatively, the flywheel RPM may be measured directly. The measured torque multiplied by the flywheel RPM provides the power value, which may be calculated by the processor 100.

"Power" is the most common measurement of a rider's strength. With measured torque multiplied by the Rad/Sec value (RPM), power is calculated. In one example, the torque measurement and RPM measurements are communicated to a processor 100, and power is calculated. Power values may then be wirelessly transmitted to a second processor 138, coupled with a display 110 providing a user interface 140, using the ANT+® protocol developed by Dynastream Innovations, Inc. The transmitter may be a discrete component coupled with the processor 100 within the housing 116 at the top of the main member 28. The ANT+® protocol in its current iteration is unidirectional.

Thus, power measurement and other data may be transmitted using the wireless ANT+® protocol.

Other protocols and wireless transmission mechanisms may also be employed. In one specific example, the processor 100 is configured to communicate over a BLUETOOTH® connection. For example, a smart phone, tablet or other device that communicates over a BLUETOOTH® connection may receive data, such as power data and RPM data, from the processor 100, and may also transmit control data to the processor 100. For example, a smart phone running a bicycle training app may provide several settings. In one example, a rider, interacting through the user interface 140, may select a power level for a particular training ride. This is known as "standard mode" which is discussed further below. The power level is associated with a power curve associated with RPM measurements of the trainer. As the rider uses the trainer 10, RPM and power measurements are transmitted to the computing device, and the app compares those values to the power level and transmits a brake control signal based on the comparison. So, for example, if the rider is generating more power than called for by the setting, the app will send a display signal to change cadence (RPM) and/or send a signal used by the processor 100 to reduce the braking force applied to the flywheel 48, with either change or both, causing the power output of the rider to be reduced. The app will continue to sample data and provide control signals for the rider to maintain the set level.

In another example, the trainer 10 can be programmed to maintain a set power value. This is known as "ergometer mode" which is discussed further below. Thus, when a rider exceeds the set power value, a control signal from the first processor 100 to the second processor 138 increases magnetic braking. Conversely, when the rider is falling below the set power value, the first processor 100 directs the second processor 138 to decrease braking power. These and other examples uses may be realized by apps or other applications developed for the device. Thus, as noted above and further detailed below, the main (first processor and memory) may provide an application programming interface (API) to which connected devices, such as smart phones and tablets running apps, may pass data, commands, and other information to the device in order to control power, among other attributes of the trainer 10. Since conventional trainers do not have integrated torque and power measurement capability in conjunction with mechanisms to automatically control a magnetic brake, the device opens up countless opportunities to customize control of the trainer 10, provide power based fitness training, interact or simulate recorded actual rides, simulate hill climbing and descending, coordinate the trainer 10 with graphical information such as speed changes, elevations changes, wind changes, rider weight and bike weight, etc.

FIG. 19 is a system diagram of components of a bicycle trainer system 1900 according to an example embodiment. FIG. 19 illustrates the bicycle trainer system 1900 including a bicycle trainer 1902 which is in communication with a computing device 1904. This computing device 1904 comprises a processor 138 and memory, and may be a laptop, a smartphone, a tablet, a personal digital assistant, a watch, or any other suitable computing device. According to one specific embodiment, the computing device 1904 is a smartphone, such as an iPhone® or an ANDROID® type device.

The bicycle trainer 1902 includes a strain gauge 70, a microprocessor 100 and an electromagnet braking system 1914. As discussed herein, the strain gauges measure the torque applied by the person pedaling the bicycle and that torque measurement may be converted to a power measurement. The electromagnetic braking system is controlled by the microprocessor or other components and imparts a braking resistance on the flywheel, which in turn is felt by the person using the trainer and can be used alone, in a feedback loop or otherwise in conjunction with the measured power generated by the person using the trainer. The electromagnet braking system 1914 may be at least one twelve volt electromagnet which may be variably controlled between zero and twelve volts to produce a lesser to larger electromagnetic braking force. The electromagnets generate braking forces based on the equations disclosed herein.

The microprocessor 100 communicates with the computing device 1904 using wireless protocols including ANT+® and BLUETOOTH® as noted above. The bicycle trainer may thus include an ANT+® radio 1906 and/or a BLUETOOTH® radio 1908 in communication with the microprocessor 100. The ANT+® radio and the BLUETOOTH® radio report a variety of real-time and historical information to the computing device 1904, such as speed (revolution per minute (RPM) of the flywheel), current power as measured by the strain gauges, etc. Similarly, the microprocessor 100 may receive information from the computing device 1904 using a wireless protocol. While the embodiment discussed herein uses a wireless protocol to communicate with the external computing device, it is also possible to use a wired connection or other forms of wireless protocols. The trainer 1902 further includes a memory 1910 in the form of a hard disk which may be flash-based, a memory stick, and the like, as well as RAM, ROM and other forms of memory. This memory 1910 may store trainer firmware which is updatable and a physics engine defined by equations for simulating a bicycle ride. Variables for the equations may be temporarily stored in the memory 1910. This physics engine and variables are discussed further below. In addition, the computing device includes memory 1912 in the form of a hard disk which may be flash-based, a memory stick, and the like, as well as RAM, ROM and other forms of memory. This memory 1912 may store an application to control and operate the trainer 1902 in addition to other data.

FIG. 19 illustrates an overview of wireless communication between the computing device 1904 and the bicycle trainer 1902 according to an example embodiment. As shown in FIG. 19, the computing device 1904 communicates with the bicycle trainer 1902 via a short range wireless network provided the ANT+® radio 1906 and/or the BLUETOOTH® radio 1908 and this communication is facilitated by an API (framework) 1905 which is bundled within an app installed on the computing device 1904. Wireless protocols suitable for use with the trainer disclosed herein, or other forms of exercise equipment conforming to aspects of this disclosure, are not limited to ANT+® and BLUETOOTH®, and may further include other wireless protocols capable of API communication.

ANT+® allows a single computing device to communicate with a plurality of bicycle trainers. Accordingly, ANT+® may be used in a gym environment. As an example, a gym may have ten bicycle trainers and a gym member may use a different bicycle trainer for a current workout from a previous workout because the bicycle trainer used during the previous workout may be occupied. In other words, the gym member is not limited to using the same bicycle trainer for each workout. In addition, at the gym a bicycle class organizer could setup a plurality of bicycle trainers for the class so that they provide a similar workout for the entire class, and the use of the ANT+® protocol would allow simultaneous communication and control of many trainers by the instructor. While there are benefits of using ANT+®, ANT+® also has drawbacks. As one example, with ANT+® it is possible that more than one user could pair with the same bicycle trainer. This could result in a problem and in certain instances use of BLUETOOTH® may be more desirable.

In contrast to ANT+®, BLUETOOTH® is a one-to-one wireless protocol. This serves as a limit, but it can also be beneficial. This means that each BLUETOOTH® device such as the bicycle trainer 1902 advertises that it is pairable with another device such as the computing device 1904 only until it is paired. A BLUETOOTH® device such as the bicycle trainer 1902 will send radio signals requesting a response from any device with an address in a particular range. In other words, once a bicycle trainer 1902 is paired with a computing device 1904, it will be paired with that computing device and cannot be paired with another computing device until the bicycle trainer 1902 is unpaired. BLUETOOTH® may be a suitable protocol for a home gym experience because a computing device 1904 such as a smartphone will be paired with a specific bicycle trainer.

According to an example embodiment, the computing device 1904 may execute an app providing a user interface (110/140) for the bicycle trainer 1902. The computing device 1904 and the bicycle trainer 1902 will establish and use a wireless communication protocol such as ANT+® or BLUETOOTH®. The user interface within the app will allow a user to set values for static variables as well as dynamic variables, which individually, collectively and/or in combination, are used to control electromagnetic braking for the bicycle trainer 1902. Hence, through various possible values, the training experience may be customized and controlled to provide a variety of different experiences for the user. Moreover, app developers, through the API, can create apps to provide such unique experiences. The control of such variables may be done in conjunction with rider feedback, such as the amount of power the rider is using, the cadence of the rider, and other factors. Some values may be preset, and some values may be adjusted by the app or trainer, depending on the type of application executing, the exercise mode, and the like. While discussed herein with reference to an app running on a smart phone to provide control and display functions for the trainer, it is possible for the trainer to include a processor, display and other components to provide command, control and display functions, alone or in combination with one or more external devices 1904. It is also possible to use wired connections to smart phones, tablets, personal computers or other devices for command, control and display functions. Returning to the example of FIG. 19, the user may set values for the static variables using the app on the computing device 1904 and the computing device 1904 will communicate these static variables to the bicycle trainer 1902. In addition, the user may input desired settings for a ride and initial values for dynamic variables and the computing device 1904 will update and communicate dynamic variables to the bicycle trainer 1902. Stated differently, the static and/or dynamic variables are used to control the amount of electromagnetic resistance at the flywheel and thereby effect whether the rider has to deliver more or less power to turn the cranks. The user interface will also provide real-time and historical ride data for display on the computing device. An example user interface is described below and shown in FIGS. 25A-25E The static and dynamic variables are used to control electromagnetic resistance in the bicycle trainer 1902 based on the following equation. This equation defines a physics engine for simulating a bicycle ride.

Force(total)=(Force(rolling resistance)+Force(slope)+Force(acceleration)+Force(wind resistance))/drivetrain efficiency In other words, the force that resists (or assists) the motion of the bicycle is the sum of the force to overcome rolling friction (rolling resistance), the force to overcome aerodynamic drag friction, the force needed to accelerate, and the force related to slope or grade.

Force (rolling resistance) is based on a rolling resistance coefficient, and the normal force of the bicycle and the rider caused by gravity.

Force (Wind resistance) is based on a density of the air, rider velocity, a coefficient of wind resistance, and a frontal area of the rider.

Force (Acceleration) is based on a mass of the rider and the bicycle, and acceleration between a starting speed and an ending speed within a period of time.

Force (Slope) is based on the mass of the rider and the bicycle, a grade, and acceleration due to gravity (9.81 $m/s^2$).

Thus, the power that is required to overcome the Force (total), is equal to Force (total)*velocity or speed of the bicycle.

The static variables that may be set in an app on the computing device 1904 may include a weight of a rider, a coefficient of rolling resistance, a coefficient of wind resistance, a frontal area, and an air density. The coefficient of rolling resistance is based upon frictional forces related to bicycle tire tread, wheel diameter, air pressure of bicycle tires, and surface type. A typical coefficient of rolling resistance for typical bicycle tires and surfaces may range between 0.0015 and 0.015. The coefficient of wind resistance is based on the friction of air as the air passes over the rider and bicycle. A typical coefficient of wind resistance for a bicycle and its rider may range between 0.5 and 1.0. Frontal area is based on a bicycle type (mountain, road, etc.) and a girth and height of the rider. Air density is based on altitude, as well as temperature and humidity. These static variables may be set individually by a user or may be preset in an app, and such preset values may be associated with different riding modes, different simulated experiences, different bicycles, a customized setting for a specific user, and the like. Some or all of the values may also be established directly by the trainer.

In one specific example, some of the static variables are set when a user first opens an app and may also be initialized when a workout is initiated and/or when a riding mode is selected and remain constant until a new riding mode is selected or they are individually updated. These static variables may be stored in memory within an app and based on user entered information such as a particular bicycle type, a wheel size, and a rider profile which includes the rider's height and weight. As an example, a mountain bicycle will weigh more, and produce more drag than a road bicycle. A mountain bicycle may also have larger tires with a thicker tread than a road bicycle, and as a result, provide a higher coefficient of rolling resistance. In addition, a larger rider will weigh more, and produce more aerodynamic drag than a smaller rider. Using the information entered by the user, the app accesses a coefficient of rolling resistance, a coefficient of wind resistance, and a frontal area. As an example, using the app, a user can select a bicycle type, and predetermined coefficients for the bicycle type are automatically used (e.g., rolling resistance and wind resistance). In other words, the app can store and use pre-determined coefficients in memory associated with the app or the user can use the app to enter the coefficients.

Some of the static variables may be modified during a ride. As an example, the coefficient of rolling resistance may be modified and come into play when the mode is set to be simulation mode, and may change in real-time if a simulated riding surface were to change from smooth pavement to a dirt road. For example, a rider may choose a simulation of a ride which includes a portion on a road in a city and then transitions to another portion on a bicycle trail which includes a stretch of dirt road. As the simulation progresses, the coefficient of rolling resistance may begin at a lower value during the road portion of the ride and as the rider moves onto the stretch of dirt road, the coefficient of rolling resistance will increase. Accordingly, the microprocessor will received the static variable change and will cause an increase in electromagnetic braking thereby causing the rider to pedal harder (in the same gear) and/or faster (in a smaller gear) to continue at a same velocity.

According to an example embodiment, dynamic variables may include speed, power, grade, and wind speed. Speed and power are based on the rider's pedaling input measured by the bicycle trainer 1902 as cadence and power, and are updated as the bicycle trainer is being used by the rider. Speed and power may be used locally at the microprocessor and may also be communicated to the computing device 1904. Grade and wind speed may be set using the computing device 1904 based on rider input such as a riding mode and desired ride settings, and updated by the app automatically. In addition, grade and wind speed also may be manually input by the rider. In one specific implementation, the computing device 1904 will communicate an initial value for grade and wind speed and all changes to the grade and wind speed to the bicycle trainer 1902 using the API 1905.

As a result, using the physics engine, the bicycle trainer 1902 will continually determine a power set point, which translates to an amount of electromagnetic braking, based on the static variables, dynamic variables, and instantaneous speed of the rider. At a same time, the bicycle trainer 1905 will measure and calculate an instantaneous power output of the rider, which power may also be used to calculate the power set point. According to an example embodiment, the bicycle trainer 1902, and specifically the microprocessor, will continually adjust a PWM signal delivered to the electromagnetic braking system at a rate of 64 Hz. The PWM signal adjustment controlling the electromagnetic braking is based on instantaneous power and speed provided by the rider and the power set point which is determined based on the static variables, grade, and wind speed communicated from the computing device 1904. The bicycle trainer 1902 will measure instantaneous flywheel speed based on how fast the rider is pedaling and calculate the power the rider is using to pedal based on torque applied at the flywheel 48 and compare the measurements with the power set point based on the static and dynamic variables to determine if more or less electromagnetic braking is required. This continual adjustment of the electromagnetic braking is accomplished using firmware stored within the bicycle trainer memory 1910. The bicycle trainer firmware uses a Proportional, Integral, and Derivative (PID) flywheel brake controller 1907 as shown in FIG. 19 and associated with the flywheel assembly 68 to smoothly and efficiently adjust the electromagnetic braking to match the power set point.

In short, the dynamic variables which are set using the computing device 1904 are updated on an as needed basis and may frequently change during a workout. As an example, the grade of a bicycle path and a wind speed may be constantly changing throughout a workout as a user rides on a windy, hilly, simulated course. Thus, the bicycle trainer 1902 will continually update a power set point based on the variables received from the computing device 1904 and the instantaneous speed of the rider based on the rider's pedaling of the bicycle trainer 1902. The bicycle trainer 1902 is able to control the feel of a ride through electromagnetic resistance to simulate a windy hill climb by increasing the electromagnetic resistance (and then reducing the electromagnetic resistance when descending the hill or experiencing a strong tail wind).

As an example, a rider can be traveling at a set speed up a simulated hill that suddenly gets steeper. The bicycle trainer 1902 will calculate a theoretical power output of the rider using the physics engine, dynamic variables, static variables, and instantaneous speed. This is the instantaneous power set point. If the instantaneous power does not match the instantaneous power set point, the bicycle trainer 1902 will adjust the resistance until a match is achieved. The adjustment of the resistance may be executed over a two-three second time span, or any other pre-determined appropriate time span. If the rider is unable to maintain a power output, the rider's speed will drop, and the instantaneous power set point will also drop. If the rider's power output is higher than the power set point, the rider's speed will rise and the instantaneous power set point will also rise. Thus, the bicycle trainer 1902 provides the rider with an experience that they would have on an actual bicycle ride.

According to an example embodiment, the API 1905 provides a bridge or interface between the app executing on the computing device 1904 and the bicycle trainer 1902. The API is distributed as the framework, which provides a convenient means of packaging headers and binaries into a single logical unit. As the framework is static, libraries may be linked into an application build. The framework need not be installed on the computing device 1904, but rather is linked and compiled into a final application binary.

As a general notion, the API 1905 is the mechanism through which various possible static and dynamic variables described above may be transmitted from the computing device 1904 to the trainer 1902 in order to control the electromagnetic resistance of the flywheel 48. The bicycle trainer 1902 may calculate cadence (RPM) and a current velocity based on rider pedal input received by the bicycle trainer 1902 and maintain or alter the electromagnetic resistance based on the power set point. Using the cadence, speed of the rider, and current electromagnetic resistance of the flywheel 48, the bicycle trainer 1902 is able to communicate a current rider power in watts to the computing device 1904 using the API 1905. The cadence, speed of the rider, and current rider power in watts may be displayed within user interface of the app 140 in addition to a variety of other information as described below.

According to an example embodiment, the API or framework 1905 may be downloaded from a publicly available website. After downloading the API 1905 from the website, an application developer can import the framework 1905 into an application by using an integrated development environment (IDE) such as XCODE®. XCODE® includes a plurality of software development tools which have been developed by APPLE® for developing software for the MAC® and iOS® devices. The API 1905 is not limited to use with MAC® and iOS® devices. As an example, the API 1905 may provide an interface between the bicycle trainer 1902 and iOS® devices, ANDROID® devices, WINDOWS® devices, and other similar computing devices. Furthermore, the IDE is not limited to XCODE® and can include other IDEs such as ECLIPSE®, etc.

According to an example embodiment, a primary class of the API 1905 is WFHardwareConnector. As an example, this class enables a developer using a Mac to write an app to configure the bicycle trainer 1902 via the computing device 1904 and retrieve data from available ANT+® and BLUETOOTH® sensors within the bicycle trainer 1902 using the framework or API 1905. The API 1905 may include mirrored functionality and identical command sets for both BLUETOOTH® and ANT+®. The functionality included in the framework 2002 may be used to communicate static and dynamic variables to the bicycle trainer 1902 in order to update a power set point in the bicycle trainer 1902 based on rider input and settings within the app executing on the computing device 1904. In addition, the functionality included in the framework may be used to communicate real-time rider data including power and speed from the bicycle trainer 1902 to the app to be displayed on the computing device 1904.

Example source code for displaying real-time rider data from the bicycle trainer 1902 on the computing device 1904 is provided below. Included below is an example header file as well as an example implementation file.

```
//
// BikePowerViewController.h
//
//
#import <UIKit/UIKit.h>
#import "WFSensorCommonViewController.h"
@class WFBikePowerConnection;
@interface BikePowerViewController : WFSensorCommonViewController
{
        UILabel* eventCountLabel;
        UILabel* instantCadenceLabel;
        UILabel* accumulatedTorqueLabel;
        UILabel* instantPowerLabel;
        UILabel* speedLabel;
}
@property (readonly, nonatomic) WFBikePowerConnection* bikePowerConnection;
@property (retain, nonatomic) IBOutlet UILabel* eventCountLabel;
@property (retain, nonatomic) IBOutlet UILabel* instantCadenceLabel;
@property (retain, nonatomic) IBOutlet UILabel* accumulatedTorqueLabel;
@property (retain, nonatomic) IBOutlet UILabel* instantPowerLabel;
@property (retain, nonatomic) IBOutlet UILabel* speedLabel;
@property (retain, nonatomic) IBOutlet UILabel *speedUnitsLabel;
@property (retain, nonatomic) IBOutlet UILabel *pedalRightLabel;
@property (retain, nonatomic) IBOutlet UILabel *pedalLeftLabel;
@property (retain, nonatomic) IBOutlet UIProgressView *pedalPower;
- (IBAction)calibrateClicked:(id)sender;
@end
//
// BikePowerViewController.m
//
//
#import "BikePowerViewController.h"
#import "BikePowerCalibration.h"
////////////////////////////////////////////////////////////////////////////////
// BikePowerViewController Implementation.
////////////////////////////////////////////////////////////////////////////////
@implementation BikePowerViewController
@synthesize eventCountLabel;
@synthesize instantCadenceLabel;
@synthesize accumulatedTorqueLabel;
@synthesize instantPowerLabel;
@synthesize speedLabel;
@synthesize speedUnitsLabel;
@synthesize pedalRightLabel;
@synthesize pedalLeftLabel;
@synthesize pedalPower;
#pragma mark -
#pragma mark UIViewController Implementation
//--------------------------------------------------------------------------------
- (void)dealloc
{
        [eventCountLabel release];
        [instantCadenceLabel release];
        [accumulatedTorqueLabel release];
        [instantPowerLabel release];
        [speedLabel release];
    [pedalRightLabel release];
    [pedalLeftLabel release];
    [pedalPower release];
    [speedUnitsLabel release];
    [super dealloc];
}
```

-continued

```
//------------------------------------------------------------------------------
- (void)didReceiveMemoryWarning
{
            // Releases the view if it doesn't have a superview.
    [super didReceiveMemoryWarning];
            // Release any cached data, images, etc that aren't in use.
}
//------------------------------------------------------------------------------
- (id)initWithNibName:(NSString *)nibNameOrNil bundle:(NSBundle *)nibBundleOrNil
{
    if ( (self=[super initWithNibName:nibNameOrNil bundle:nibBundleOrNil]) )
    {
        sensorType = WF_SENSORTYPE_BIKE_POWER;
    }
    return self;
}
//------------------------------------------------------------------------------
- (void)viewDidLoad
{
    [super viewDidLoad];
    self.navigationItem.title = @"Bike Power";
}
//------------------------------------------------------------------------------
- (void)viewDidUnload
{
    [self setSpeedUnitsLabel:nil];
    [self setPedalPower:nil];
    [self setPedalLeftLabel:nil];
    [self setPedalRightLabel:nil];
            // Release any retained subviews of the main view.
            // e.g. self.myOutlet = nil;
}
#pragma mark -
#pragma mark WFSensorCommonViewController Implementation
//------------------------------------------------------------------------------
- (void)resetDisplay
{
    [super resetDisplay];
            eventCountLabel.text = @"n/a";
            instantCadenceLabel.text = @"n/a";
            accumulatedTorqueLabel.text = @"n/a";
            instantPowerLabel.text = @"n/a";
            speedLabel.text = @"n/a";
}
//------------------------------------------------------------------------------
- (void)updateData
{
    [super updateData];
            WFBikePowerData* bpData = [self.bikePowerConnection getBikePowerData];
            WFBikePowerRawData* bpRawData = [self.bikePowerConnection
getBikePowerRawData];
            if ( bpData != nil )
            {
        // update the basic data.
                eventCountLabel.text = [NSString stringWithFormat:@"%1d",
bpData.accumulatedEventCount];
        accumulatedTorqueLabel.text = [NSString stringWithFormat:@"%1.0f",
bpData.accumulatedTorque];
        // POWER
        //instantPowerLabel.text = [NSString stringWithFormat:@"%d", bpData.instantPower];
        instantPowerLabel.text = [bpData formattedPower:FALSE];
        // CADENCE
        if(bpData.cadenceSupported)
        {
            //instantCadenceLabel.text = [NSString stringWithFormat:@"%d",
bpData.instantCadence];
            instantCadenceLabel.text = [bpData formattedCadence:FALSE];
        }
        else
        {
            instantCadenceLabel.text = @"n/a";
        }
        // SPEED
        if(bpData.wheelRevolutionSupported)
        {
            //double spd = 0.06 * instantWheelRPM *
hardwareConnector.settings.bikeWheelCircumference;
            speedLabel.text = [bpData formattedSpeed:FALSE];
            speedUnitsLabel.text = hardwareConnector.settings.useMetricUnits ? @"kph" : @"mph";
```

-continued

```
            }
            else
            {
                speedLabel.text = @"n/a";
            }
            //Update Pedal power
            if(bpRawData.powerOnlyData.pedalPowerSupported)
            {
                //Some power meters don't know the difference between left and right
                if(bpRawData.powerOnlyData.pedalDifferentiation)
                {
                    pedalRightLabel.text = @"R";
                    pedalLeftLabel.text = @"L";
                }
                else
                {
                    pedalRightLabel.text = @"?";
                    pedalLeftLabel.text = @"?";
                }
                //set the actual power contribution
                pedalPower.progress = 1.0-bpRawData.powerOnlyData.pedalPowerContributionPercent;
                pedalRightLabel.text = [NSString stringWithFormat:@"%@ %g%%",
pedalRightLabel.text, (bpRawData.powerOnlyData.pedalPowerContributionPercent*100.0)];
                pedalLeftLabel.text = [NSString stringWithFormat:@"%@ %g%%",
pedalLeftLabel.text, ((1.0-
bpRawData.powerOnlyData.pedalPowerContributionPercent)*100.0)];
            }
            else
            {
                //Not supported, disabled
                pedalRightLabel.text = @"X";
                pedalLeftLabel.text = @"X";
                pedalPower.progress = 0.5;
            }
                }
                else
                {
                        [self resetDisplay];
                }
}
#pragma mark -
#pragma mark BikePowerViewController Implementation
#pragma mark Properties
//--------------------------------------------------------------------------------
- (WFBikePowerConnection*)bikePowerConnection
{
                WFBikePowerConnection* retVal = nil;
                if ( [self.sensorConnection isKindOfClass:[WFBikePowerConnection class]] )
                {
                        retVal = (WFBikePowerConnection*)self.sensorConnection;
                }
                return retVal;
}
#pragma mark Event Handlers
//--------------------------------------------------------------------------------
- (IBAction)calibrateClicked:(id)sender
{
        // configure and display a power calibration view controller.
                BikePowerCalibration *calView = [[BikePowerCalibration alloc]
initWithNibName:@"BikePowerCalibration" bundle:nil];
                calView.bikePowerConnection = [self bikePowerConnection];
                [self.navigationController pushViewController:calView animated:TRUE];
                [calView release];
}
@end
```

The source code provided above is a "view" part of an example app which is based on the model-view-controller software architecture pattern. In other words, the example code is used to generate a view, or dynamic output representation of data to be displayed as a user interface 140 on the computing device 1904 using data obtained from the bicycle trainer 1902. The updateData method in the source code provided above is called more than once a second while the app is being executed on the computing device 1904 and is used to obtain updated real-time data from the bicycle trainer 1902 using the bikePowerConnection object.

First, the updateData method includes code to instantiate and populate data fields of the bikePowerConnection with power data from the bicycle trainer 1902 which is based on the power that the rider is using to pedal.

Next, the updateData method includes code which is used to read the data fields of from the bikePowerConnection object. An instantaneous power of the rider is read using bpData.instantPower, an instantaneous cadence of the rider is read using bpData.instantCadence, and a current speed of the rider is read using instantWheelRPM*hardwareConnector.settings.bikeWheelCircumference. As noted above, the strain gauge member 70 (torque member) is mounted on the member between the trainer frame and electromagnetic brake and measures the force (torque) applied to that member when the rider is pedaling. This force due to the motion constraint represents the torque and is used to calculate the power the rider is using to pedal. Also as noted above, revolution per minute (RPM) of the rear wheel is measured at the pulley 16, such as through an optical sensor 136 and an alternative black and white pattern on the pulley 16. Instantaneous speed is based on the revolution per minute (RPM) of the flywheel 48. In short, the trainer 1902 measures the instantaneous speed (how fast the rider is pedaling) based on the RPM of the flywheel 48, the instantaneous cadence (the number of revolutions of the crank per minute), and calculates the power the rider is using to pedal based on torque applied at the flywheel 48 and the instantaneous speed.

The updateData method also includes code to format and display the data obtained from the bicycle trainer 1902 via the API 2002 on the display 110 of the computing device 1904 using UILabels. Based on the understanding of the framework 2002 and its usage, the bicycle trainer system 1900 is further described below.

Figure 20:
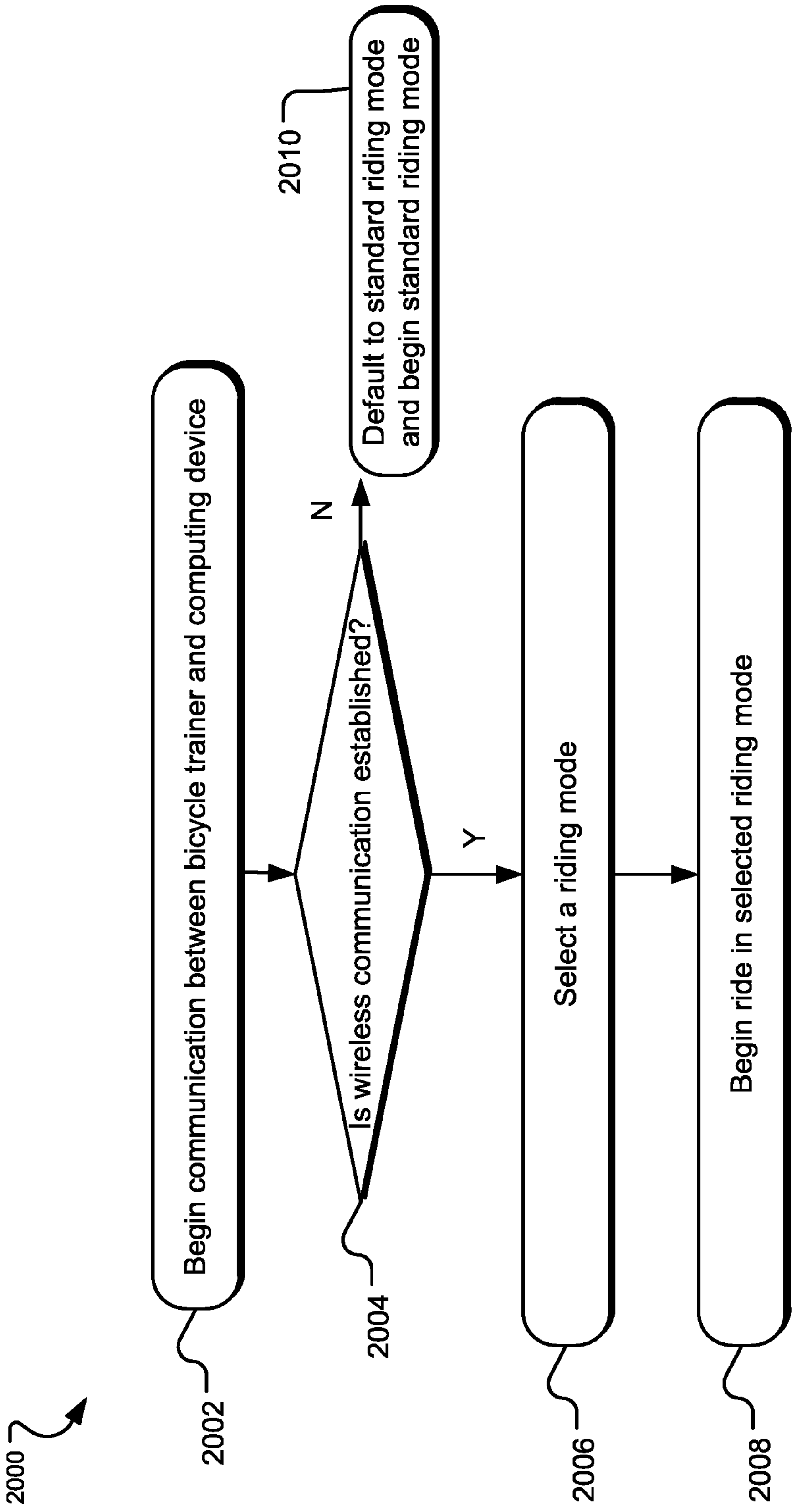
FIG. 20 is a flowchart illustrating connecting the bicycle trainer with a computing device executing an application according to an example embodiment.

FIG. 20 is a flowchart of a process 2000 of starting up the bicycle trainer system 1900 and connecting the bicycle trainer 1902 with a computing device 1904 executing an app having the framework bundled therein according to an example embodiment. As shown in FIG. 20, the process 2000 begins in step 2002 when the bicycle trainer 1902 establishes communication with the computing device 1904. The computing device 1904 may be executing a fitness app downloaded from an app repository which provides a user interface for the bicycle trainer 1902. According to an example embodiment, the communication between the bicycle trainer 1902 and the computing device 1904 may be established using a short range wireless network operating on a wireless protocol. In step 2004, if the bicycle trainer 1902 is determined to be wirelessly connected to the computing device 1904, then in step 2006 the user can select a riding mode using the app. In step 2008, the user may begin riding the bicycle trainer 1902 using the selected riding mode. However, if in step 2004 the bicycle trainer 1902 is determined to not be wirelessly connected to the computing device 1904, then in step 2010 the bicycle trainer 1902 may default to a standard riding mode and the user may begin a training ride in standard mode. By default, in step 2010, if not wirelessly connected to the computing device 1904 the bicycle trainer 1902 will operate in standard mode at level 2. Standard mode and other riding modes are further described below.

According to an example embodiment, each of these riding modes is based on a feedback loop executed by the PID controller 1907 in the flywheel assembly 68 whereby the bicycle trainer 1902 measures the power output until the riding mode ends and compares the power output of the rider with the power set point. Power (in watts) is calculated according to the physics engine described above whereby the power set point=Force (total)*velocity. The riding modes discussed below are based on this equation and the Force (total) may be modified every 64 Hz by the electromagnetic braking system 1914. Thus, the bicycle trainer 1902 determines the current wheel speed and current RPMs and continually adjusts the Force (total) based on a number of factors and variables determined by the current riding mode.

Figure 23:
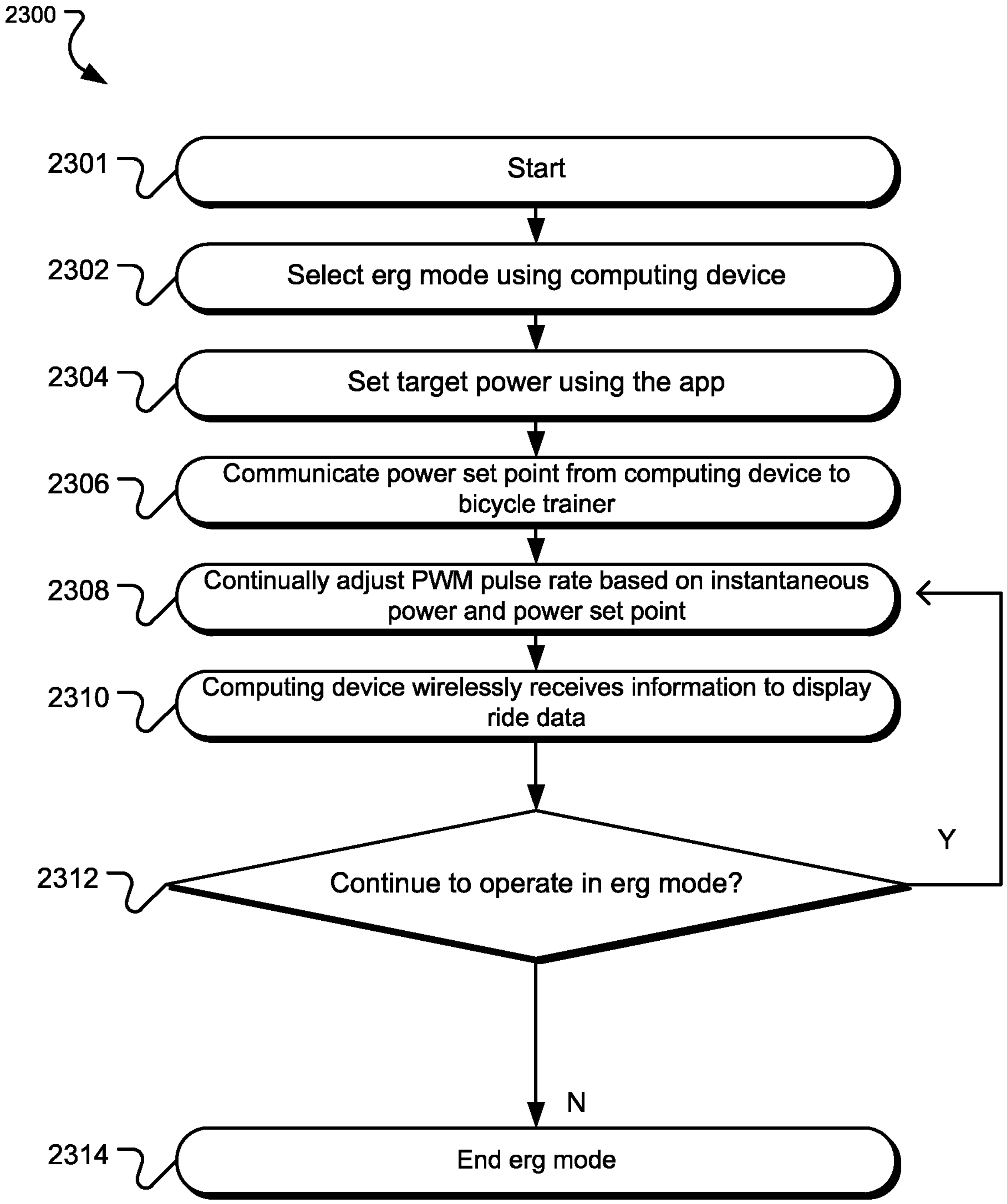
FIG. 23 is a flowchart illustrating execution of the bicycle system in ergometer mode according to an example embodiment.

A user of the bicycle trainer 1902 may desire to have an interval workout. Generally speaking, an interval workout involves a rider pedaling the trainer 1902 at some elevated cadence, speed, and/or power for a period of time, resting, and then repeating the sequence. As an example, if a rider's power threshold is about 250 watts, the rider may desire to perform threshold training at 120% of their threshold for five minute intervals, and then rest for two minutes and then repeat. By way of the computing device 1904, the bicycle trainer 1902 can provide the appropriate electromagnetic resistance so that the rider has to maintain 300 watts of power (at some speed or cadence) for five minutes. Additionally, the trainer can measure the rider's power and display that value during each interval. In one example, the rider may enter their functional power threshold value into the app or a user profile that may be accessed by one or more apps, and simply set the percentage of that number for the interval session. This workout can be provided via ergometer mode. Ergometer mode is shown in FIG. 23.

Figure 22:
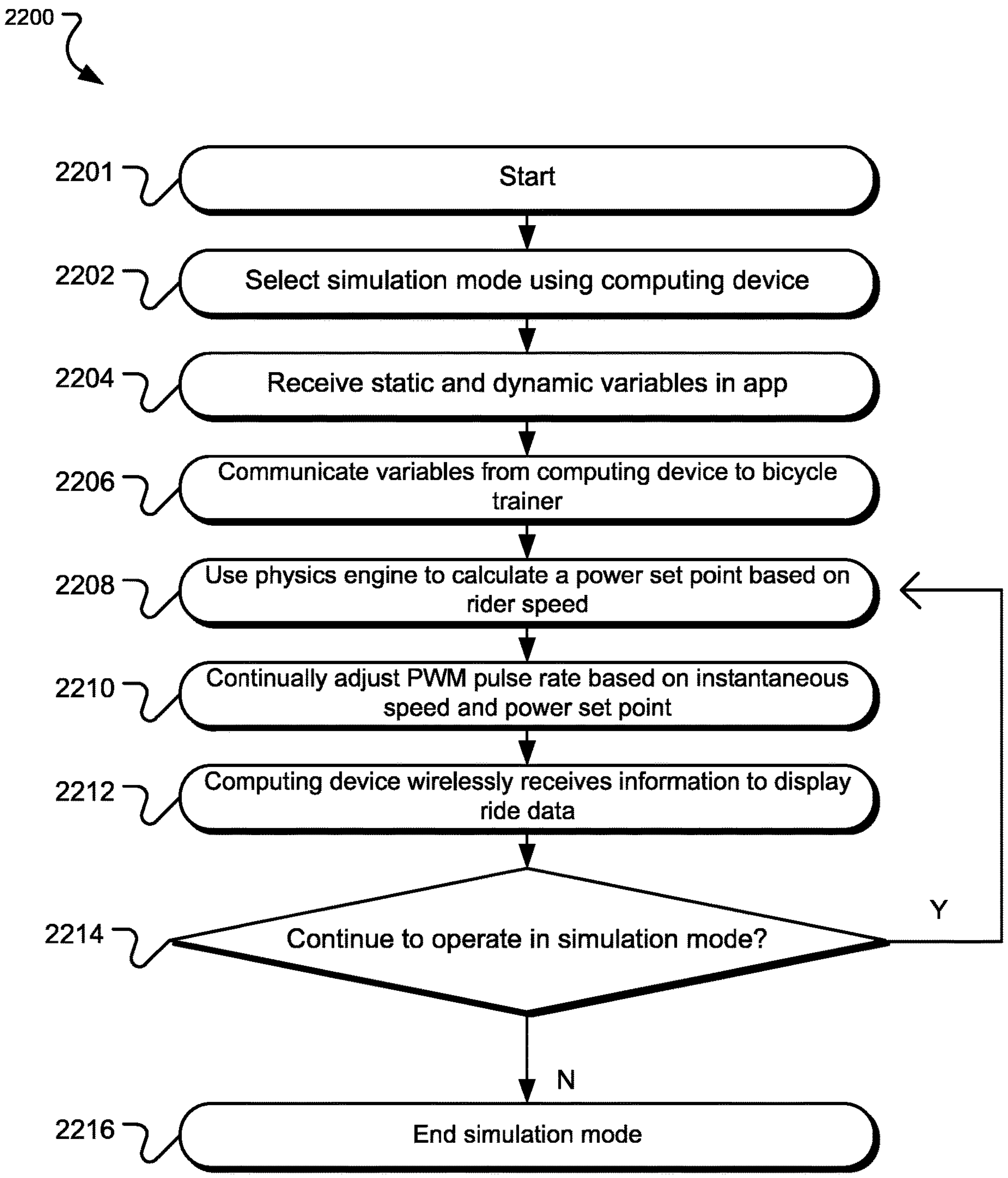
FIG. 22 is a flowchart illustrating execution of the bicycle system in simulation mode according to an example embodiment.

Besides ergometer mode, the system 1900 also provides the user with other possible modes. For example, a user may also desire to ride a simulated real world course, with ascents and descents, and experience simulated weather along the course which may dynamically affect variables such as grade based on the ascents and descents, wind speed as the wind changes, and coefficient of rolling resistance if a portion of the course has a different riding surface and/or is wet. Such a workout may be provided via simulation mode as well as a third-party app that extends simulation mode. One method of providing simulation mode is shown in FIG. 22, and described in more detail below.

Instead of simulating a course, a user may desire a quick and simple workout, which can be provided via standard mode. In standard mode, the user may select a level from 0-9 using the app, this level will be communicated from the computing device 1904 to the bicycle trainer 1902, and the workout will begin. Each level 0-9 represents a pre-set power curve based on a speed of a rider. One method of providing standard mode is shown in FIG. 21A, and described in more detail below.

In addition, a user may desire to simply experience a level of brake resistance and work to pedal against that brake resistance. A user can directly control brake resistance through a resistance mode, which is shown and discussed in more detail below with reference to FIG. 24.

The bicycle trainer 1902 is not limited to these example riding modes and additional riding modes and experiences may be provided via an app using the framework 1905. In other words, the bicycle trainer system 1900 and its framework or API 1905 are an open platform and with correctly passed variables from an app being executed on the computing device 1904, an app developer may define a wide array of fitness routines using the bicycle trainer 1902. In other words, an app developer can create additional riding modes for the bicycle trainer 1902 by creating an app executed on the computing device 1904 that communicates with the bicycle trainer 1902 using the API 1905. The computing device 1904 can communicate data to the bicycle trainer 1902 using the API 1905 and the bicycle trainer 1902 can store data related to the additional riding modes. As another example, the bicycle trainer 1902 can provide additional riding modes via a firmware update. The firmware update can be sent directly to the bicycle trainer 1902 using a network connection or sent from the computing device 1904 to the bicycle trainer 1902 using a network connection.

Figure 21A:
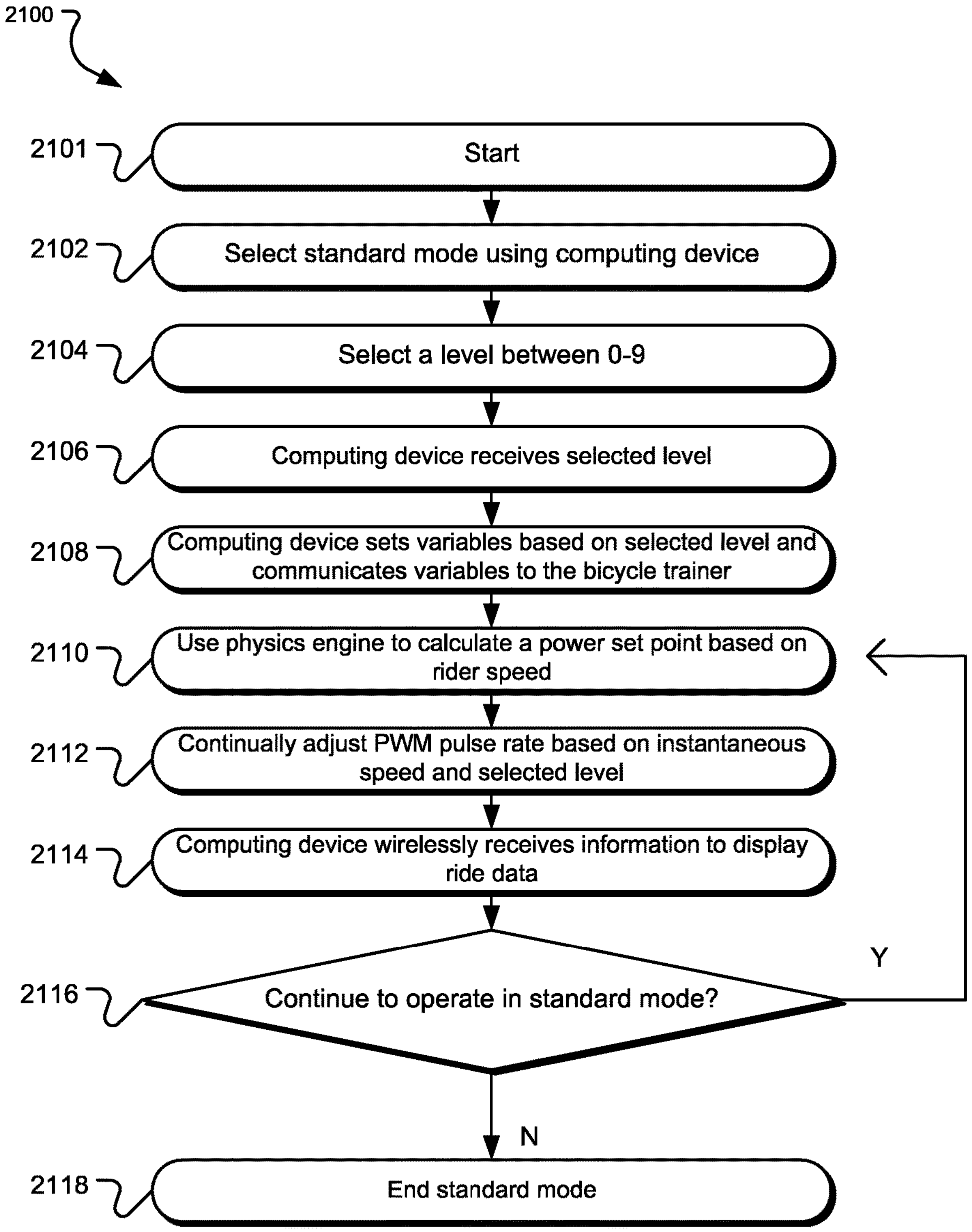
FIG. 21A is a flowchart illustrating execution of the bicycle system in standard mode according to an example embodiment.
Figure 21B:
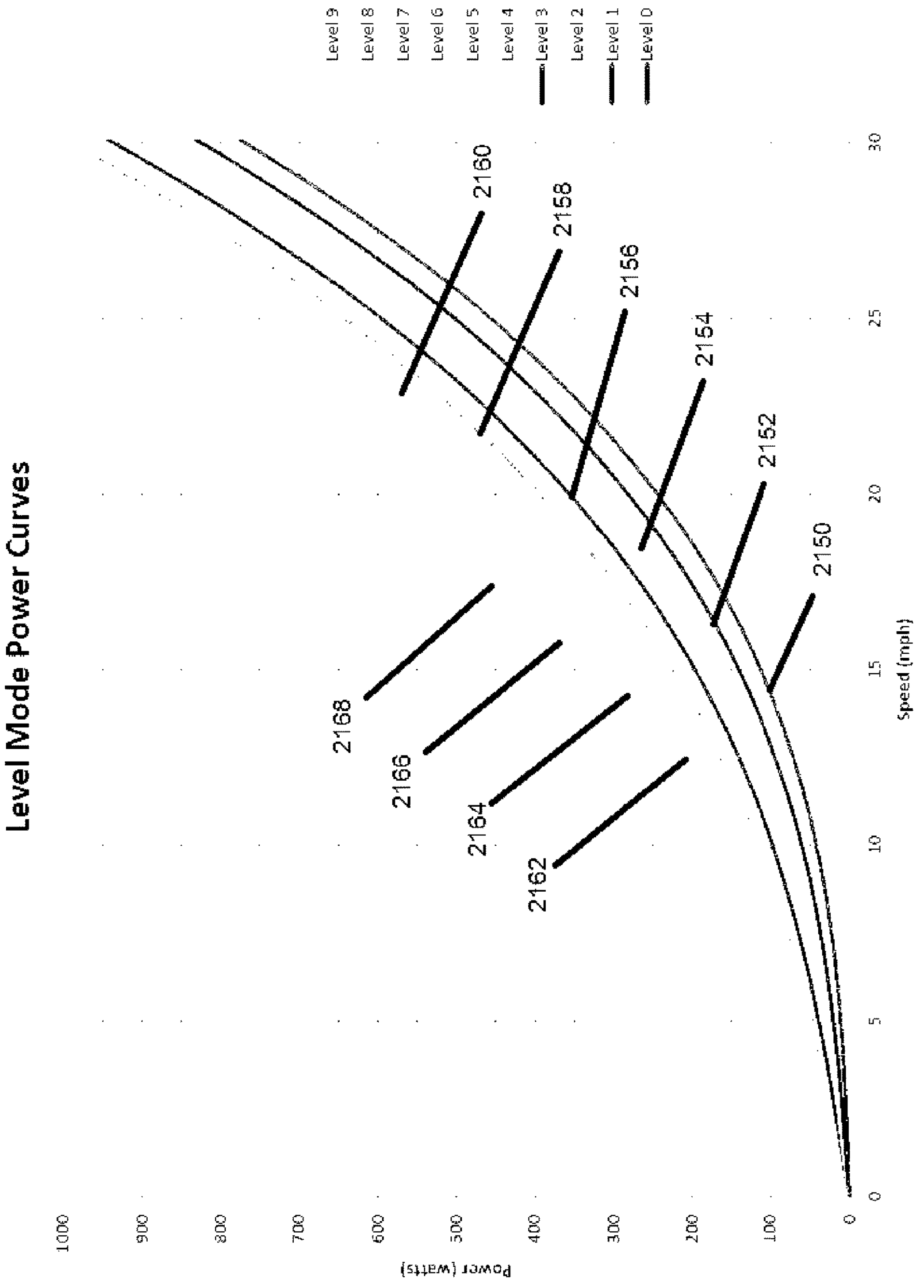
FIG. 21B is a graph illustrating exemplary power curves associated with standard mode according to an example embodiment.

FIG. 21A is a flowchart of a process 2100 illustrating a standard riding mode for the bicycle trainer system 1900 according to one possible example embodiment. This standard riding mode is also known as normal mode or level mode. In standard mode, the bicycle trainer system 1900 can set a progressive resistance curve as shown in FIG. 21B. Generally speaking, in standard mode, the faster that the rider pedals, the more difficult the ride will become, simulating rolling resistance and air resistance by increasing electromagnetic braking along the curves. In one specific implementation, standard mode may be based on the following pseudocode:

```
TrainerBeginWirelessCommunication( ); // Either ANT+ ® or
BLUETOOTH ®
TrainerSetStandardMode(Level); // The level value is transmitted to the
trainer
TrainerBeginStandardMode( );
TrainerEndStandardMode( );
The pseudocode is explained below in view of Figure 21A and Figure
21B.
```

As shown in FIG. 21A, the process, which is a feedback loop, begins in step 2101. In step 2102, the user selects standard mode using the computing device 1904. As an example, the user may provide input to the computing device 1904 executing the app by selecting a selection displayed on a display 110 of the computing device 1904. The display 110 may be a touchscreen, and the user may touch a "standard mode" selection that is displayed. In step 2104, the user may also select a difficulty level by selecting one of level 0, 1, 2, 3, 4, 5, 6, 7, 8, or 9. Here, the selected difficulty may pertain to the level of electromagnetic resistance applied as well as the amount of increase in electromagnetic resistance applied as the rider increases speed. Depending on the applied electromagnetic resistance, the rider will have to deliver a certain amount of power to maintain a target cadence depending on whatever gear the rider selects and the power and cadence are displayed. With the trainer, the rider is able to change rear gears.

In standard mode, all static variables and dynamic variables will be set to default values except for grade and the user will experience a training ride which provides a level of grade (and associated electromagnetic resistance) based on the level chosen. Grade is the amount of slope or incline or decline of the simulated riding surface to the horizontal. As an example, grade may be expressed as a percentage calculated based on the equation 100*rise/run. The grade variable is set so as to sequence through progressively greater values (associated with progressively higher applied electromagnetic braking) to simulate a progressively steeper grade based on the level chosen. Thus, the grade dynamic variable will be continually updated by the computing device 1904 based on the level selected by the rider and a power set point will directly coincide with any changes in the rider's instantaneous speed. As an example, a ride in level 2 on the bicycle trainer 1902 would simulate the experience of riding on a hill with a 1% grade. When in standard mode, if the rider is riding up a hill and wants to move faster, the ride will get more difficult. As a result, as a rider increases speed, the rider will experience an increase in resistance and an increase in power.

According to an example embodiment, a difficulty level of 0 provides the rider with a training experience that mimics a flat bicycle ride, with the trainer at a relatively constant and relatively low amount of electromagnetic braking. A difficulty level of 9, in contrast, provides a simulated hill grade of 4.5% and more resistance for a same given speed. Once the level is selected, in step 2106, the computing device 1904 will receive the selected level and store the selected level in temporary memory in the computing device 1902 until a new level or different riding mode is selected. In step 2108, the computing device 1904 will set variables based on the selected level to begin a standard mode workout and communicate the variables to the bicycle trainer 1902 using the API.

According to an example embodiment, and as shown in FIG. 21B, the grade percentage will be set to 0.05*the level selected by the rider. Based on the selected level, the grade will range from 0% to 4.5%. In other words, a difficulty level of 0 will include no grade during a ride, a difficulty level of 5 will simulate a consistent 2.5% grade, and a difficulty level of 9 will simulate a consistent 4.5% grade. The levels are translated to a grade value by multiplying the selected level (0-9) by a grade factor. According to an example embodiment, the grade factor is 0.05%. This translated grade is used along with pre-determined default static variables.

FIG. 21B shows that level 0 (2150) provides 0% grade and approximately 110 watts of power when a rider has a velocity of 15 mph. Level 1 (2152) provides 0.5% grade and approximately 140 watts of power when a rider has a velocity of 15 mph. Level 2 (2154) provides 1.0% grade and approximately 170 watts of power when a rider has a velocity of 15 mph. Level 3 (2156) provides 1.5% grade and approximately 200 watts of power when a rider has a velocity of 15 mph. Level 4 (2158) provides 2.0% grade and approximately 220 watts of power when a rider has a velocity of 15 mph. Level 5 (2160) provides 2.5% grade and approximately 250 watts of power when a rider has a velocity of 15 mph. Level 6 (2162) provides 3.0% grade and approximately 280 watts of power when a rider has a velocity of 15 mph. Level 7 (2164) provides 3.5% grade and approximately 310 watts of power when a rider has a velocity of 15 mph. Level 8 (2366) provides 4.0% grade and approximately 340 watts of power when a rider has a velocity of 15 mph. Level 9 (2168) provides 4.5% grade and approximately 370 watts of power when a rider has a velocity of 15 mph.

In step 2110, the bicycle trainer 1902 will use the physics engine to calculate an appropriate power output for the rider based on the rider's threshold, the difficulty level, and an instantaneous speed of the rider. As noted above, and as shown in FIG. 21B, the power output is equal to Force (total)*velocity of the rider. Thus the physics engine may determine a fluctuating Force (slope) which is based on the grade.

In step 2112, the bicycle trainer 1902 will execute the feedback loop to continually adjust a PWM pulse rate based on instantaneous speed of the rider and a power set point based on the selected level. Stated differently, the trainer measures the instantaneous speed (how fast the rider is pedaling) and calculates the power the rider is using to pedal based on torque and wheel speed, and compares those measurements to the power set point for the portion of the exercise routine, to determine if more or less braking is required. So, for example, if the rider is delivering the power for the selected difficulty level, then the bicycle trainer 1902 will not alter the applied electromagnetic braking, whereas if the rider is not maintaining their power, then the PWM signal may be modified to increase or decrease the amount of electromagnetic braking. The bicycle trainer 1902 provides the electromagnetic braking by sending the PWM signal to the PID controller 1907 as shown in FIG. 19 and associated with flywheel assembly 68.

In step 2114, the computing device 1904 will receive a wireless communication from the bicycle trainer 1902 using the API 1905 and display ride information on display 110 such as an instantaneous speed and power which are being measured and/or calculated by the trainer. In step 2116, the bicycle trainer 1902 will determine whether the user continues to operate the bicycle trainer 1902 in standard mode. If the user continues to operate the bicycle trainer 1902 in standard mode, then the workout will continue and the bicycle trainer 1902 will continue to communicate with the computing device 1904. If the user ends standard mode, then in step 2118 the workout may be modified to another riding mode or ended.

FIG. 22 is a flowchart of a process 2200 illustrating simulation mode for the bicycle trainer system 1900 according to an example embodiment. In simulation mode, the rider can enter information using the app such as rider weight, bicycle type, bicycle weight, riding position, headwind, grade, etc. and the bicycle trainer system 1900 will model a power curve using the physics engine to simulate a real world riding experience.

According to an example embodiment, the app on the computing device 1904 will model the power curve and communicate this power curve to the bicycle trainer 1902 using the API 1905. According to an additional example embodiment, the app on the computing device can communicate static and dynamic variables to the bicycle trainer 1902 using the API 1905 and the bicycle trainer may determine a required power for a given instantaneous rider speed. This required power is the power set point and determined using the physics engine whereby Force (total) =((Force (rolling resistance)+Force (slope)+Force (acceleration)+Force (wind resistance))/drivetrain efficiency. According to the example embodiment described below, the simulation input may include variables for a coefficient of rolling resistance, a weight of the rider and bicycle, and wind speed. Using these variables, the bicycle trainer 1902 will determine a power required at a particular speed and grade and adjust the resistance accordingly using the PID controller 1907 as shown in FIG. 19 associated with flywheel assembly 68.

Thus, as an example, the power needed to simulate wind resistance may be 150 watts, the power needed to simulate normal force due to gravity may be 150 watts, and the power needed to simulate rolling resistance may be 25 watts. At this particular power set point, there is no slope, and thus grade does not factor into the power set point. Thus, according to an example embodiment, the power needed to simulate the ride at a particular instant and associated power set point at that instant along the power curve may be 325 watts. This simulation may be based on the following pseudocode:

```
TrainerBeginWirelessCommunication( ); // Either ANT+ ® or
BLUETOOTH ®
TrainerSetSimMode( );
TrainerSetWindResistance(Value); // The value is transmitted to
the trainer
TrainerSetWeight(Rider Weight + Bicycle Weight); // The value is
transmitted to the trainer
TrainerSetRollingResistance(Value); // The value is transmitted to
the trainer
TrainerBeginSimMode( );
TrainerEndSimMode( );
The pseudocode is explained below in view of Figure 22.
```

Thus, for any given set grade and speed, as provided in the pseudocode above, power is determined based upon wind resistance, gravity, and rolling resistance which may continually change during the ride and the bicycle trainer 1902 will compute the power required. As provided above, a power output for the bicycle trainer 1902 will be based on Force (total) and an instantaneous speed of the rider.

Referring now to FIG. 22, the process, which is a feedback loop, begins in step 2201. In step 2202, the user selects simulation mode using the computing device 1904. As an example, the user may provide input to the computing device 1904 which is executing the app by selecting a selection displayed on a display 110 of the computing device 1904. The display 110 may be a touchscreen, and the user may touch the selection which is displayed on the display 110 of the computing device 1904. In step 2204, static and dynamic variables may be received by the app. The static variables are set by the user by entering the variables into fields provided in the app such as a weight of the rider and a weight of the bicycle. These static variables may be stored in a user's rider profile which is within the app. In simulation mode or a third-party-app-based variant of simulation mode that further extends simulation mode, the user may enter dynamic variables such as grade and wind speed or select a real-world course from a list of courses and the computing device 1904 will determine rolling resistance, grade and wind speed based on course information. The course information may include but is not limited to GPS course information, realtime, historical, average, or random wind, and realtime, historical, average, or random weather information. This information may be used to determine Force (rolling resistance)+Force (slope)+Force (acceleration)+ Force (wind resistance).

In step 2206, the computing device 1904 communicates the static variables and the dynamic variables to the bicycle trainer 1902 using the API 1905. In step 2208, the bicycle trainer 1902 will use the physics engine to determine a power curve based on the variables and calculate an appropriate power output for the power set point based on an instantaneous speed of the rider. As noted above, the power output is equal to Force (total)*velocity of the rider. Thus, the physics engine may provide a fluctuating Force (total) which is based on the power curve. In step 2210, the bicycle trainer 1902 will execute the feedback loop to continually adjust a PWM pulse rate based on instantaneous speed of the rider and a power set point. Stated differently, the bicycle trainer 1902 will measure the instantaneous speed (how fast the rider is pedaling) and calculate the power the rider is using to pedal based on torque applied at the cranks, and compares those measurements to the power set point for the portion of the exercise routine, to determine if more or less braking is required. So, for example, if the rider is delivering the power that matches the power set point at a particular instant, then the trainer will not alter the applied electromagnetic braking, whereas if the rider is not maintaining a power that matches the power set point, then the PWM signal may be modified to increase or decrease the amount of electromagnetic braking using the PID controller 1907 as shown in FIG. 19 associated with flywheel assembly 68.

In step 2212, the computing device 1904 will receive wireless communication from the bicycle trainer 1902 using the API 1905 and display information on display 110 such as an instantaneous speed and power. In addition, while in simulation mode, the computing device 1904 may also display additional information on display 110, such as a three dimensional simulation of the course or a map. The display 110 is not limited to displaying this data and may include additional information such as all-time mileage and all-time average speed, etc. In step 2214, the bicycle trainer 1902 will determine whether the user continues to operate the bicycle trainer 1902 in simulation mode. If the user continues to operate the bicycle trainer 1902 in simulation mode, then the workout will continue and the bicycle trainer 1902 will continue to communicate with the computing device 1904. If the user ends simulation mode, then in step 2216 the workout may be modified to another riding mode or end.

According to a further embodiment, two or more users may race on a simulated course in simulation mode. The users need not be located in the same location and may communicate their real-time riding data to a server which then communicates with each rider's computing device 1904. The users need not race simultaneously, and may race at different times. In other words, the race may be completed by the users asynchronously. As an example, course data may be uploaded and downloaded by users. The database provides geolocated videos which have been recorded by users along with an associated GPS signal during actual bicycle rides. The videos may then be played back using an app. In other words, a geolocated video and its course information may be parsed into the static and dynamic variables to be communicated from the computing device 1904 to the bicycle trainer 1902 using the API 1905 and a map of the course may be displayed using the app. The power data which is received by the bicycle trainer 1902 during the bicycle ride is communicated to the computing device 1904 using the API 1905, and the computing device 1904 may determine a position of the rider on the course on the map of the course displayed in the app. Furthermore, based on the information received from the server, each rider may view where an opposing rider is located on the map of the simulated course and may see positional information displayed on the display 110 of the computing device 1904. The server may determine a final race position of each rider, determine a winner of the race, determine each rider's overall ranking for the course, and transmit this information to each of the users during the race and after the race is completed. Further details regarding the database of geolocated videos and its usage with the bicycle trainer system 1900 are beyond the scope of the embodiments disclosed herein.

According to example embodiment, while in simulation mode, the power curve may be buffered and stored within memory in the bicycle trainer 1902 so that if wireless connectivity drops, the bicycle trainer 1902 will continue to provide the rider with the simulated ride. The power curve for the ride may be represented in a data object such as an array. The array may store a plurality of future power set points based on the power curve at particular future course positions. According to an example embodiment, the amount of future storage of a simulated ride is dependent upon the size of the memory in the bicycle trainer 1902. Depending upon a memory capacity, the bicycle trainer 1902 will interpolate data points between each of the power set points in the array and provide a seamless simulated ride for the rider such that the rider will not even realize that wireless connectivity has dropped. In other words, the array will act similar to a buffer and temporarily store future course power set point information. Once wireless connectivity is reestablished the array will be repopulated with future power set points.

FIG. 23 is a flowchart of a process 2300 illustrating ergometer ("erg") mode for the bicycle trainer system 1900 according to an example embodiment. In erg mode, the bicycle trainer system 1900 can set a target wattage and remain at the wattage independent of a rider's speed and cadence. Erg mode may be based on the following pseudocode:

```
TrainerBeginWirelessCommunication( ); // Either ANT+ ® or
BLUETOOTH ®
TrainerSetErgMode(Power); // The power is transmitted to the trainer
TrainerBeginErgMode( );
TrainerEndErgMode( );
The pseudocode is explained below in view of Figure 23.
```

As shown in FIG. 23, the process, which is a feedback loop, begins in step 2301. In step 2302, the user selects erg mode using the computing device 1904. As an example, the user may provide input to the computing device 1904 which is executing the app by selecting a selection displayed on a display of the computing device 1904. The display may be a touchscreen device, and the user may touch the selection which is displayed on the display 110 of the computing device 1904. In step 2304, a desired target wattage may be selected by the user.

Once the user selects the target wattage, in step 2306, the computing device 1904 transmits the power set point to the bicycle trainer 1902. In step 2308, the bicycle trainer 1902 executes the feedback loop to continually adjust a PWM pulse rate based on instantaneous power and the power set point. As noted above, the power output is equal to Force (total)*velocity of the rider. Stated differently, the bicycle trainer 1902 will execute the feedback loop to continually adjust a PWM pulse rate based on instantaneous power and a power set point. Stated differently, the trainer measures the instantaneous speed (how fast the rider is pedaling) and calculates the power the rider is using to pedal based on torque applied at the flywheel 48, and compares those measurements to the power set point, e.g. the target power wattage, to determine if more or less electromagnetic braking is required. So, for example, if the rider is delivering the power for the selected target power wattage, then the trainer 1902 will not alter the applied electromagnetic braking, whereas if the rider is not maintaining their power, then the PWM signal may be modified to increase or decrease the amount of electromagnetic braking in order to maintain the target power using the PID controller as shown in FIG. 19. In step 2310, the computing device 1904 receives a wireless communication from the bicycle trainer 1902 using the API 1905 and displays information such as an instantaneous speed and power on display 110. In step 2312, the bicycle trainer 1902 determines whether the user is continuing to operate the trainer 1902 in erg mode. If trainer 1902 is in erg mode, then the workout will continue and the bicycle trainer 1902 will continue to communicate with the computing device 1904. If the user ends erg mode, then in step 2314 the workout may be modified to another riding mode or end.

Figure 24:
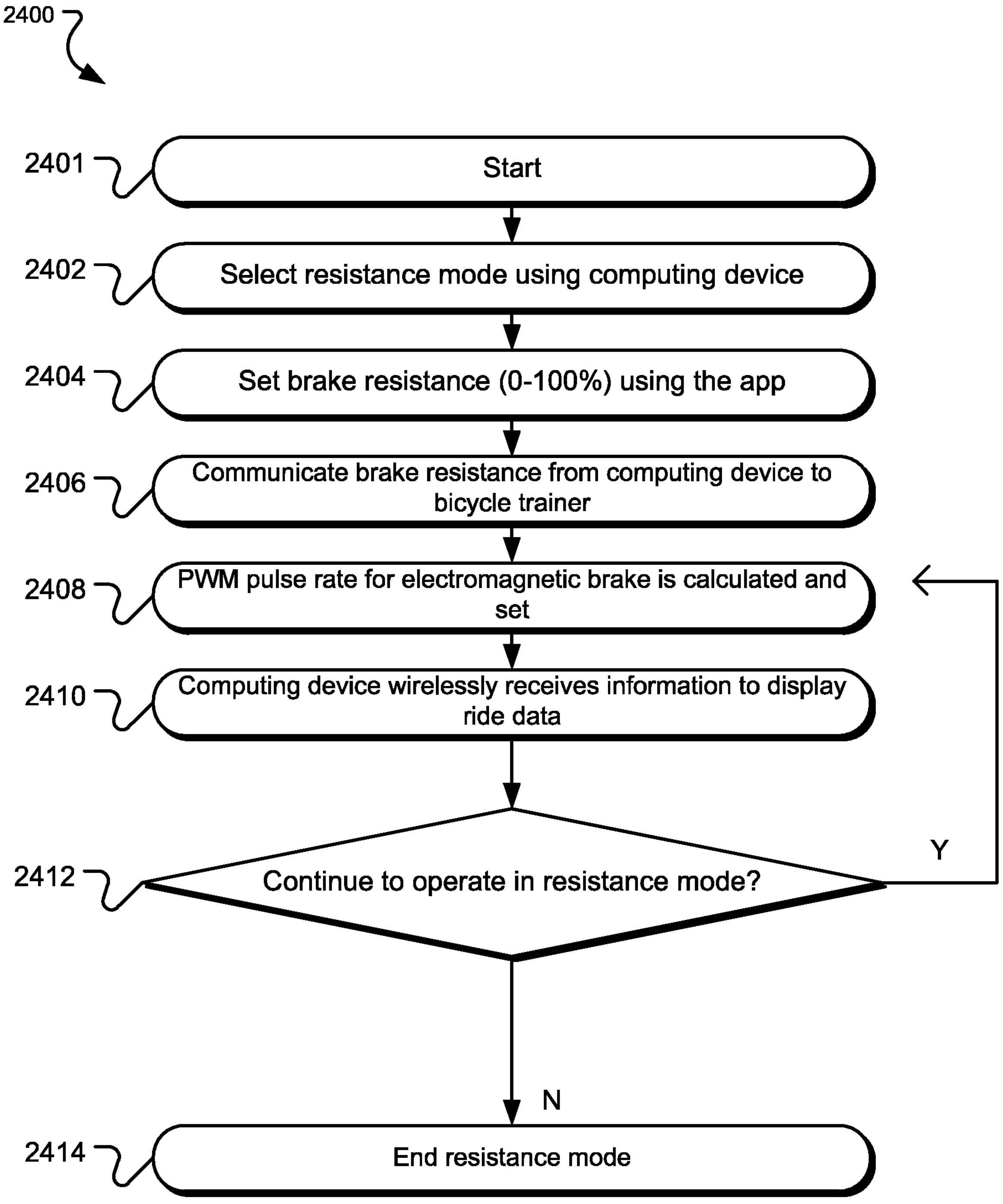
FIG. 24 is a flowchart illustrating execution of the bicycle system in resistance mode according to an example embodiment.

FIG. 24 is a flowchart of a process 2400 illustrating resistance mode for the bicycle trainer system 1900 according to an example embodiment. In resistance mode, the trainer 1902 sets a brake resistance of the electromagnetic braking system 1914 manually between 0 and 100%. Resistance mode may be based on the following pseudocode:

```
TrainerBeginWirelessCommunication( ); // Either ANT+ ® or
BLUETOOTH ®
TrainerSetResistanceMode(ResistancePercentage); // The value is
transmitted to the trainer
TrainerBeginResistanceMode( );
TrainerEndResistanceMode( );
The pseudocode is explained below in view of Figure 24.
```

As shown in FIG. 24, the process 2400, which is a feedback loop, begins in step 2401. In step 2402, the user selects resistance mode using the computing device 1904. As an example, the user may touch a selection displayed on the computing device 1904. In step 2404, a percentage of brake power (0-100%) may be selected by the user. This percentage of brake power is based on available torque from the electromagnetic brake power of the bicycle trainer 1902. In other words, if the available torque of the electromagnetic brake is 8 Newton meters (Nm), and if 50% is selected by the user, then the trainer 1902 will continually provide 4 Nm of electromagnetic brake torque.

Once the desired percentage of brake power is selected by the user, in step 2406, the computing device 1904 communicates the percentage of brake power to the bicycle trainer 1902. In step 2408, a PWM pulse rate for the electromagnetic brake is calculated and set by the trainer 1902 based on the percentage of electromagnetic braking power. In step 2410, the computing device 1904 receives wireless communication from the bicycle trainer 1902 using the API 1905 and displays information such as an instantaneous speed and power on the display 110. In step 2412, the trainer 1902 determines whether the user continues to operate the bicycle trainer 1902 in resistance mode. If the user continues to operate the bicycle trainer 1902 in resistance mode, then the workout will continue and the bicycle trainer 1902 will continue to communicate with the computing device 1904 and wait for a next mode command. If the user ends resistance mode, then in step 2414 the workout may be modified to another riding mode or end.

FIGS. 25A-25E are screenshots of an example app executing on the computing device 1904. The app may be used for selecting standard mode, simulation mode, erg mode or resistance mode. Each of the screenshots show displayed information as well as variables that can be modified.

Figure 25A:
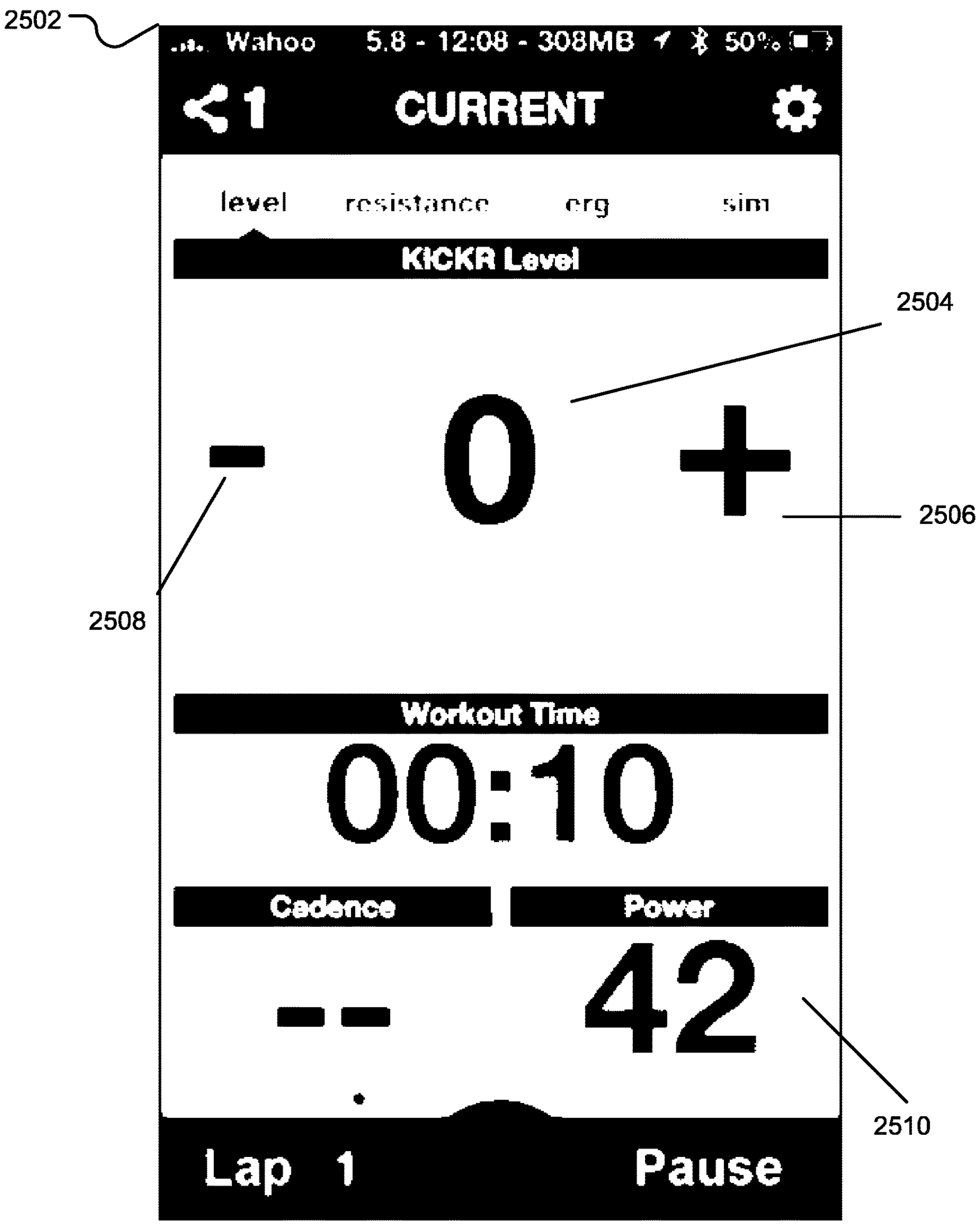
FIGS. 25A-25E illustrate screenshots of an example application executing on the computing device in communication with the bicycle trainer.

FIG. 25A is a screenshot 2502 of normal mode. As described above, the screenshot 2502 includes a selectable level of 0-9 using a toggle switch 2504 (alternatively using – or +screen selections). So, the user may decrement or increment the grade between 0 and 9 using the – or +screen selections 2506 and 2508. As noted, a level of 0 represents 0% grade whereas a level of 9 represents 4.5% grade with each value between 1 and 8 being 0.5% increments. This real-time power data received by the computing device 1904 is used by the app to determine and display power 2510. In the example shown, the rider is generating 42 watts—a relatively easy effort. Time, cadence, and other values may also be shown.

Figure 25B:
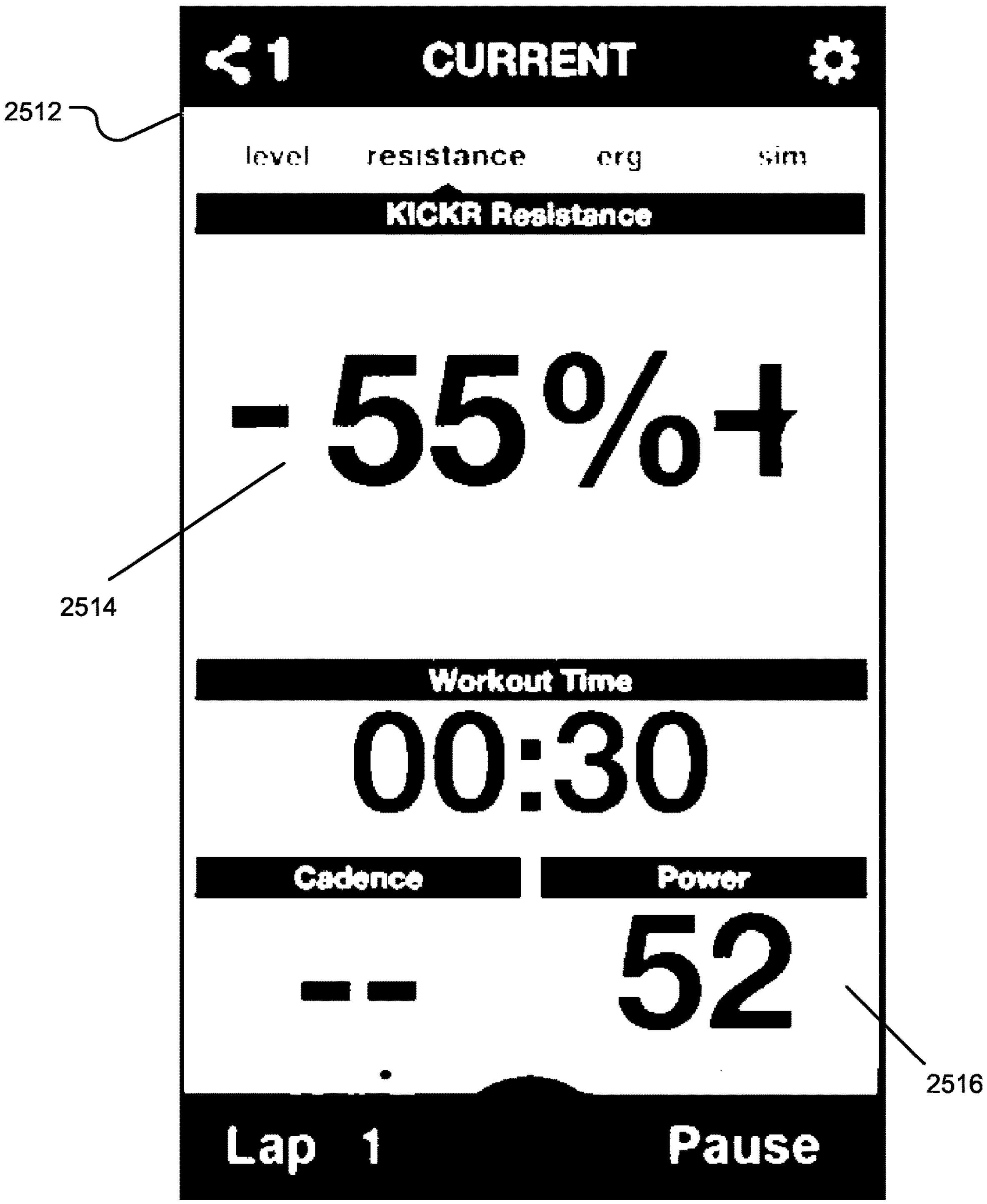

FIG. 25B is a screenshot 2512 of the resistance mode. Note, the user may select a mode by touching the appropriate descriptor (level, resistance, erg and sim) along the top area of the display. In resistance mode, the user can select a percentage of electromagnetic brake resistance from 0-100% using a toggle switch 2514 that will be communicated from the computing device 1904 to the bicycle trainer 1902 using the API 1905. As shown in FIG. 25B, the app is displaying a power 2516 of 52 watts.

Figure 25C:
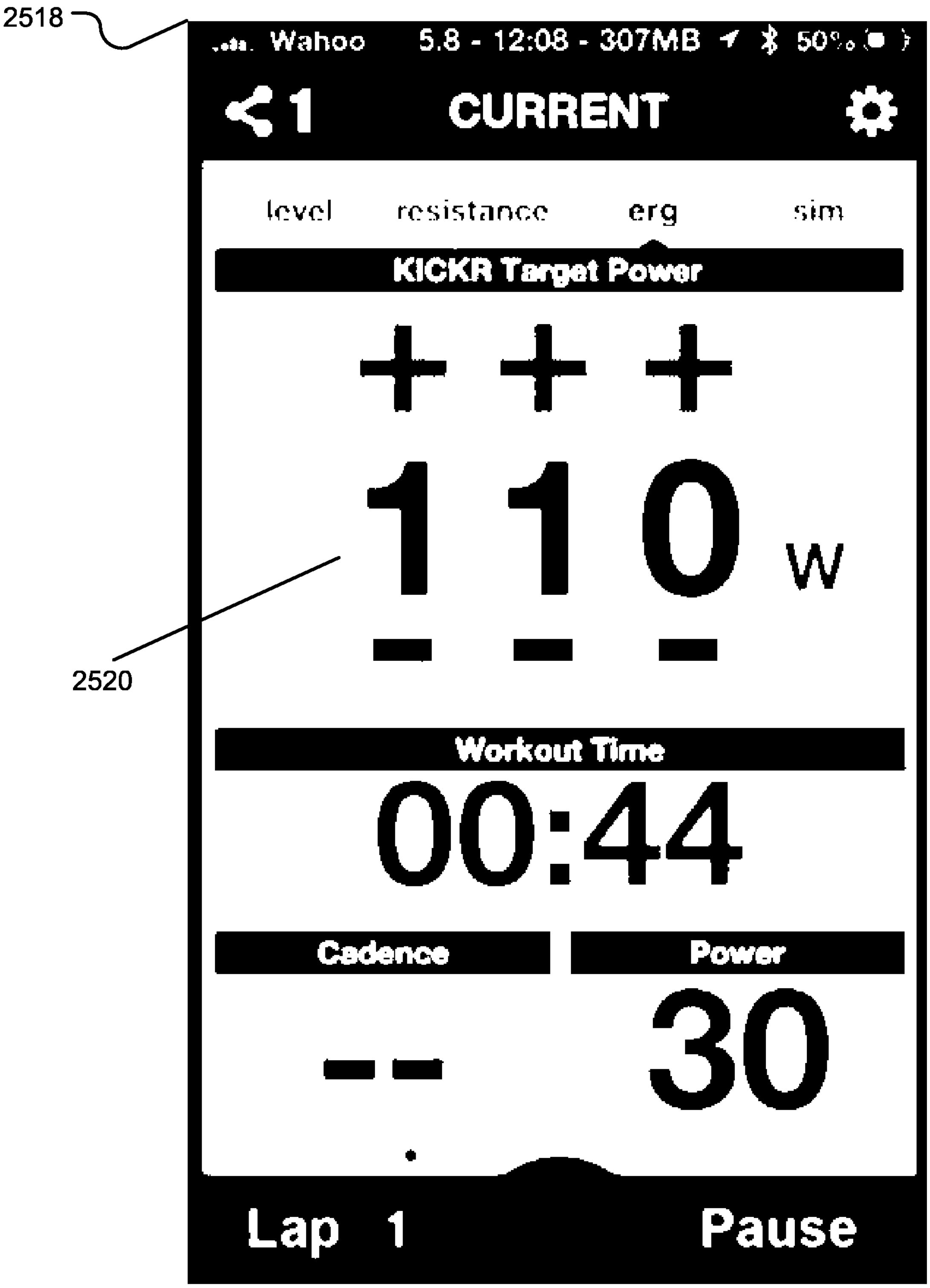

FIG. 25C is a screenshot 2518 of erg mode. In erg mode, a user can select a target power (in watts) using three toggle switches 2520 to set the target power between 0 and some upper value of no more than 999 watts (although such a level is unlikely attainable). The target power value is then communicated from the computing device 1904 to the bicycle trainer 1902 using the API 1905. In the illustrated example, the target power is input as 110 watts by toggling a first numeric value to 0, a second numeric value to 1 and a third numeric value to 1, using the three numeric toggle switches 2520. The bicycle trainer 1902, through a feedback loop, will adjust the braking force to help the user maintain a constant power of 110 watts even as a user pedals faster or slower, or switches gears.

Figure 25D:
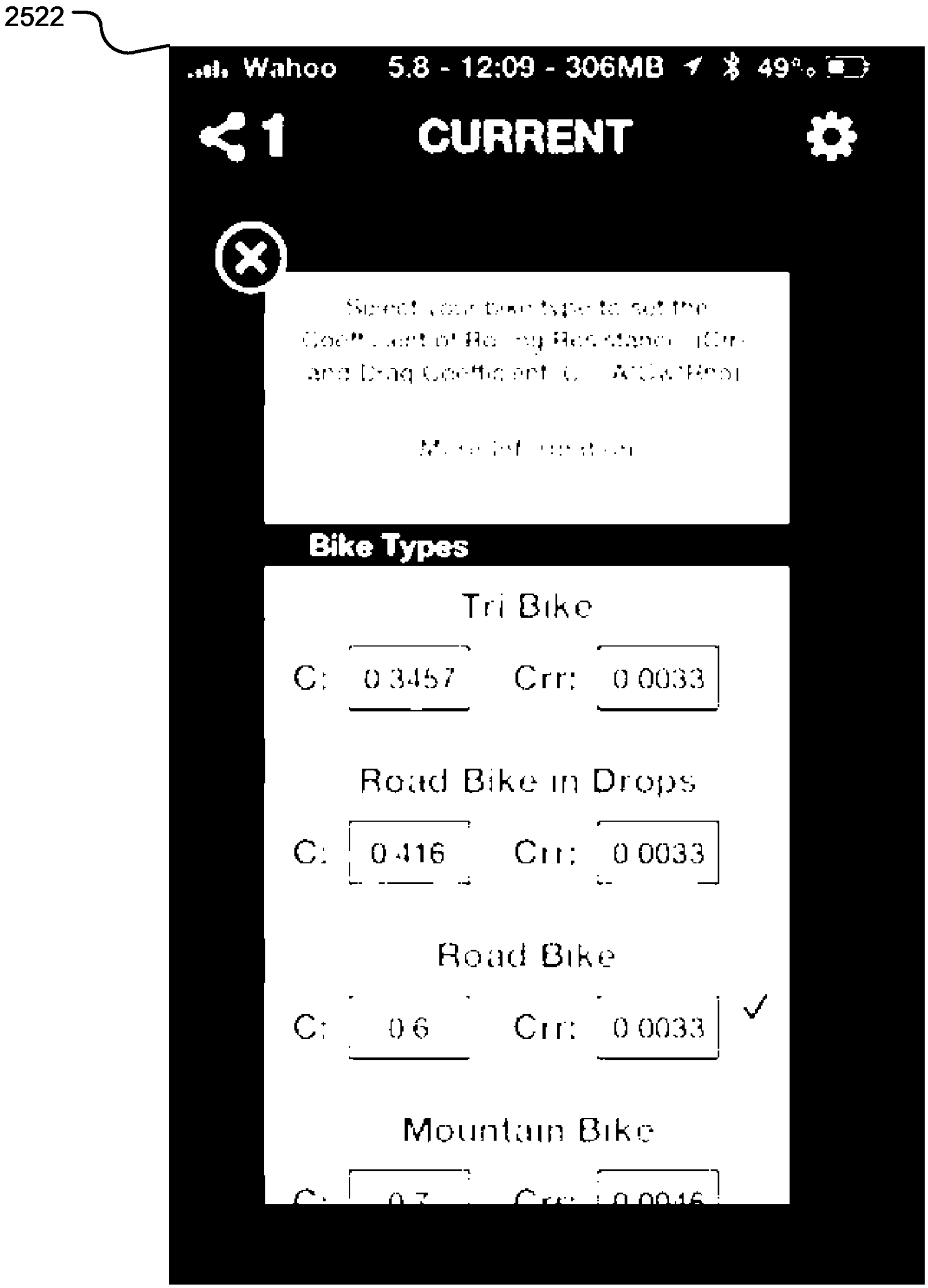
Figure 25E:
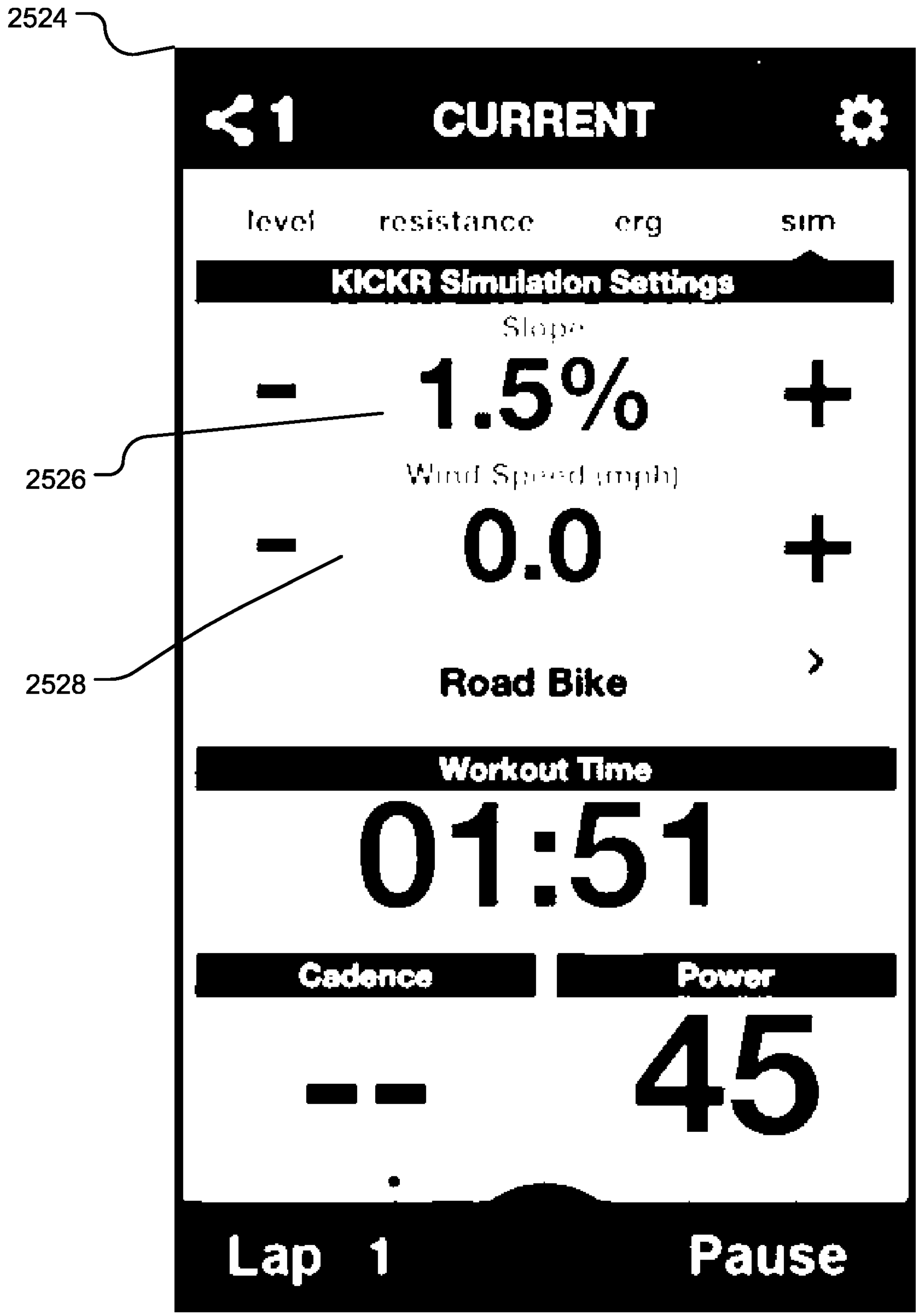

FIGS. 25D and 25E are screenshot 2522 and 2524 of simulation mode. As described above, in sim mode, a user can select a bicycle type (tri, road bike in drops, road, and mountain) to set a coefficient of rolling resistance and a drag coefficient. The screenshot 2524 shows that the user can also select a slope (grade) in percentage using a toggle switch 2526 and a wind speed in miles per hour using a toggle switch 2528. These variables will be communicated from the computing device 1904 to the bicycle trainer 1902 using the API 1905 and may be modified during the ride.

Figure 26:
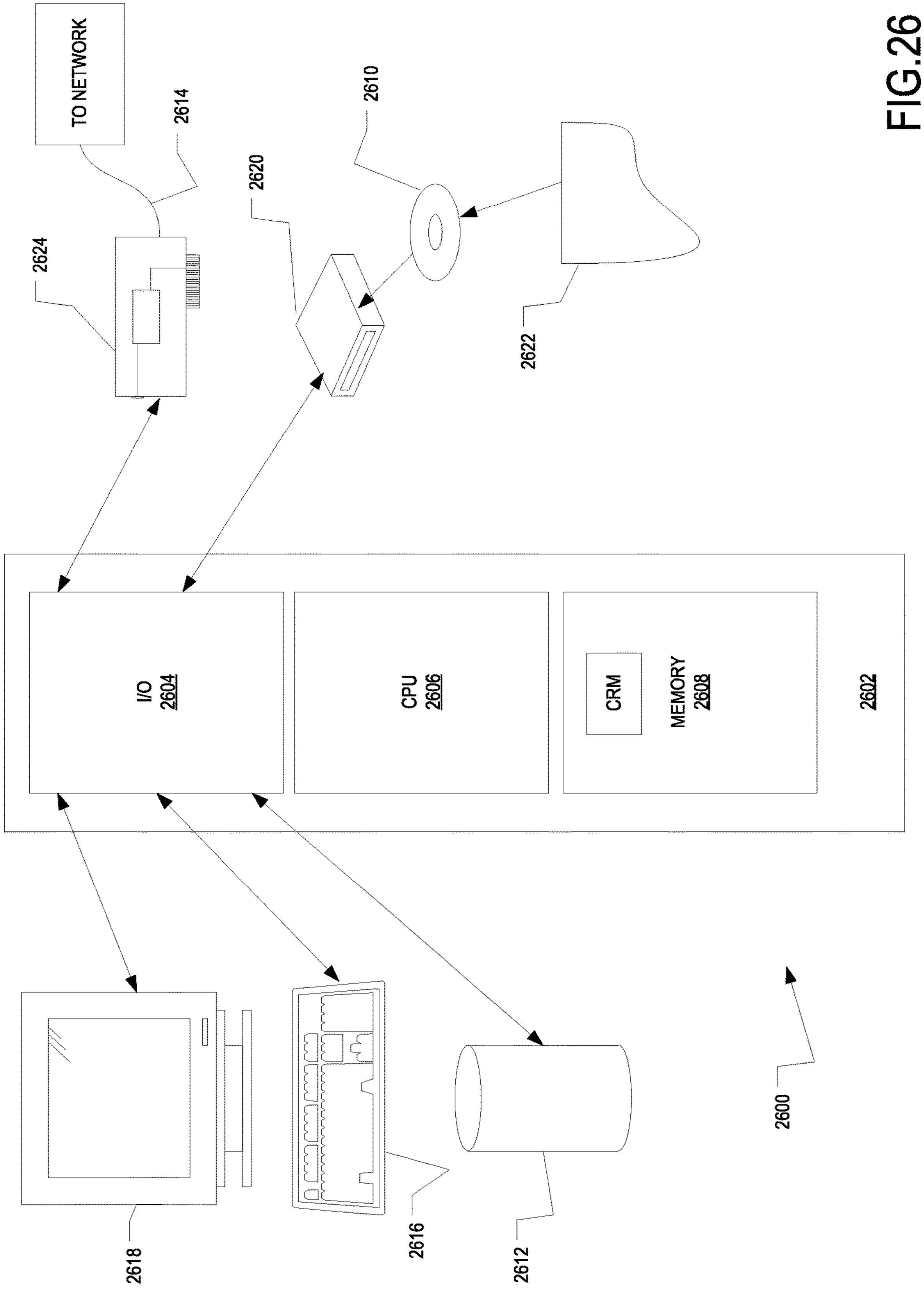
FIG. 26 is a block diagram illustrating an example computing device for use with the example embodiments.

FIG. 26 illustrates an example computing system 2600 that may implement various systems and methods discussed herein. A general purpose computer system 2600 is capable of executing a computer program product to execute a computer process. Data and program files may be input to the computer system 2600, which reads the files and executes the programs therein. Some of the elements of a general purpose computer system 2600 are shown in FIG. 26 wherein a processor 2602 is shown having an input/output (I/O) section 2604, a Central Processing Unit (CPU) 2606, and a memory section 2608. There may be one or more processors 2602, such that the processor 2602 of the computer system 2600 comprises a single central-processing unit 2606, or a plurality of processing units, commonly referred to as a parallel processing environment. The computer system 2600 may be a conventional computer, a distributed computer, or any other type of computer, such as one or more external computers made available via a cloud computing architecture. The presently described technology is optionally implemented in software devices loaded in memory 2608, stored on a configured DVD/CD-ROM 2610 or storage unit 2612, and/or communicated via a wired or wireless network link 2614, thereby transforming the computer system 2600 in FIG. 26 to a special purpose machine for implementing the described operations.

The I/O section 2604 is connected to one or more user-interface devices (e.g., a keyboard 2616 and a display unit 2618), a disc storage unit 2612, and a disc drive unit 2620. Generally, the disc drive unit 2620 is a DVD/CD-ROM drive unit capable of reading the DVD/CD-ROM medium 2610, which typically contains programs and data 2622. Computer program products containing mechanisms to effectuate the systems and methods in accordance with the presently described technology may reside in the memory section 2604, on a disc storage unit 2612, on the DVD/CD-ROM medium 2610 of the computer system 2600, or on external storage devices made available via a cloud computing architecture with such computer program products, including one or more database management products, web server products, application server products, and/or other additional software components. Alternatively, a disc drive unit 2620 may be replaced or supplemented by a floppy drive unit, a tape drive unit, or other storage medium drive unit. The network adapter 2624 is capable of connecting the computer system 2600 to a network via the network link 2614, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 2600 is connected (by wired connection or wirelessly) to a local network through the network interface or adapter 2624, which is one type of communications device. When used in a WAN-networking environment, the computer system 2600 typically includes a modem, a network adapter, or any other type of communications device for establishing communications over the wide area network. In a networked environment, program modules depicted relative to the computer system 2600 or portions thereof, may be stored in a remote memory storage device. It is appreciated that the network connections shown are examples of communications devices for and other means of establishing a communications link between the computers may be used.

In an example implementation, the framework or API 1905 bundled within an app executing on the computing device 1904 wirelessly communicating with the bicycle trainer 1905, a plurality of internal and external databases, source databases, and/or cached data on servers are stored as the memory 2608 or other storage systems, such as the disk storage unit 2612 or the DVD/CD-ROM medium 2610, and/or other external storage devices made available and accessible via a network architecture. The framework or API 1905 bundled within an app may be embodied by instructions stored on such storage systems and executed by the processor 2602.

Some or all of the operations described herein may be performed by the processor 2602. Further, local computing systems, remote data sources and/or services, and other associated logic represent firmware, hardware, and/or software configured to control operations of the bicycle trainer system 1900 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 2602 and a user may interact with a Graphical User Interface (GUI) using one or more user-interface devices (e.g., the keyboard 2616, the display unit 2618, and the user devices 2604) with some of the data in use directly coming from online sources and data stores. The system set forth in FIG. 26 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A method of operating a cycling trainer, comprising:
wirelessly receiving a variable value;
generating a control signal for a magnetic brake assembly of the cycling trainer, wherein generating the control signal includes providing the variable value to a physics engine including equations to simulate a bicycle ride stored in a memory;
transmitting the control signal to the magnetic brake assembly to modify a braking force applied to a flywheel member of the cycling trainer by the magnetic brake assembly; and
changing operation from a first mode in which the physics engine is used to generate control signals and a second mode in which control signals are generated without using the physics engine.

2. The method of claim 1, further comprising measuring a rotational velocity of the flywheel member, wherein generating the control signal is further based on the rotational velocity.

3. The method of claim 1, further comprising measuring a rotational velocity of the flywheel member using an optical sensor positioned to detect a pattern on the flywheel assembly, wherein generating the control signal is further based on the rotational velocity.

4. The method of claim 1, further comprising measuring each of a torque using a strain gauge positioned to determine torque required to rotate the flywheel member and a rotational velocity of the flywheel member, wherein generating the control signal is further based on the rotational velocity and the torque.

5. The method of claim 1, wherein communication between a computing element of the cycling trainer and a computing device from which the variable value was wireless received at the computing element uses at least one of ANT+ or Bluetooth communication protocols.

6. The method of claim 1, wherein the variable value is received through an application programming interface (API).

7. The method of claim 5, further comprising:
measuring a rotational speed of the flywheel; and
transmitting the rotational speed to the computing device.

8. A method of operating, comprising:
wirelessly receiving, at a computing element of a cycling trainer, a variable value from a computing device;
generating a control signal for a magnetic brake assembly of the cycling trainer, wherein generating the control signal includes providing the variable value to a physics engine stored in a memory of the computing element;
transmitting the control signal to the magnetic brake assembly to modify a braking force applied to a flywheel member of the cycling trainer by the magnetic brake assembly;
receiving, at the computing element, a control signal from the computing device, and
responsive to the control signal, changing a mode of the computing element from a first mode in which the computing element uses the physics engine to control the magnetic brake assembly and a second mode in which the computing element does not use the physics engine to control the magnetic brake assembly.

9. A method of operating, comprising:
wirelessly receiving, at a computing element of a cycling trainer, a variable value from a computing device;
generating a control signal for a magnetic brake assembly of the cycling trainer, wherein generating the control signal includes providing the variable value to a physics engine stored in a memory of the computing element;
transmitting the control signal to the magnetic brake assembly to modify a braking force applied to a flywheel member of the cycling trainer by the magnetic brake assembly;
receiving, at the computing element, a control signal from the computing device, and
responsive to the control signal, changing a mode of the computing element from a first mode in which the computing element uses the physics engine to control the magnetic brake assembly and a second mode in which the computing element controls the magnetic brake assembly based on a power set point.

* * * * *